United States Patent

Miyatani et al.

[11] Patent Number: 5,844,342
[45] Date of Patent: Dec. 1, 1998

[54] POWER OUTPUT APPARATUS AND METHOD OF CONTROLLING THE SAME

[75] Inventors: Takao Miyatani, Toyota; Yasutomo Kawabata, Aichi-ken; Shigetaka Nagamatsu, Nissin; Eiji Yamada, Owariasahi; Tetsuya Miura, Aichi-ken; Akihiko Kanamori, Okazaki; Shigeru Matsuhashi, Toyota; Yutaka Taga, Aichi-ken; Ryuji Toh, Toyota; Satoshi Koide, Toyota; Hiroaki Urano, Toyota; Norihiko Akao, Nagoya; Shinji Kogure, Toyota; Yoshiaki Taga, deceased, late of Nagoya, by Tomoyo Taga, heiress; Shigeo Taga, heir; Takiko Taga, heiress, both of Tokorozawa, all of Japan

[73] Assignee: Toyota Jidosha Kabushiki Kaisha, Aichi-ken, Japan

[21] Appl. No.: 886,458

[22] Filed: Jul. 1, 1997

[30] Foreign Application Priority Data

Jul. 2, 1996 [JP] Japan .................................... 8-192826
Nov. 13, 1996 [JP] Japan .................................... 8-318729

[51] Int. Cl.$^6$ ........................... H02K 16/00; H02K 7/20; H02K 7/10; F16H 3/72
[52] U.S. Cl. ..................... 310/114; 310/750; 310/112; 475/5
[58] Field of Search .............................. 310/750, 83, 103, 310/112, 114, 266; 475/5; 180/65.5, 65.6; 290/4 C

[56] References Cited

U.S. PATENT DOCUMENTS

| | | | |
|---|---|---|---|
| 3,586,938 | 6/1971 | Le Gall | 310/112 |
| 4,309,620 | 1/1982 | Bock | 290/4 R |
| 5,172,784 | 12/1992 | Varela, Jr. | 180/65.4 |
| 5,487,438 | 1/1996 | Kinoshita | 310/83 |
| 5,508,574 | 4/1996 | Vlock | 310/113 |
| 5,558,588 | 9/1996 | Schmidt | 475/5 |
| 5,708,314 | 1/1998 | Law | 310/114 |
| 5,730,676 | 3/1998 | Schmidt | 475/5 |
| 5,744,895 | 4/1998 | Seguchi et al. | 310/266 |

FOREIGN PATENT DOCUMENTS

| | | |
|---|---|---|
| 49-43311 | 4/1974 | Japan . |
| 51-22132 | 7/1976 | Japan . |
| 53-133814 | 11/1978 | Japan . |
| 55-103100 | 8/1980 | Japan . |
| 7-266475 | 10/1995 | Japan . |

*Primary Examiner*—Clayton E. Laballe
*Attorney, Agent, or Firm*—Oliff & Berridge, PLC

[57] ABSTRACT

A power output apparatus 20 includes an engine 50, a clutch motor 30 having rotors 31 and 33 respectively linked with a crankshaft 56 and a drive shaft 22, an assist motor 40 attached to a rotor-rotating shaft 38, a first clutch 45 for connecting and disconnecting the rotor-rotating shaft 38 to and from the crankshaft 56, a second clutch 46 for connecting and disconnecting the rotor-rotating shaft 38 to and from the drive shaft 22, and a controller 80 for controlling the motors 30 and 40. The controller 80 operates the clutches 45 and 46 according to the states of the engine 50 and the drive shaft 22 and changes the connection of the rotor-rotating shaft 38, so as to enable power output from the engine 50 to be efficiently converted by the motors 30 and 40 and output to the drive shaft 22.

50 Claims, 48 Drawing Sheets

POWER OUTPUT APPARATUS AND METHOD OF CONTROLLING THE SAME

BACKGROUND OF THE INVENTION

1. Field of the Invention

The present invention relates to a power output apparatus and a method of controlling the same. More specifically, the invention pertains to a power output apparatus for outputting power from an engine to a drive shaft with a high efficiency as well as to a method of controlling such a power output apparatus.

2. Description of the Prior Art

In known power output apparatuses mounted on a vehicle, an output shaft of an engine is electromagnetically linked with a drive shaft, which connects with a rotor of a motor, by means of an electromagnetic coupling, so that power of the engine is output to the drive shaft (as disclosed in, for example, JAPANESE PATENT LAID-OPEN GAZETTE No. 53-133814). In this power output apparatus, the vehicle starts driving by the function of the motor. When the revolving speed of the motor reaches a predetermined level, the power output apparatus supplies an exciting electric current to the electromagnetic coupling to crank the engine and carries out supply of a fuel into the engine and ignition with a spark, thereby starting the engine. After the engine starts, the power from the engine is output to the drive shaft via the electromagnetic coupling, in order to continue driving the vehicle. When the power output to the drive shaft via the electromagnetic coupling is insufficient for the required power on the drive shaft, the motor is driven to supplement the insufficiency. The electromagnetic coupling regenerates electric power according to a slip of its electromagnetic connection while the power is output to the drive shaft. The regenerative electric power is stored in a battery as electric power used for starting the vehicle or is used as a power of the motor to supplement the insufficiency of the power on the drive shaft.

The conventional power output apparatus, however, has a problem of reduced efficiency with an increase in revolving speed of the drive shaft. In the power output apparatus discussed above, in order to output the power to the drive shaft via the electromagnetic coupling when the revolving speed of the drive shaft increases, it is required to make the revolving speed of the engine equal to or higher than the revolving speed of the drive shaft. An efficient driving range of the engine is generally defined by the revolving speed and the loading torque thereof. When the drive shaft rotates at a revolving speed exceeding the efficient driving range, the engine is forced to be driven out of this efficient driving range. This undesirably lowers the efficiency of the whole power output apparatus.

The applicant of the present invention has proposed a technique as a solution of this problem in JAPANESE PATENT LAID-OPEN GAZETTE NO. 7-266475 that has been filed previously. The proposed technique uses a pair-rotor motor that has, in place of the electromagnetic coupling, two rotors respectively connected with the output shaft of the engine and the drive shaft and can generate electric power. When the revolving speed of the drive shaft increases, the pair-rotor motor is controlled as a motor, in order to enable the rotor connected with the drive shaft to rotate relative to the rotor connected with the output shaft of the engine. This allows the engine to be driven at a lower revolving speed than the revolving speed of the drive shaft. When the revolving speed of the drive shaft becomes higher than the revolving speed of the engine, it is required to drive the pair-rotor motor at a high revolving speed under a high torque and to activate another motor attached to the drive shaft as a generator in order to regenerate electric power consumed by the pair-rotor motor. This results in operation of the pair-rotor motor and the motor under the high loading. Compared with the case in which the revolving speed of the drive shaft is lower than the revolving speed of the engine, the proposed technique still lowers the efficiency of the whole power output apparatus to some degree when the revolving speed of the drive shaft is higher than the revolving speed of the engine.

One object of the present invention is thus to provide a power output apparatus for outputting power from an engine to a drive shaft with a high efficiency and a method of controlling such a power output apparatus. Another object of the present invention is to provide a power output apparatus for outputting power to a drive shaft with a high efficiency even when the revolving speed of the drive shaft is higher than the revolving speed of the engine and a method of controlling such a power output apparatus.

SUMMARY OF THE INVENTION

At least part of the above and the other related objects is realized by a power output apparatus for outputting power to a drive shaft, which includes: an engine having an output shaft; a first motor including a first rotor connected with the output shaft of the engine and a second rotor connected with the drive shaft, the second rotor being rotatable relative to the first rotor, the first and second rotors being electromagnetically connected with each other, whereby power is transmitted between the output shaft of the engine and the drive shaft via an electromagnetic coupling of the first rotor with the second rotor; a second motor having a rotating shaft different from the output shaft and the drive shaft, the second motor receiving and transmitting power via the rotating shaft; first connection means for mechanically connecting the rotating shaft to the output shaft and releasing the connection; and second connection means for mechanically connecting the rotating shaft to the drive shaft and releasing the connection.

The power output apparatus of the present invention enables the rotating shaft of the second motor to be connected to and disconnected from the output shaft of the engine and to be connected to and disconnected from the drive shaft. This results in operation of the first motor and the second motor under a low loading, thereby enhancing the efficiency of the whole power output apparatus.

In accordance with one preferable application, both the first connection means and the second connection means are constructed as clutches. The connection means can thus be realized by a simple structure.

In the power output apparatus of the present invention, the drive shaft and the output shaft may be arranged coaxially. It is also possible that the rotating shaft is further arranged coaxially with the drive shaft and the output shaft. Such arrangement is advantageous when the power output apparatus is placed in a linearly formed space.

In the power output apparatus having the drive shaft, the output shaft, and the rotating shaft arranged coaxially, the second motor may include a cylindrical rotor arranged outside the first motor in a diametral direction. This reduces the axial length of the power output apparatus and makes the whole power output apparatus relatively compact.

In the power output apparatus having the drive shaft, the output shaft, and the rotating shaft arranged coaxially, it is preferable that the engine, the second motor, and the first motor are arranged in this sequence. In this case, the first connection means and the second connection means may be arranged between the second motor and the first motor. The second motor is required to output a larger torque than the first motor, by taking into account the operation of the second motor while the engine is at a stop, the first connection means cancels the connection of the rotating shaft with the output shaft of the engine, and the second connection means connects the rotating shaft to the drive shaft. The torque output of the motor is proportional to the axial length of the rotor and the second power of its diameter, so that the second motor is larger in size than the first motor. In case that an internal combustion engine is used as the engine, the required size of the engine for outputting a specific energy is generally greater than that of the motor. Namely the engine, the second motor, and the first motor decrease the size in this sequence. The arrangement in the sequence of the size enhances the consistency in the structure of the power output apparatus and is advantageous when the power output apparatus is mounted on the restricted space, such as a vehicle or a ship. As discussed previously, the first connection means and the second connection means can be constructed as clutches, which are smaller in size than the first motor and the second motor. The first connection means and the second connection means can accordingly be arranged in a dead space formed between these larger devices. This further reduces the size of the whole power output apparatus.

In the power output apparatus having the engine, the second motor, and the first motor arranged in this sequence, there are several possible arrangements of the first connection means and the second connection means. When the first connection means and the second connection means are placed together, they may be arranged between the engine and the second motor, instead of being arranged between the second motor and the first motor discussed above. When the first connection means and the second connection means are placed separately, the first connection means is arranged between the engine and the second motor whereas the second connection means is arranged between the second motor and the first motor. In the power output apparatus having the drive shaft, the output shaft, and the rotating shaft arranged coaxially, the engine, the first motor, and the second motor may be arranged in this sequence. Under this condition, there are also several possible arrangements of the first connection means and the second connection means as described above. The arrangement of the engine, the first motor, and the second motor and the arrangement of the first connection means and the second connection means may be determined appropriately according to the size of the power output apparatus and the space for installation.

In the power output apparatus of the present invention, the rotating shaft may be arranged on a different axis from the drive shaft and the output shaft. This arrangement reduces the axial length of the whole power output apparatus, compared with the same in the coaxial arrangement.

In the power output apparatus of the present invention, the output shaft and the drive shaft may be arranged on different axes. In this case, the rotating shaft may be arranged coaxially with the output shaft or arranged coaxially with the drive shaft. This arrangement also reduces the axial length of the whole power output apparatus, compared with the same in the coaxial arrangement.

In accordance with one preferable application, the first connection means includes: a connecting shaft for mechanically connecting with the output shaft; and change gear means for changing a revolving speed between the connecting shaft and the rotating shaft. In a like manner, the second connection means includes: a connecting shaft for mechanically connecting with the drive shaft; and change gear means for changing a revolving speed between the connecting shaft and the rotating shaft. This structure allows regulation of the revolving speed of the rotating shaft, thereby enabling the second motor to be driven at a driving point of higher efficiency and enhancing the efficiency of the whole power output apparatus.

It is preferable that the power output apparatus of the present invention further includes connection control means for controlling the first connection means and the second connection means under a predetermined condition. This allows the first motor and the second motor to be controlled under the predetermined condition.

In the power output apparatus of the present invention having the connection control means, the connection control means includes: means for controlling the first connection means to release the connection of the rotating shaft with the output shaft and controlling the second connection means to connect the rotating shaft to the drive shaft when the predetermined condition is that a revolving speed of the output shaft is higher than a revolving speed of the drive shaft, and means for controlling the first connection means to connect the rotating shaft to the output shaft and controlling the second connection means to release the connection of the rotating shaft with the drive shaft when the predetermined condition is that the revolving speed of the output shaft is lower than the revolving speed of the drive shaft. This structure enables both the first motor and the second motor to be driven under a low loading, irrespective of whether the revolving speed of the drive shaft is higher or lower than the revolving speed of the output shaft of the engine. This reduces both the energy consumed or regenerated by the first motor and the energy consumed or regenerated by the second motor. This structure accordingly reduces the energy loss of these motors and further enhances the efficiency of the whole power output apparatus.

The power output apparatus of this preferable structure may further include: storage battery means being charged with electric power regenerated through the power transmission by the first motor, being discharged to supply electric power consumed through the power transmission by the first motor, being charged with electric power regenerated through the power transmission by the second motor, and being discharged to supply electric power consumed through the power transmission by the second motor; target power setting means for setting a target power to be output to the drive shaft; and drive/control means for driving and controlling the engine, the first motor, and the second motor, in order to enable a total energy of a power output from the engine and an electric power, which is stored in the storage battery means and discharged from the storage battery means, to be output to the drive shaft as the target power set by the target power setting means. This structure allows the total energy of the power output from the engine and the electric power, which is stored in the storage battery means and discharged from the storage battery means, to be converted to a desired power and output to the drive shaft. Even when the target power is set to be greater than a maximum output power of the engine, this structure accordingly enables the target power to be output to the drive shaft. The engine may thus have only a capacity of outputting the smaller power than the maximum possible target power. This desirably reduces the size of the whole power output apparatus. It is further preferable that the power output apparatus of this structure includes charging state detection means for detecting a charging state of the storage battery means and that the drive/control means includes means for driving and controlling the engine, the first motor, and the second motor, in order to make the charging state of the storage battery means detected by the charging state detection means within a predetermined range. This structure allows the charging state of the storage battery means to be kept in the predetermined range.

In the power output apparatus of the present invention having the connection control means, the connection control means may include means for controlling the first connection means and the second connection means, in order to enable the rotating shaft to connect with the drive shaft and with the output shaft, when the predetermined condition is that the engine, the first motor, the second motor, and the drive shaft are in a predetermined operating state. This structure realizes the mechanical connection of the output shaft of the engine with the drive shaft, thereby enabling the power output from the engine to be directly output to the drive shaft.

In the power output apparatus of this preferable structure, the predetermined operating state may be a state within a predetermined efficient driving range of the engine when a revolving speed of the drive shaft is identical with a revolving speed of the output shaft of the engine. This enables the power output from the engine that is driven with a high efficiency to be directly output to the drive shaft. The power output apparatus of this preferable structure may further include: storage battery means being charged with electric power regenerated through the power transmission by the first motor, being discharged to supply electric power consumed through the power transmission by the first motor, being charged with electric power regenerated through the power transmission by the second motor, and being discharged to supply electric power consumed through the power transmission by the second motor; target power setting means for setting a target power to be output to the drive shaft; and drive/control means for driving and controlling the engine, the first motor, and the second motor, in order to enable a total energy of a power output from the engine and an electric power, which is stored in the storage battery means and discharged from the storage battery means, to be output to the drive shaft as the target power set by the target power setting means. This structure allows the total energy of the power output from the engine and the electric power, which is stored in the storage battery means and discharged from the storage battery means, to be converted to a desired power and output to the drive shaft. Even when the target power is set to be greater than a maximum output power of the engine, this structure accordingly enables the target power to be output to the drive shaft. The engine may thus have only a capacity of outputting the smaller power than the maximum possible target power. This desirably reduces the size of the whole power output apparatus. It is further preferable that the power output apparatus of this structure includes charging state detection means for detecting a charging state of the storage battery means and that the drive/control means includes means for driving and controlling the engine, the first motor, and the second motor, in order to make the charging state of the storage battery means detected by the charging state detection means within a predetermined range. This structure allows the charging state of the storage battery means to be kept in the predetermined range.

In accordance with one application, the predetermined operating state may be a state in which a difference between a revolving speed of the output shaft and a revolving speed of the drive shaft is within a predetermined range. This structure effectively prevents the efficiency of the first motor that is driven at the revolving speed difference between the revolving speed of the output shaft and the revolving speed of the drive shaft from being lowered when the revolving speed of the first motor decreases. In accordance with another application, the predetermined operating state may be a state in which abnormality of the first motor is detected. This structure can stop the rotation of the first motor when any abnormality of the first motor is detected.

In the power output apparatus of the present invention having the connection control means, the connection control means may include means for controlling the first connection means and the second connection means, in order to release the connection of the rotating shaft with the drive shaft and the connection of the rotating shaft with the output shaft, when the predetermined condition is that the engine, the first motor, the second motor, and the drive shaft are in a predetermined operating state. This structure allows the second motor to be placed outside the system for outputting the power to the drive shaft. In the power output apparatus of this structure, the predetermined operating state may be a state within a predetermined efficient driving range of the engine when a torque to be output to the drive shaft is identical with a torque output from the engine. This structure enables the power output from the engine that is driven with a high efficiency to be directly output to the drive shaft. In accordance with another application, the predetermined operating state may be a state in which abnormality of the second motor is detected. This structure can stop the rotation of the second motor when any abnormality of the second motor is detected.

In accordance with one preferable application, the power output apparatus of the present invention having the connection control means further includes drive/control means for driving and controlling the first motor and the second motor, in order to enable a power output from the engine to be subjected to a torque conversion and output to the drive shaft when the rotating shaft is connected with either one of the output shaft and the drive shaft by the connection control means. This structure enables the power output from the engine to be converted to a desired power and output to the drive shaft. The engine can thus be driven at a driving point of the highest possible efficiency among the driving points of outputting a specific energy. This further enhances the energy efficiency of the whole power output apparatus.

In accordance with another preferable application, the power output apparatus of the present invention having the connection control means further includes storage battery means being charged with electric power regenerated through the power transmission by the first motor, being discharged to supply electric power consumed through the power transmission by the first motor, being charged with electric power regenerated through the power transmission by the second motor, and being discharged to supply electric power consumed through the power transmission by the second motor; target power setting means for setting a target power to be output to the drive shaft; and drive/control means for driving and controlling the engine, the first motor, and the second motor, in order to enable a total energy of a power output from the engine and an electric power, which is stored in the storage battery means and discharged from the storage battery means, to be output to the drive shaft as the target power set by the target power setting means. This structure allows the total energy of the power output from the engine and the electric power, which is stored in the storage battery means and discharged from the storage battery means, to be converted to a desired power and output to the drive shaft. Even when the target power is set to be greater than a maximum output power of the engine, this structure accordingly enables the target power to be output to the drive shaft. The engine may thus have only a capacity of outputting the smaller power than the maximum possible target power. This desirably reduces the size of the whole power output apparatus.

The power output apparatus of the present invention having the storage battery means and the drive/control means may further include charging state detection means for detecting a charging state of the storage battery means, wherein the drive/control means includes means for driving and controlling the engine, the first motor, and the second motor, in order to enable the target power to be output to the drive shaft and in order to make the charging state of the storage battery means detected by the charging state detection means within a predetermined range. This structure allows the charging state of the storage battery means to be kept in the predetermined range.

In accordance with one preferable application, in the power output apparatus of the present invention having the storage battery means and the drive/control means, the connection control means includes means for controlling the first connection means to release the connection of the rotating shaft with the output shaft and controlling the second connection means to connect the rotating shaft to the drive shaft, when at least either one of a first condition that a predetermined instruction is given and a second condition that the target power set by the target power setting means is within a predetermined range is fulfilled as the predetermined condition. The drive/control means includes means for driving and controlling the second motor with electric power discharged from the storage battery means, in order to enable the target power to be output to the drive shaft. This structure enables the drive shaft to be rotated only with the power output from the second motor.

In accordance with another preferable application, in the power output apparatus of the present invention having the storage battery means and the drive/control means, the connection control means includes means for controlling the first connection means to connect the rotating shaft to the output shaft and controlling the second connection means to release the connection of the rotating shaft with the drive shaft, when at least either one of a first condition that a predetermined instruction is given and a second condition that the target power set by the target power setting means is within a predetermined range is fulfilled as the predetermined condition. The drive/control means includes means for controlling the first motor in order to enable the first motor to utilize electric power discharged from the storage battery means and output power to the drive shaft, and controlling the second motor in order to cancel a torque that is generated with the output of the power and applied to the output shaft of the engine, thereby enabling the target power to be output to the drive shaft. This structure enables the drive shaft to be driven with the power output from the first motor.

In accordance with still another preferable application, in the power output apparatus of the present invention having the storage battery means and the drive/control means, the connection control means includes means for controlling the first connection means to connect the rotating shaft to the output shaft and controlling the second connection means to connect the rotating shaft to the drive shaft, when at least either one of a first condition that a predetermined instruction is given and a second condition that the target power set by the target power setting means is within a predetermined range is fulfilled as the predetermined condition. The drive/control means includes means for stopping supply of a fuel into the engine and an ignition control and controlling the second motor, in order to enable the second motor to utilize electric power discharged from the storage battery means and output power to the drive shaft while motoring the engine. This structure enables the second motor to output the power to the drive shaft while keeping the engine in the follow-up state.

The power output apparatus of this preferable structure may further include engine start control means for controlling supply of the fuel into the engine and ignition while the engine being motored, when an instruction is given to start the engine. This structure can start the engine and readily shift the driving condition to the state of outputting the power from the engine and the second motor to the drive shaft. In the power output apparatus of this structure, the drive/control means may further include means for controlling the second motor, in order to cancel the power output from the engine when the engine start control means starts the engine. This effectively reduces or even eliminates the variation in torque output to the drive shaft at the time of starting the engine.

In the power output apparatus of the present invention having the storage battery means and the drive/control means, it is preferable that the target power setting means sets a power for rotating the drive shaft in reverse of the rotation of the output shaft of the engine as the target power. This structure enables the drive shaft to be rotated in reverse of the rotation of the output shaft of the engine.

In accordance with one preferable application, the power output apparatus of the present invention having the connection control means further includes reverse rotation control means for controlling the first connection means and the second connection means to release the connection of the rotating shaft with the output shaft and to connect the rotating shaft to the drive shaft via the connection control means, and for controlling the second motor in order to enable the second motor to output a power rotating in reverse of the rotation of the output shaft of the engine to the drive shaft, when an instruction is given to rotate the drive shaft in a reverse direction. This structure enables the drive shaft to be rotated in reverse of the rotation of the output shaft of the engine by means of the second motor.

In accordance with another preferable application, the power output apparatus of the present invention having the connection control means further includes reverse rotation control means for controlling the first connection means and the second connection means to connect the rotating shaft to the output shaft and to release the connection of the rotating shaft with the drive shaft via the connection control means, for controlling the first motor in order to enable the first motor to output a power rotating in reverse of the rotation of the output shaft of the engine to the drive shaft, and for controlling the second motor to cancel a torque that is applied to the output shaft as a reaction force of the power output to the drive shaft, when an instruction is given to rotate the drive shaft in a reverse direction. This structure enables the drive shaft to be rotated in reverse of the rotation of the output shaft of the engine by means of the first motor.

In accordance with still another preferable application, the power output apparatus of the present invention having the connection control means further includes engine start control means for controlling the first connection means and the second connection means to connect the rotating shaft to the output shaft and to release the connection of the rotating shaft with the drive shaft via the connection control means, for controlling the second motor to motor the engine, and for controlling supply of a fuel into the engine and ignition while the engine is motored, when an instruction is given to start the engine. This structure does not require any additional motor for starting the engine, but allows the second motor to start the engine.

In accordance with another preferable application, the power output apparatus of the present invention having the connection control means further includes engine start control means for controlling the first connection means and the second connection means to release the connection of the rotating shaft with the output shaft and to connect the rotating shaft to the drive shaft via the connection control means, for controlling the second motor to prevent rotation of the rotating shaft, for controlling the first motor to motor the engine, and for controlling supply of a fuel into the engine and ignition while the engine is motored, when an instruction is given to start the engine. This structure does not require any additional motor for starting the engine, but allows the first motor and the second motor to start the engine.

In accordance with still another preferable application, the power output apparatus of the present invention having the connection control means further includes engine start control means for controlling the first motor to motor the engine and for controlling supply of a fuel into the engine and ignition while the engine is motored, when an instruction is given to start the engine while a power is output from the second motor to the drive shaft under a condition that the rotating shaft is disconnected from the output shaft but connected with the drive shaft. This structure can start the engine while the drive shaft is driven by means of the second motor. This structure also does not require any additional motor for starting the engine. In the power output apparatus of this preferable structure, the engine start control means may include means for controlling the second motor to cancel a torque output from the first motor to the drive shaft as a reaction force of a torque required for motoring the engine. This further reduces the variation in torque on the drive shaft.

In accordance with another preferable application, the power output apparatus of the present invention having the connection control means further includes engine start control means for controlling the second motor to motor the engine and for controlling supply of a fuel into the engine and ignition while the engine is motored, when an instruction is given to start the engine while the second motor fixes the output shaft and the first motor outputs a power to the drive shaft under a condition that the rotating shaft is connected with the output shaft but disconnected from the drive shaft. This structure can start the engine while the drive shaft is driven by means of the first motor. This structure also does not require any additional motor for starting the engine. In the power output apparatus of this preferable structure, the engine start control means may include means for controlling the first motor to cancel a torque output to the drive shaft as a reaction force of a torque required for motoring the engine. This further reduces the variation in torque on the drive shaft.

At least part of the objects discussed above is realized by a first method of controlling a power output apparatus for outputting power to a drive shaft. The first method of the present invention includes the steps of: (a) providing (1) an engine having an output shaft; (2) a first motor including a first rotor connected with the output shaft of the engine and a second rotor connected with the drive shaft, the second rotor being rotatable relative to the first rotor, the first and second rotors being electromagnetically connected with each other, whereby power is transmitted between the output shaft of the engine and the drive shaft via an electromagnetic coupling of the first rotor with the second rotor; (3) a second motor having a rotating shaft different from the output shaft and the drive shaft, the second motor receiving and transmitting power via the rotating shaft; (4) first connection means for mechanically connecting the rotating shaft to the output shaft and releasing the connection; and (5) second connection means for mechanically connecting the rotating shaft to the drive shaft and releasing the connection; (b) controlling the first connection means to release the connection of the rotating shaft with the output shaft and controlling the second connection means to connect the rotating shaft to the drive shaft when a revolving speed of the output shaft is higher than a revolving speed of the drive shaft; and (c) controlling the first connection means to connect the rotating shaft to the output shaft and controlling the second connection means to release the connection of the rotating shaft with the drive shaft when the revolving speed of the output shaft is lower than the revolving speed of the drive shaft.

The first method of the present invention enables both the first motor and the second motor to be driven under a low loading, irrespective of whether the revolving speed of the drive shaft is higher or lower than the revolving speed of the output shaft of the engine. This reduces both the energy consumed or regenerated by the first motor and the energy consumed or regenerated by the second motor. This structure accordingly reduces the energy loss of these motors and further enhances the energy efficiency.

In the first method of the present invention, the step (a) includes the step of: providing storage battery means being charged with electric power regenerated through the power transmission by the first motor, being discharged to supply electric power consumed through the power transmission by the first motor, being charged with electric power regenerated through the power transmission by the second motor, and being discharged to supply electric power consumed through the power transmission by the second motor.

The first method further includes the steps of: (d) setting a target power to be output to the drive shaft; and (e) driving and controlling the engine, the first motor, and the second motor, in order to enable a total energy of a power output from the engine and an electric power, which is stored in the storage battery means and discharged from the storage battery means, to be output to the drive shaft as the target power set in the step (d).

This structure allows the total energy of the power output from the engine and the electric power, which is stored in the storage battery means and discharged from the storage battery means, to be converted to a desired power and output to the drive shaft. Even when the target power is set to be greater than a maximum output power of the engine, this structure accordingly enables the target power to be output to the drive shaft. The engine may thus have only a capacity of outputting the smaller power than the maximum possible target power.

In the first method of the present invention, the step (e) includes the step of: detecting a charging state of the storage battery means, and driving and controlling the engine, the first motor, and the second motor, in order to make the charging state of the storage battery means within a predetermined range. This structure enables the charging state of the storage battery means to be kept within the predetermined range.

The present invention is also directed to a second method of controlling a power output apparatus for outputting power to a drive shaft. The second method of the present invention includes the steps of: (a) providing (1) an engine having an output shaft; (2) a first motor including a first rotor connected with the output shaft of the engine and a second rotor connected with the drive shaft, the second rotor being rotatable relative to the first rotor, the first and second rotors being electromagnetically connected with each other, whereby power is transmitted between the output shaft of the engine and the drive shaft via an electromagnetic coupling of the first rotor with the second rotor; (3) a second motor having a rotating shaft different from the output shaft and the drive shaft, the second motor receiving and transmitting power via the rotating shaft; (4) first connection means for mechanically connecting the rotating shaft to the output shaft and releasing the connection; and (5) second connection means for mechanically connecting the rotating shaft to the drive shaft and releasing the connection; and (b) controlling the first connection means and the second connection means in order to enable the rotating shaft to be connected with the drive shaft and with the output shaft, provided that state of the engine is within a predetermined efficient driving range when a revolving speed of the drive shaft is identical with a revolving speed of the output shaft of the engine.

The second method of the present invention realizes the mechanical connection of the output shaft of the engine with the drive shaft and thereby enables the power output from the engine to be directly output to the drive shaft. The connection by the first connection means and the second connection means is implemented when the driving state of the engine is within the efficient driving range. This enhances the efficiency of the power output apparatus.

In the second method of the present invention, the step (a) includes the step of: providing storage battery means being charged with electric power regenerated through the power transmission by the first motor, being discharged to supply electric power consumed through the power transmission by the first motor, being charged with electric power regenerated through the power transmission by the second motor, and being discharged to supply electric power consumed through the power transmission by the second motor, the second method further includes the steps of: (c) setting a target power to be output to the drive shaft; and (d) driving and controlling the engine, the first motor, and the second motor, in order to enable a total energy of a power output from the engine and an electric power, which is stored in the storage battery means and discharged from the storage battery means, to be output to the drive shaft as the target power set in the step (c).

This structure allows the total energy of the power output from the engine and the electric power, which is stored in the storage battery means and discharged from the storage battery means, to be converted to a desired power and output to the drive shaft. Even when the target power is set to be greater than a maximum output power of the engine, this structure accordingly enables the target power to be output to the drive shaft. The engine may thus have only a capacity of outputting the smaller power than the maximum possible target power.

In the second method of the present invention, the step (d) includes the step of: detecting a charging state of the storage battery means, and driving and controlling the engine, the first motor, and the second motor, in order to make the charging state of the storage battery means within a predetermined range. This structure enables the charging state of the storage battery means to be kept within the predetermined range.

The present invention is further directed to a third method of controlling a power output apparatus for outputting power to a drive shaft. The third method of the present invention includes the steps of: (a) providing (1) an engine having an output shaft; (2) a first motor including a first rotor connected with the output shaft of the engine and a second rotor connected with the drive shaft, the second rotor being rotatable relative to the first rotor, the first and second rotors being electromagnetically connected with each other, whereby power is transmitted between the output shaft of the engine and the drive shaft via an electromagnetic coupling of the first rotor with the second rotor; (3) a second motor having a rotating shaft different from the output shaft and the drive shaft, the second motor receiving and transmitting power via the rotating shaft; (4) first connection means for mechanically connecting the rotating shaft to the output shaft and releasing the connection; and (5) second connection means for mechanically connecting the rotating shaft to the drive shaft and releasing the connection; (b) controlling the first connection means and the second connection means to carry out either one of the connection by the first connection means and the connection by the second connection; and (c) driving and controlling the first motor and the second motor, in order to enable power output from the engine to be subjected to a torque conversion and output to the drive shaft.

The third method of the present invention enables the power output from the engine to be converted to a desired torque and output to the drive shaft. The engine can thus be driven at a driving point of the highest possible efficiency among the driving points of outputting a specific energy. This further enhances the energy efficiency.

DESCRIPTION OF THE PREFERRED EMBODIMENT

A. Structure

Figure 1:
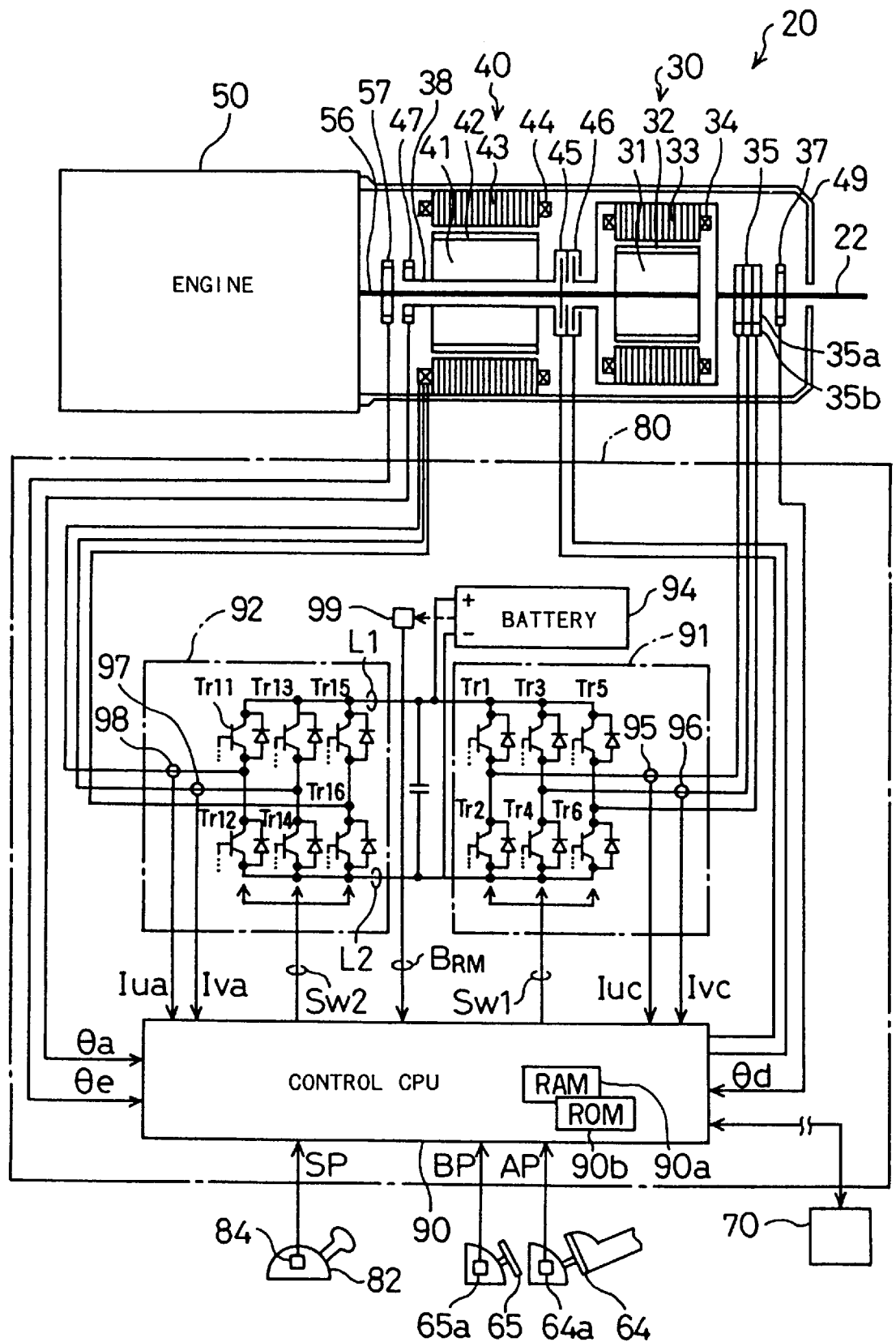
FIG. 1 schematically illustrates structure of a power output apparatus 20 as an embodiment according to the present invention.
Figure 2:
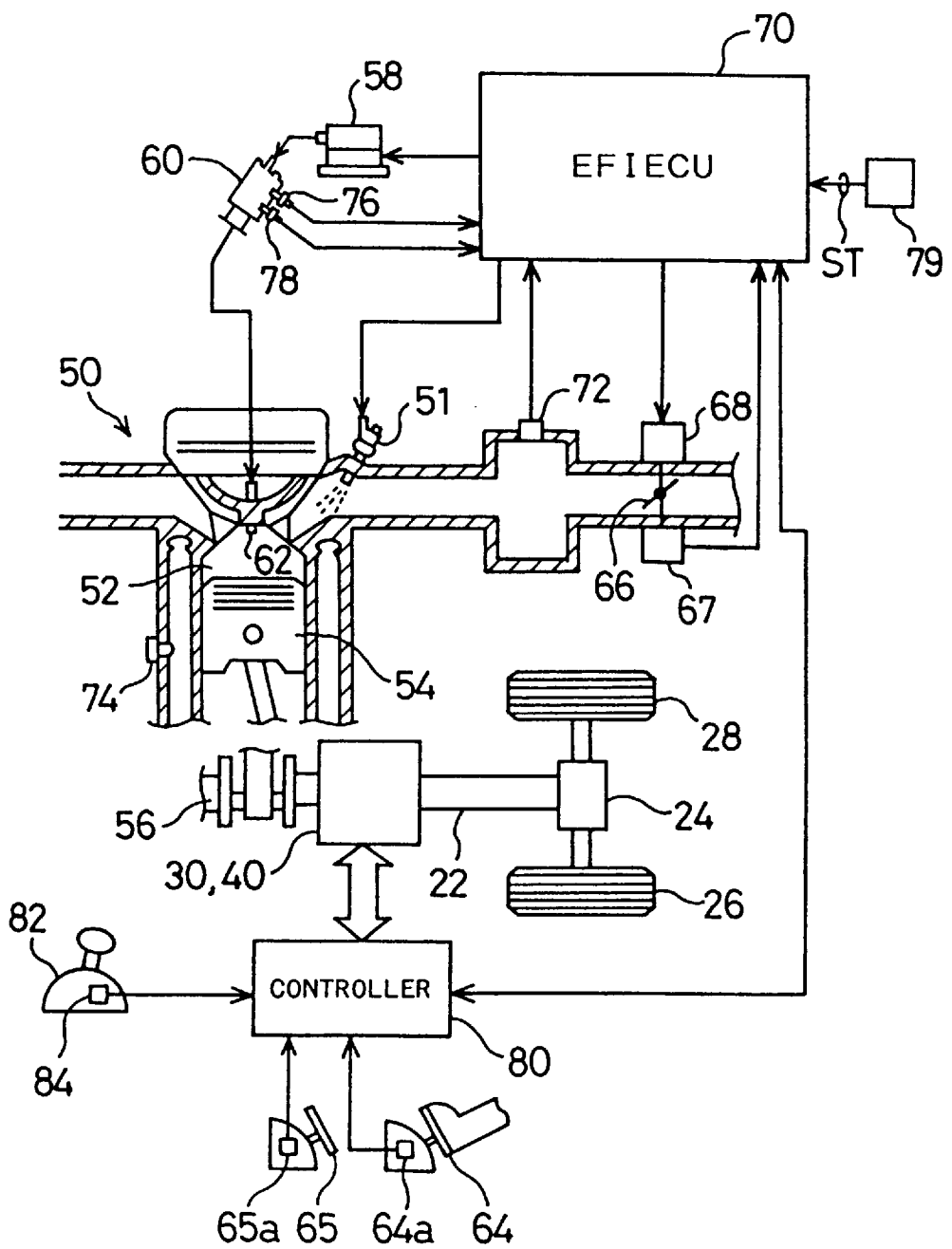
FIG. 2 schematically illustrates a general structure of a vehicle having the power output apparatus 20 of FIG. 1 incorporated therein.

One mode of carrying out the present invention is described below as a preferred embodiment. FIG. 1 schematically illustrates structure of a power output apparatus 20 as an embodiment according to the present invention; and FIG. 2 schematically illustrates a general structure of a vehicle having the power output apparatus 20 of FIG. 1 incorporated therein. The general structure of the vehicle is described first for the convenience of explanation.

Referring to FIG. 2, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82, an accelerator pedal position sensor 64a attached to an accelerator pedal 64, and a brake pedal position sensor 65a attached to a brake pedal 65. The detailed structure of the controller 80 will be described later. The controller 80 sends and receives a variety of data and information to and from the EFIECU 70 through communication. Details of the control procedure including a communication protocol will be described later.

Referring to FIG. 1, the power output apparatus 20 essentially includes the engine 50, the clutch motor 30 having an inner rotor 31 linked with the crankshaft 56 of the engine 50 and an outer rotor 33 linked with the drive shaft 22, the assist motor 40 having a rotor 41 that is mechanically linked with either the crankshaft 56 or the drive shaft 22 by means of a first clutch 45 and a second clutch 46, and the controller 80 for driving and controlling the clutch motor 30 and the assist motor 40.

As shown in FIG. 1, the clutch motor 30 is constructed as a synchronous motor having permanent magnets 32 attached to an outer surface of the inner rotor 31 and three-phase coils 34 wound on slots formed in the outer rotor 33. Electric power is supplied to the three-phase coils 34 via a slip ring 35. Laminated sheets of non-directional electromagnetic steel are used to form teeth and slots for the three-phase coils 34 in the outer rotor 33. In this embodiment, a total of eight permanent magnets 32 (four N poles and four S poles) are attached to the outer surface of the inner rotor 31. The permanent magnets 32 are magnetized in the direction towards the axial center of the clutch motor 30 and have magnetic poles of alternately inverted directions. The three-phase coils 34 of the outer rotor 33 facing to the permanent magnets 32 across a little gap are wound on a total of 12 slots (not shown) formed in the outer rotor 33. Supply of electricity to the respective coils forms magnetic fluxes running through the teeth (not shown), which separate the slots from one another. Supply of a three-phase alternating current to the respective coils rotates this magnetic field. The three-phase coils 34 are connected to receive electric power supplied through the slip ring 35. The slip ring 35 includes rotary rings 35a fixed to the drive shaft 22 and brushes 35b. There are three sets of rotary rings 35a and brushes 35b in the slip ring 35, in order to receive and supply electric currents of three phases (U, V, and W phases).

Interaction between a magnetic field formed by one adjoining pair of permanent magnets 32 and a revolving magnetic field formed by the three-phase coils 34 of the outer rotor 33 leads to a variety of behaviors of the inner rotor 31 and the outer rotor 33. The frequency of the three-phase alternating current supplied to the three-phase coils 34 is generally equal to a difference between the revolving speed of the inner rotor 31 directly connected to the crankshaft 56 and the revolving speed of the outer rotor 33.

The assist motor 40 is also constructed as a synchronous motor having three-phase coils 44, which are wound on a stator 43 fixed to a casing 49 to generate a revolving magnetic field. The stator 43 is also made of laminated sheets of non-directional electromagnetic steel. The rotor 41 is linked with a rotor-rotating shaft 38 that is hollow and coaxial with the crankshaft 56, and a plurality of permanent magnets 42 are attached to an outer surface of the rotor 41. In the assist motor 40, interaction between a magnetic field formed by the permanent magnets 42 and a revolving magnetic field formed by the three-phase coils 44 results in rotations of the rotor 41. The rotor-rotating shaft 38 is mechanically connected to and disconnected from the crankshaft 56 by means of the first clutch 45 arranged between the assist motor 40 and the clutch motor 30. The rotor-rotating shaft 38 is also mechanically connected to and disconnected from the drive shaft 22 via the outer rotor 33 of the clutch motor 30 by means of the second clutch 46. Both the first clutch 45 and the second clutch 46 are operated by a hydraulic circuit (not shown).

Resolvers 37, 47, and 57 for measuring rotational angles θd, θr, and θe are mounted on the drive shaft 22, the rotor-rotating shaft 38, and the crankshaft 56, respectively. The resolver 57 for measuring the rotational angle Oe of the crankshaft 56 may also work as the angle sensor 78 attached to the distributor 60.

Although the clutch motor 30 may be arranged between the engine 50 and the assist motor 40 as discussed later, the assist motor 40 is arranged between the engine 50 and the clutch motor 30 in the power output apparatus 20 of this embodiment. Since there is a requirement for driving the vehicle only with the assist motor 40 as discussed blow, the assist motor 40 is greater in size than the clutch motor 30. The arrangement of the relatively large assist motor 40 adjoining to the larger engine 50 enhances the consistency in the structure of the power output apparatus 20. The first clutch 45 and the second clutch 46 are arranged between the assist motor 40 and the clutch motor 30 in the power output apparatus 20 of the embodiment, although there are a variety of other possible arrangements as discussed later. Both the clutches 45 and 46 are relatively small in size and can be placed in a clearance formed between the assist motor 40 and the clutch motor 30. This arrangement preferably reduces the size of the whole power output apparatus 20.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92 and activating and controlling the first clutch 45 and the second clutch 46, and a battery 94 including a number of secondary cells. The control CPU 90 is a one-chip microprocessor including a RAM 90$a$ used as a working memory, a ROM 90$b$ in which a variety of processing programs are stored, an input/output port (not shown), and a serial communication port (not shown) through which data are sent to and received from the EFIECU 70. The control CPU 90 receives a variety of data via the input port. The input data include the rotational angle θd of the drive shaft 22 measured with the resolver 37, the rotational angle θr of the rotor-rotating shaft 38 measured with the resolver 47, the rotational angle θe of the crankshaft 56 of the engine 50 measured with the resolver 57, an accelerator pedal position AP (step-on amount of the accelerator pedal 64) output from the accelerator pedal position sensor 64$a$, a brake pedal position BP (step-on amount of the brake pedal 65) output from the brake pedal position sensor 65$a$, a gearshift position SP output from the gearshift position sensor 84, clutch-on and -off signals output from the first clutch 45 and the second clutch 46, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a control signal SW1 for driving six transistors Tr1 through Tr6 working as switching elements of the first driving circuit 91, a control signal SW2 for driving six transistors Tr11 through Tr16 working as switching elements of the second driving circuit 92, and driving signals for driving the first clutch 45 and the second clutch 46. The six transistors Tr1 through Tr6 in the first driving circuit 91 constitute a transistor inverter and are arranged in pairs to work as a source and a drain with respect to a pair of power lines L1 and L2. The three-phase coils (U,V,W) 34 of the clutch motor 30 are connected via the slip ring 35 to the respective contacts of the paired transistors. The power lines L1 and L2 are respectively connected to plus and minus terminals of the battery 94. The control signal SW1 output from the control CPU 90 thus successively controls the power-on time of the paired transistors Tr1 through Tr6. The electric current flowing through each coil 34 undergoes PWM (pulse width modulation) to give a quasi-sine wave, which enables the three-phase coils 34 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form are revolving magnetic field.

B. Operation Principle

The power output apparatus 20 of the embodiment thus constructed works in the following manner. The following describes a first state, in which the first clutch 45 is off and the second clutch 46 is on, and a second state, in which the first clutch 45 is on and the second clutch 46 is off. In the first state, the rotor-rotating shaft 38 is disconnected from the crankshaft 56 but connected to the drive shaft 22, and the assist motor 40 is accordingly linked with the drive shaft 22 as shown in the schematic view of FIG. 3. In the second state, on the other hand, the rotor-rotating shaft 38 is connected to the crankshaft 56 but disconnected from the drive shaft 22, and the assist motor 40 is accordingly linked with the crankshaft 56 as shown in the schematic view of FIG. 4. The following discusses the operations in the first state (in which the first clutch 45 is off and the second clutch 46 is on) and those in the second state (in which the first clutch 45 is on and the second clutch 46 is off) in this sequence.

In case that the first clutch 45 is off and the second clutch 46 is on, the power output apparatus 20 of the embodiment follows the operation principle discussed below or more specifically the principle of torque conversion. By way of example, it is assumed that the engine 50 driven by the EFIECU 70 rotates at a revolving speed Ne and that the drive shaft 22 rotates at a revolving speed Nd1 that is lower than the revolving speed Ne. While the transistors Tr1 through Tr6 in the first driving circuit 91 are in OFF position, the controller 80 does not supply any electric current to the three-phase coils 34 of the clutch motor 30 via the slip ring 35. No supply of electric current causes the inner rotor 31 and the outer rotor 33 of the clutch motor 30 to be electromagnetically disconnected from each other. This results in racing the crankshaft 56 of the engine 50. Under the condition that all the transistors Tr1 through Tr6 are in OFF position, there is no regeneration of energy from the three-phase coils 34, so that the engine 50 is kept at an idle.

As the control CPU 90 of the controller 80 outputs the first control signal SW1 to control on and of f the transistors Tr1 through Tr6 in the first driving circuit 91, a constant electric current flows through the three-phase coils 34 of the clutch motor 30, based on the difference between the revolving speed Ne of the crankshaft 56 of the engine 50 and the revolving speed Nd1 of the drive shaft 22 (in other words, a revolving speed difference Nc (=Ne−Nd1) between the revolving speed of the inner rotor 31 and that of the outer rotor 33 in the clutch motor 30). In this state, the clutch motor 30 functions as a generator and carries out the regenerative operation to regenerate an electric current via the first driving circuit 91, and the battery 94 is charged with the regenerative electric current. At this moment, a certain slip exists between the inner rotor 31 and the outer rotor 33 connected with each other in the clutch motor 30, and a torque is output from the crankshaft 56 to the drive shaft 22 via the coupling of the inner rotor 31 with the outer rotor 33. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 5:
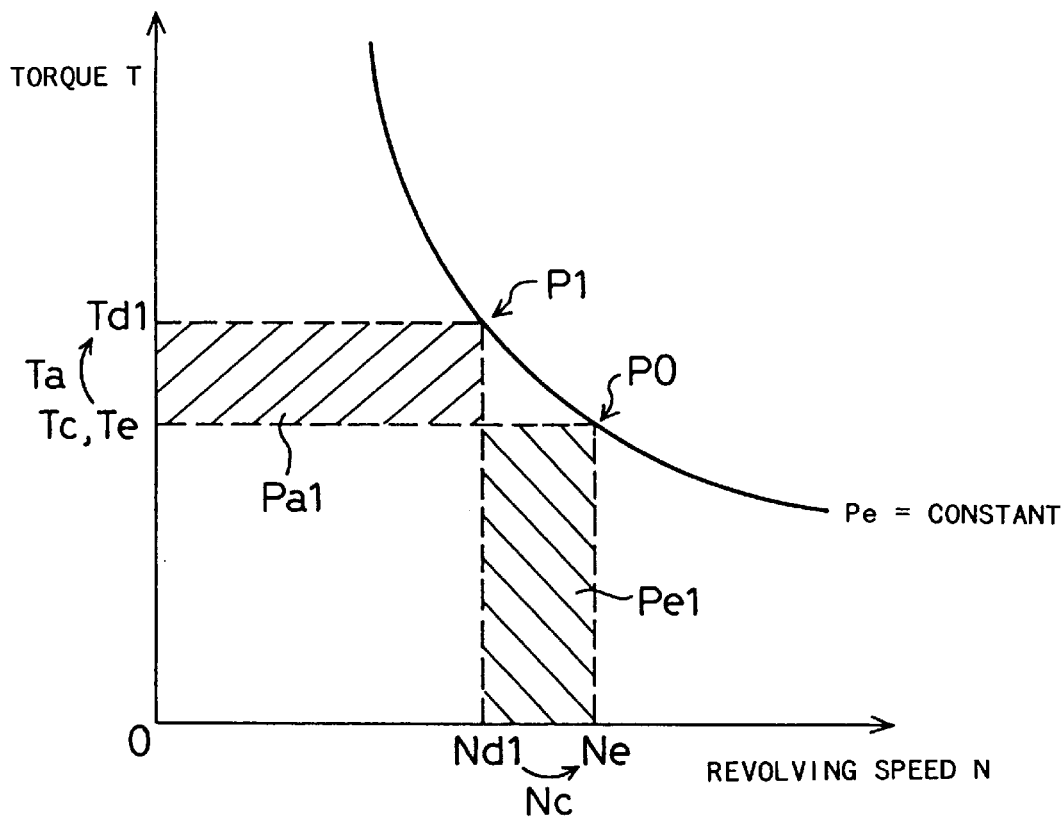
FIG. 5 shows a state of torque conversion when Ne>Nd in the structure of FIG. 3.

Referring to FIG. 5, when the engine 50 is driven at a driving point P0 defined by the revolving speed Ne and a torque Te, the clutch motor 30 outputs a torque Tc (=torque Te output from the engine 50) to the drive shaft 22 and regenerates energy expressed by a hatched area Pc1. The regenerative energy is supplied to the assist motor 40 as energy expressed by an area Pa1, so that the drive shaft 22 is rotated at a driving point P1 defined by the revolving speed Nd1 and a torque Td1.

As another example, it is assumed that the engine 50 is driven at the revolving speed Ne and that the drive shaft 22 rotates at a revolving speed Nd2 that is higher than the revolving speed Ne. In this state, the outer rotor 33 of the clutch motor 30 rotates relative to the inner rotor 31 in the direction of rotation of the drive shaft 22 at a revolving speed defined by the absolute value of a revolving speed difference Nc (=Ne−Nd2). The clutch motor 30 accordingly functions as a normal motor and supplies the energy of rotational motion to the drive shaft 22 with electric power discharged from the battery 94. When the control CPU 90 controls the second driving circuit 92 to enable the assist motor 40 to regenerate electric power, a slip between the rotor 41 and the stator 43 of the assist motor 40 makes a regenerative electric current flow through the three-phase coils 44. In order to allow the clutch motor 30 to consume the electric power regenerated by the assist motor 40, the control CPU 90 controls both the first driving circuit 91 and the second driving circuit 92. This enables the clutch motor 30 to be driven without using electric power stored in the battery 94.

Figure 6:
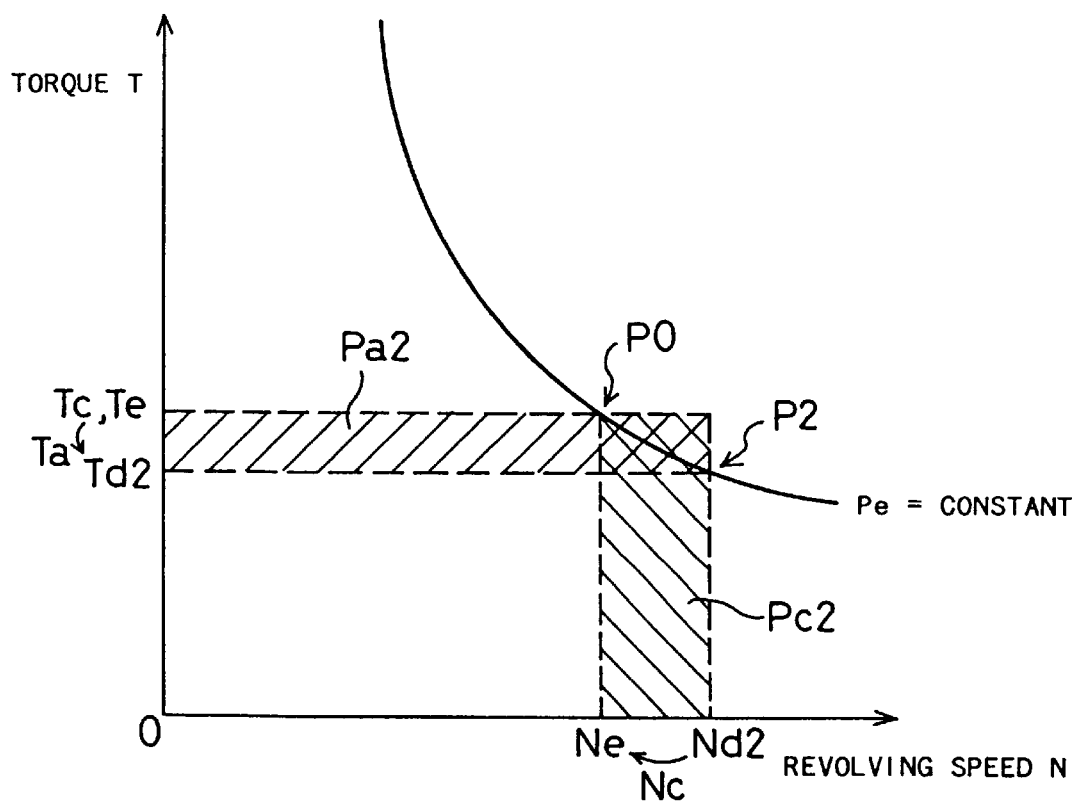
FIG. 6 shows a state of torque conversion when Ne<Nd in the structure of FIG. 3.

Referring to FIG. 6, when the engine 50 is driven at the driving point P0 defined by the revolving speed Ne and the torque Te, the clutch motor 30 receives energy expressed by a hatched area Pc2 and outputs a torque Tc (=torque Te output from the engine 50) to the drive shaft 22. The energy supplied to the clutch motor 30 is regenerated by the assist motor 40 as energy expressed by an area Pa2, so that the drive shaft 22 is rotated at a driving point P2 defined by the revolving speed Nd2 and a torque Td2.

The power output apparatus 20 in the first state, wherein the first clutch 45 is off and the second clutch 46 is on, can perform a variety of operations in order to, for example, charge the battery 94 with an excess of electrical energy or discharge the battery 94 to supplement the insufficient electrical energy, other than the operation of converting all the power output from the engine 50 to a torque and outputting the torque to the drive shaft 22. Such charging and discharging operations are implemented by regulating the power output from the engine 50 (that is, the product of the torque Te and the revolving speed Ne), the electrical energy regenerated or consumed by the clutch motor 30, and the electrical energy consumed or regenerated by the assist motor 40.

In case that the first clutch 45 is on and the second clutch 46 is off (in the state shown in the schematic view of FIG. 4), on the other hand, the power output apparatus 20 of the embodiment follows the operation principle (principle of torque conversion) discussed below. By way of example, it is assumed that the engine 50 is driven at the driving point P0 defined by the revolving speed Ne and the torque Te and that the drive shaft 22 rotates at the revolving speed Nd1 that is lower than the revolving speed Ne. In case that the assist motor 40 linked with the crankshaft 56 outputs a torque Ta (Ta =Td1−Te) to the crankshaft 56, the crankshaft 56 thereby receives a torque Td1 (=Te+Ta). When the torque Tc of the clutch motor 30 is regulated to the value Td1 (=Te+Ta), the torque Tc (=Te+Ta) is output to the drive shaft 22 while electric power is regenerated based on the revolving speed difference Nc between the revolving speed Ne of the engine 50 and the revolving speed Nd1 of the drive shaft 22. It is here required to set the torque Ta of the assist motor 40 to be just supplied by the electric power regenerated by the clutch motor 30. The regenerative electric power is supplied to the second driving circuit 92 via the power lines L1 and L2, and the assist motor 40 is accordingly driven with the regenerative electric power.

Figure 7:
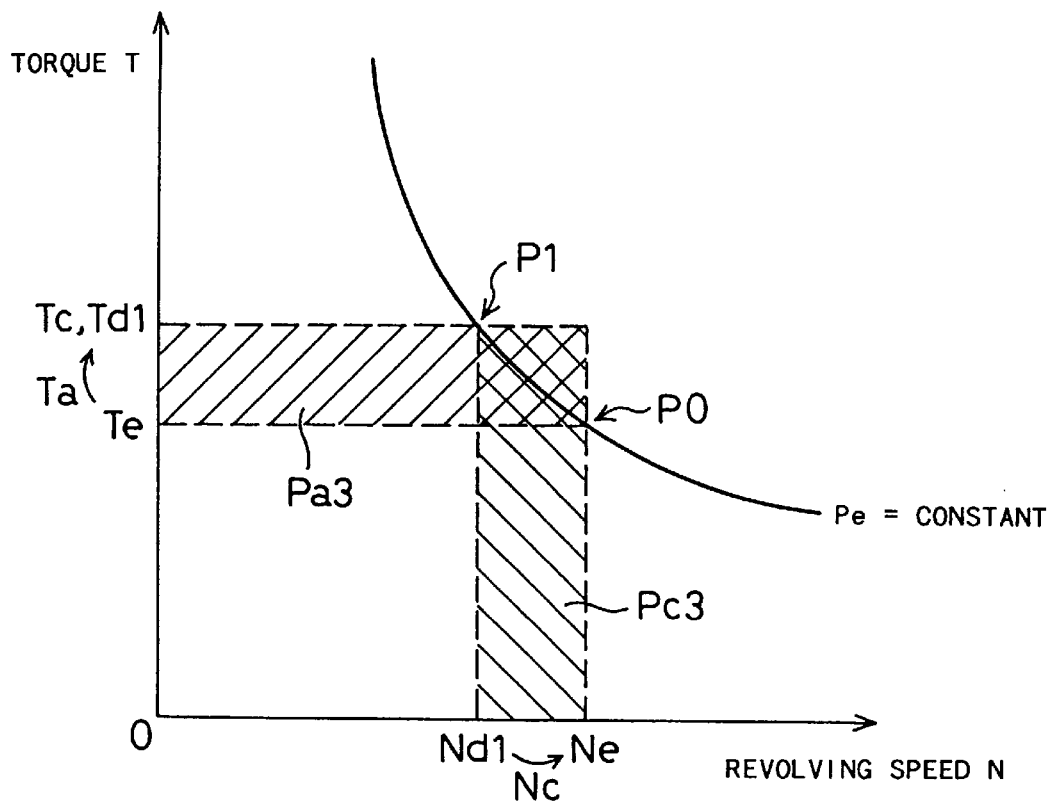
FIG. 7 shows a state of torque conversion when Ne>Nd in the structure of FIG. 4.

Referring to FIG. 7, when the engine 50 is driven at the driving point P0 defined by the revolving speed Ne and the torque Te, energy expressed by a hatched area Pa3 is supplied to the assist motor 40 to make the torque of the crankshaft 56 equal to the value Td1. The clutch motor 30 outputs the torque Td1 (=torque Tc) to the drive shaft 22 and regenerates energy supplied to the assist motor 40 as energy expressed by an area Pc3. The drive shaft 22 thereby rotates at a driving point P1 defined by the revolving speed Nd1 and the torque Td1.

As another example, it is assumed that the engine 50 is driven at the driving point P0 defined by the revolving speed Ne and the torque Te and that the drive shaft rotates at the revolving speed Nd2 that is higher than the revolving speed Ne. In case that the torque Ta of the assist motor 40 is regulated to a value (Td2−Te), the assist motor 40 carries out the regenerative operation and regenerates energy (electric power) from the crankshaft 56. The outer rotor 33 of the clutch motor 30 rotates relative to the inner rotor 31 in the direction of rotation of the drive shaft 22 at a revolving speed difference Nc (=Ne−Nd2). The clutch motor 30 accordingly functions as a normal motor and supplies energy corresponding to the revolving speed difference Nc to the drive shaft 22 as energy of rotational motion. In case that the torque Ta of the assist motor 40 is set in order to enable the electric power consumed by the clutch motor 30 to be just supplied by the electric power regenerated by the assist motor 40, the clutch motor 30 can be driven by the electric power regenerated by the assist motor 40.

Figure 8:
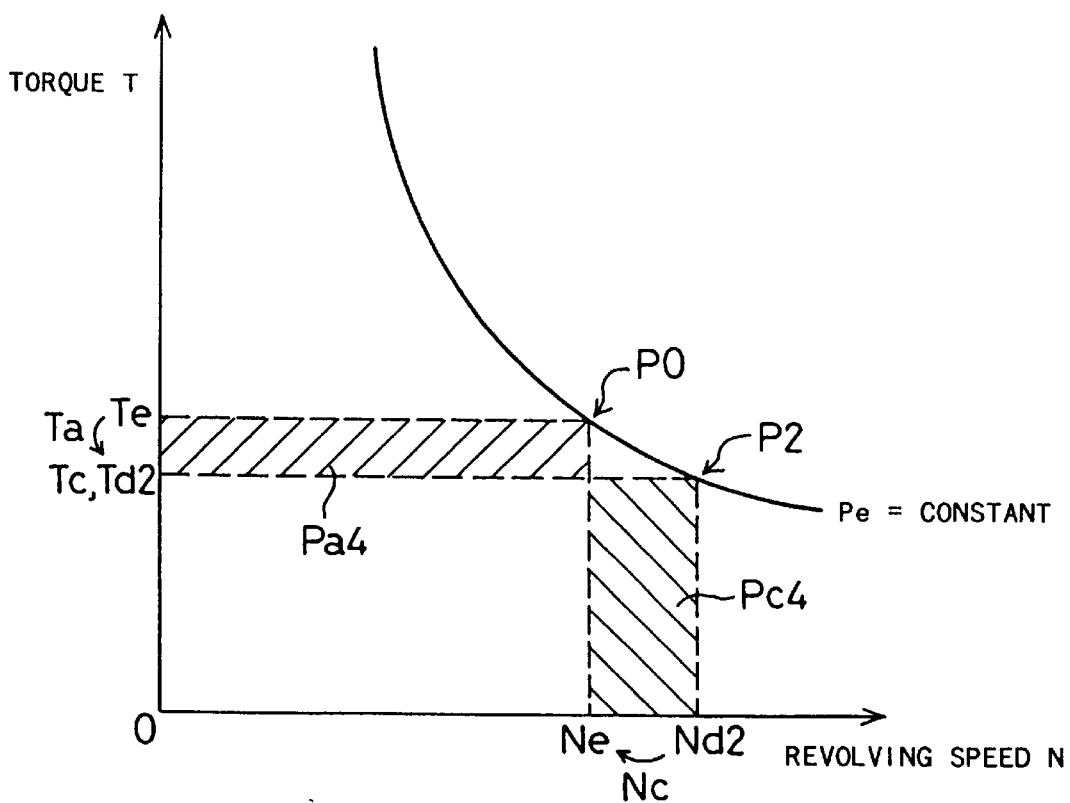
FIG. 8 shows a state of torque conversion when Ne<Nd in the structure of FIG. 4.

Referring to FIG. 8, when the engine 50 is driven at the driving point P0 defined by the revolving speed Ne and the torque Te, the assist motor 40 regenerates energy expressed by a hatched area Pa4 and supplies the regenerative energy to the clutch motor 30 as energy expressed by an area Pc4. The clutch motor 30 accordingly outputs the torque Tc (=torque Td2) to the drive shaft 22, so that the drive shaft 22 is rotated at a driving point P2 defined by the revolving speed Nd2 and the torque Td2.

The power output apparatus 20 in the second state, wherein the first clutch 45 is on and the second clutch 46 is off, can perform a variety of operations in order to, for example, charge the battery 94 with an excess of electrical energy or discharge the battery 94 to supplement the insufficient electrical energy, other than the operation of converting all the power output from the engine 50 to a torque and outputting the torque to the drive shaft 22. Such charging and discharging operations are implemented by regulating the power output from the engine 50 (that is, the product of the torque Te and the revolving speed Ne), the electrical energy regenerated or consumed by the clutch motor 30, and the electrical energy consumed or regenerated by the assist motor 40.

In the power output apparatus 20 of the embodiment, both the first clutch 45 and the second clutch 46 may be in ON position or alternatively in OFF position. In case that both the clutches 45 and 46 are on, the rotor-rotating shaft 38 linked with the rotor 41 of the assist motor 40 is mechanically connected to both the crankshaft 56 and the drive shaft 22, so that the clutch motor 30 does not work at all. As shown in the schematic view of FIG. 9, this state is equivalent to the structure in which only the rotor 41 of the assist motor 40 is connected to both the crankshaft 56 and the drive shaft 22. In this state, the power output from the engine 50 is directly transmitted to the drive shaft 22, and the power output from the assist motor 40 is added to or subtracted from the transmitted power on the drive shaft 22.

In case both the clutches 45 and 46 are off, on the other hand, the rotor-rotating shaft 38 linked with the rotor 41 of the assist motor 40 is disconnected from both the crankshaft 56 and the drive shaft 22. As shown in the schematic view of FIG. 10, this state is equivalent to the structure in which the inner rotor 31 of the clutch motor 30 is connected to the crankshaft 56 while the outer rotor 33 of the clutch motor 30 is connected to the drive shaft 22. In this state, the power output from the engine 50 is transmitted to the drive shaft 22 via the electromagnetic coupling of the inner rotor 31 with the outer rotor 33 in the clutch motor 30. At the same time, electric power corresponding to the revolving speed difference Nc between the inner rotor 31 and the outer rotor 33 is regenerated or consumed by the clutch motor 30.

C. Operation Control
(1) Determination of Operation Mode

Figure 11:
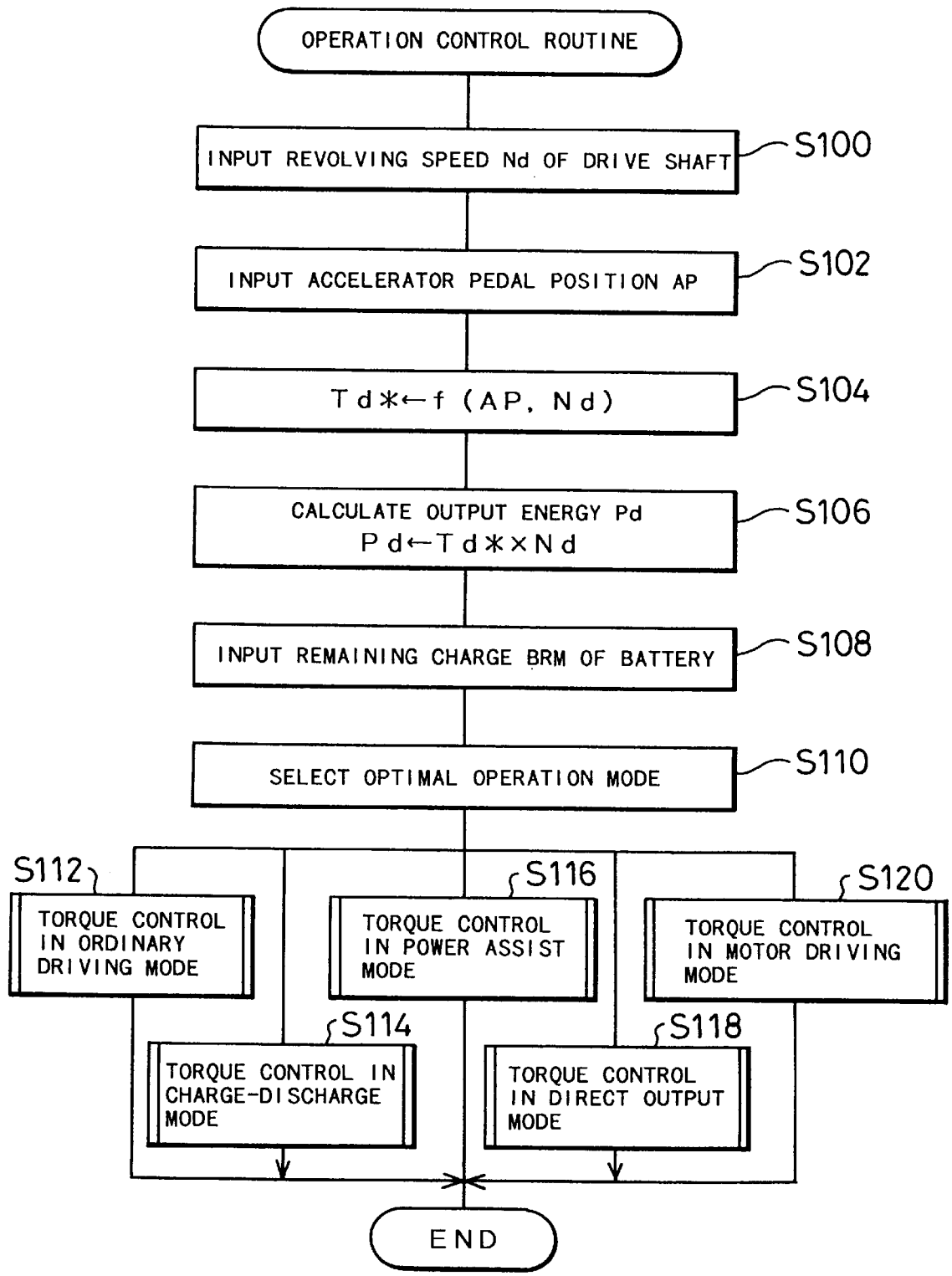
FIG. 11 is a flowchart showing an operation control routine executed by the control CPU 90 of the controller 80.

FIG. 11 is a flowchart showing an operation control routine executed to control the operation of the power output apparatus 20 of the embodiment constructed as discussed above. The operation control routine is repeatedly executed at predetermined time intervals (for example, at every 8 msec) after an instruction of starting the vehicle. When the program enters the operation control routine of FIG. 11, the control CPU 90 of the controller 80 first reads the revolving speed Nd of the drive shaft 22 at step S100. The revolving speed Nd of the drive shaft 22 maybe calculated from the rotational angle θd of the drive shaft 22 read from the resolver 37. The control CPU 90 then reads the accelerator pedal position AP detected by the accelerator pedal position sensor 64a at step S102. The driver steps on the accelerator pedal 64 when feeling insufficiency of the output torque. The value of the accelerator pedal position AP accordingly represents the desired output torque (that is, the torque to be output to the drive shaft 22) which the driver requires.

Figure 12:
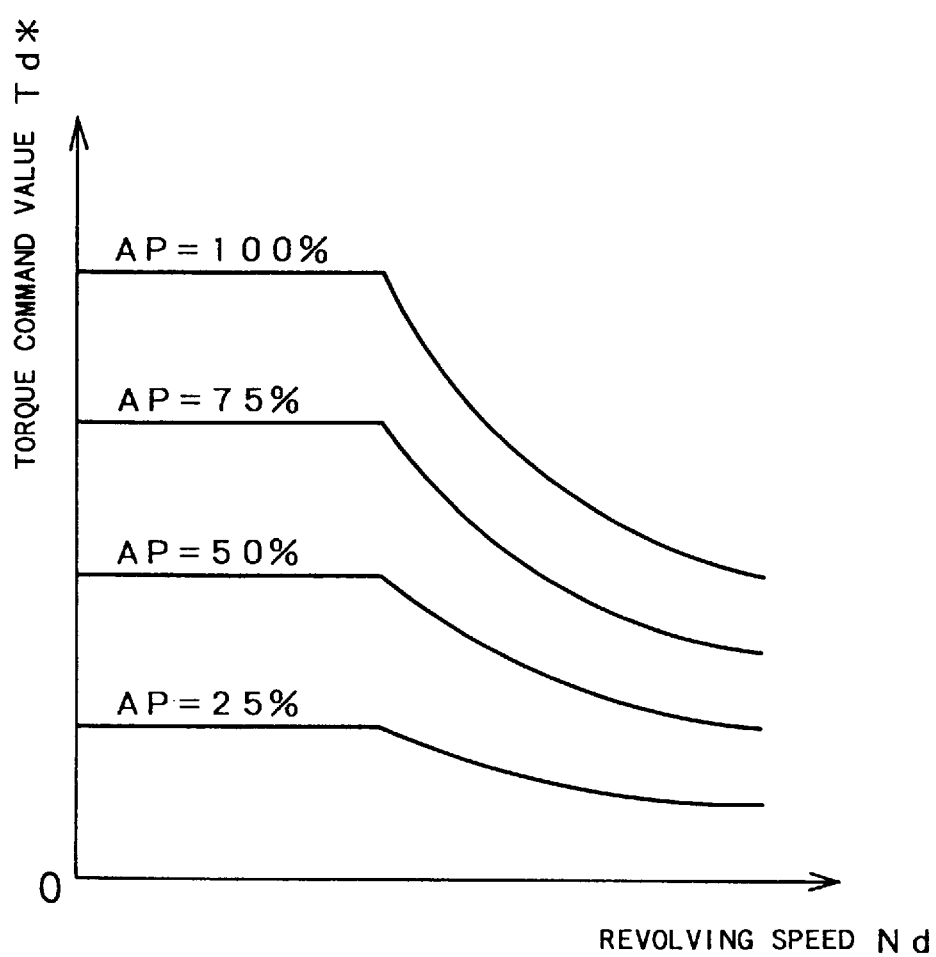
FIG. 12 illustrates a map representing the relationship between the torque command value Td*, the revolving speed Nd, and the accelerator pedal position AP.

At subsequent step S104, the control CPU 90 determines a torque command value Td* or a target torque to be output to the drive shaft 22, based on the input accelerator pedal position AP and revolving speed Nd of the drive shaft 22. In this embodiment, a map representing the relationship between the torque command value Td*, the revolving speed Nd of the drive shaft 22, and the accelerator pedal position AP is prepared in advance and stored in the ROM 90b. The torque command value Td* corresponding to the input accelerator pedal position AP and the input revolving speed Nd of the drive shaft 22 is read from the map. An example of the available maps is shown in FIG. 12.

At subsequent step S106, the control CPU90 calculates an energy Pd to be output to the drive shaft 22 from the torque command value Td* thus obtained and the input revolving speed Nd of the drive shaft 22 (Pd=Td*×Nd). The program then proceeds to step S108 to read the remaining charge BRM of the battery 94 measured with the remaining charge meter 99 and to step S110 to determine the operation mode. The determination of the operation mode is carried out according to an operation mode determination routine shown in the flowchart of FIG. 13. The operation mode determination routine selects an optimal operation mode of the power output apparatus 20 under the respective conditions based on the data read or calculated at steps S100 through S108 in the operation control routine of FIG. 11. The following describes a concrete procedure of determining the operation mode, based on the operation mode determination routine of FIG. 13.

When the program enters the operation mode determination routine, the control CPU 90 of the controller 80 first determines whether or not the remaining charge BRM of the battery 94 is within a specific range defined by a first threshold value BL and a second threshold value BH at step S130. When the remaining charge BRM is out of this specific range, the program determines the necessity for charge or discharge of the battery 94 and proceeds to step S132, at which a charge-discharge mode is selected as the optimal operation mode of the power output apparatus 20. The first threshold value BL and the second threshold value BH respectively represent a lower limit and an upper limit of the remaining charge BRM of the battery 94. In this embodiment, the first threshold value BL is set to be not less than a required amount of electric power for continuing the operation only with the assist motor 40 in a motor driving mode (described later) or the addition of electric power discharged from the battery 94 in a power assist mode (described later) for a predetermined time period. The second threshold value BH is, on the other hand, set to be not greater than a value obtained by subtracting an amount of electric power that is regenerated by the clutch motor 30 or the assist motor 40 when the vehicle stops from an ordinary running state, from the remaining charge BRM under the condition of full charge of the battery 94.

When the remaining charge BRM of the battery 94 is determined to be within the specific range defined by the first threshold value BL and the second threshold value BH at step S130, on the contrary, the program proceeds to step S134, at which the energy Pd to be output to the drive shaft 22 is compared with a maximum energy Pemax that can be output from the engine 50. When the energy Pd exceeds the maximum energy Pemax, the program determines the necessity for supplementing the insufficiency of the maximum energy Pemax output from the engine 50 by the energy stored in the battery 94 and proceeds to step S136, at which a power assist mode is selected as the optimal operation mode of the power output apparatus 20.

Figure 14:
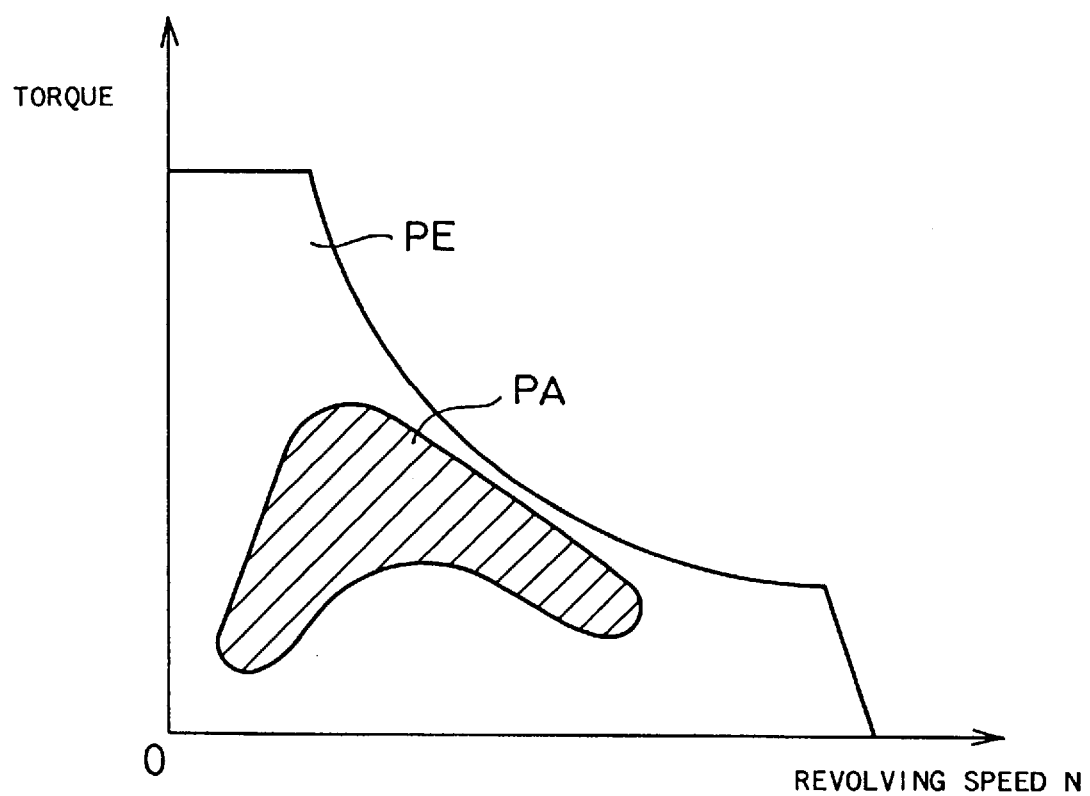
FIG. 14 shows an example of efficient driving range of the engine 50.

When the energy Pd to be output to the drive shaft 22 is equal to or less than the maximum energy Pemax that can be output from the engine 50 at step S134, on the other hand, the program goes to step S138, at which it is determined whether or not the torque command value Td* and the revolving speed Nd are within a predetermined range. When the torque command value Td* and the revolving speed Nd are within the predetermined range, a direct output mode, wherein both the first clutch 45 and the second clutch 46 are in ON position, is selected as the optimal operation mode of the power output apparatus 20 at step S140. The predetermined range herein represents a specific range that allows the engine 50 to be driven at a high efficiency. In accordance with a concrete procedure, a map representing an appropriate range to be controlled in the direct output mode among the driving points of the engine 50 is prepared in advance and stored in the ROM 90b. It is accordingly determined at step S138 whether or not the driving point defined by the torque command value Td* and the revolving speed Nd is within this appropriate range of the map. The appropriate range to be controlled in the direct output mode of the engine 50 is illustrated in FIG. 14. In the drawing of FIG. 14, a range PE represents the possible operation range of the engine 50 and a range PA the appropriate range to be controlled in the direct output mode. The appropriate range PA depends upon various conditions, such as the driving efficiency and the emission of the engine 50, and can be set in advance experimentally.

When it is determined that the torque command value Td* and the revolving speed Nd of the drive shaft 22 are out of the predetermined range at step S138, the program further proceeds to step S142, at which it is determined whether or not the energy Pd to be output to the drive shaft 22 is smaller than a predetermined energy PML and whether or not the revolving speed Nd of the drive shaft 22 is lower than a predetermined revolving speed NML. When both the answers are YES at step S142, the program goes to step S144 to set a motor driving mode, in which only the assist motor 40 is driven, as the optimal operation mode of the power output apparatus 20. The engine 50 lowers its efficiency under the condition of low revolving speed and small torque. The predetermined energy PML and the predetermined revolving speed NML are accordingly set as the energy Pd and the revolving speed Nd to make the engine 50 driven in a certain range, in which the driving efficiency of the engine 50 is smaller than a predetermined level. The concrete values of PML and NML are determined by taking into account the properties of the engine 50. When the energy Pd is not less than the predetermined energy PML or when the revolving speed Nd is not lower than the predetermined revolving speed NML at step S142, the program proceeds to step S146, at which an ordinary driving mode is selected as the optimal operation mode of the power output apparatus 20 to implement ordinary driving.

Figure 13:
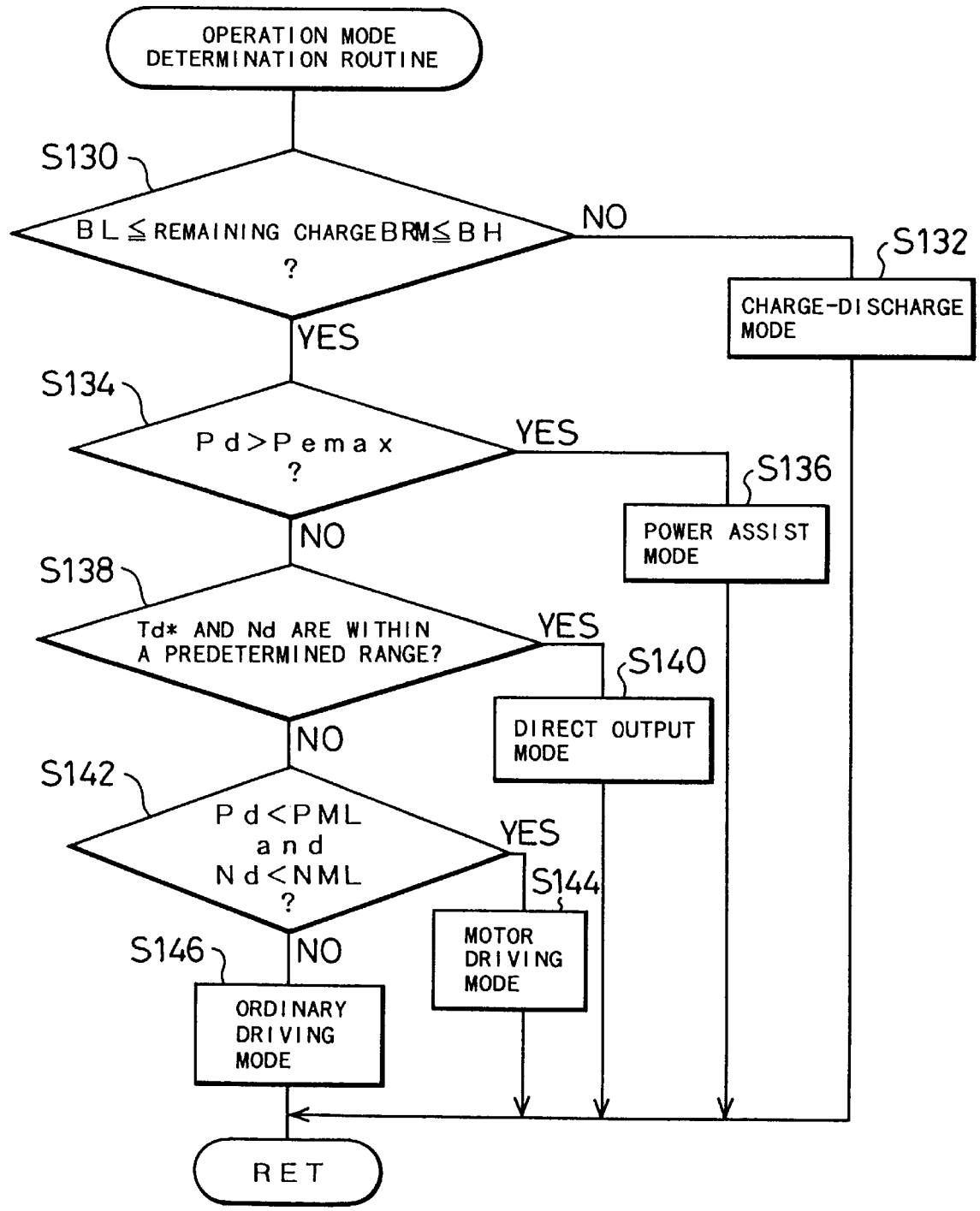
FIG. 13 is a flowchart showing an operation mode determination routine executed by the control CPU 90 of the controller 80.

Referring back to the operation control routine of FIG. 11, required processing is carried out, based on the results of the operation mode determination routine of FIG. 13. When the ordinary driving mode is selected as the optimal operation mode at step S10, a process of controlling the torque in the ordinary driving mode is executed at step S112. When the charge-discharge mode is selected, a process of controlling the torque in the charge-discharge mode is executed at step S114. When the power assist mode is selected, a process of controlling the torque in the power assist mode is executed at step S116. When the direct output mode is selected, a process of controlling the torque in the direct output mode is executed at step S118. When the motor driving mode is selected, a process of controlling the torque in the motor driving mode is executed at step S120. For the convenience of illustration, these torque control processes are shown as the steps of the operation control routine in this embodiment. In accordance with a concrete procedure, however, when the optimum operation mode is set according to the operation mode determination routine, the torque control routine in the selected operation mode is repeatedly executed at predetermined time intervals (for example, at every 4 msec) independently of and at a different timing from the operation control routine. The following describes concrete procedures of these toque control processes.

(2) Torque Control Process in Ordinary Driving Mode

Figure 15:
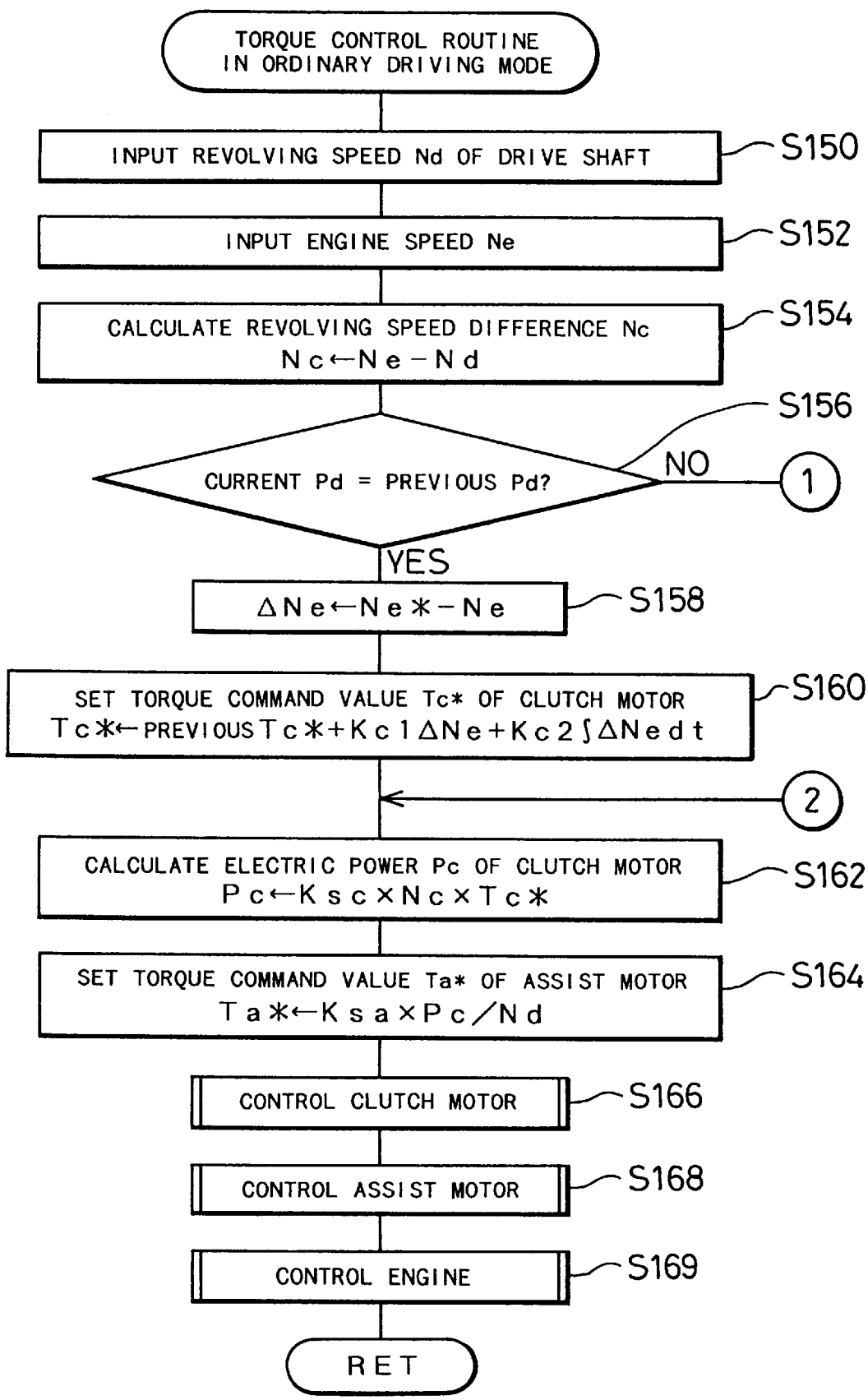
FIGS. 15 and 16 are flowcharts showing a torque control routine in the ordinary driving mode executed by the control CPU 90 of the controller 80.
Figure 16:
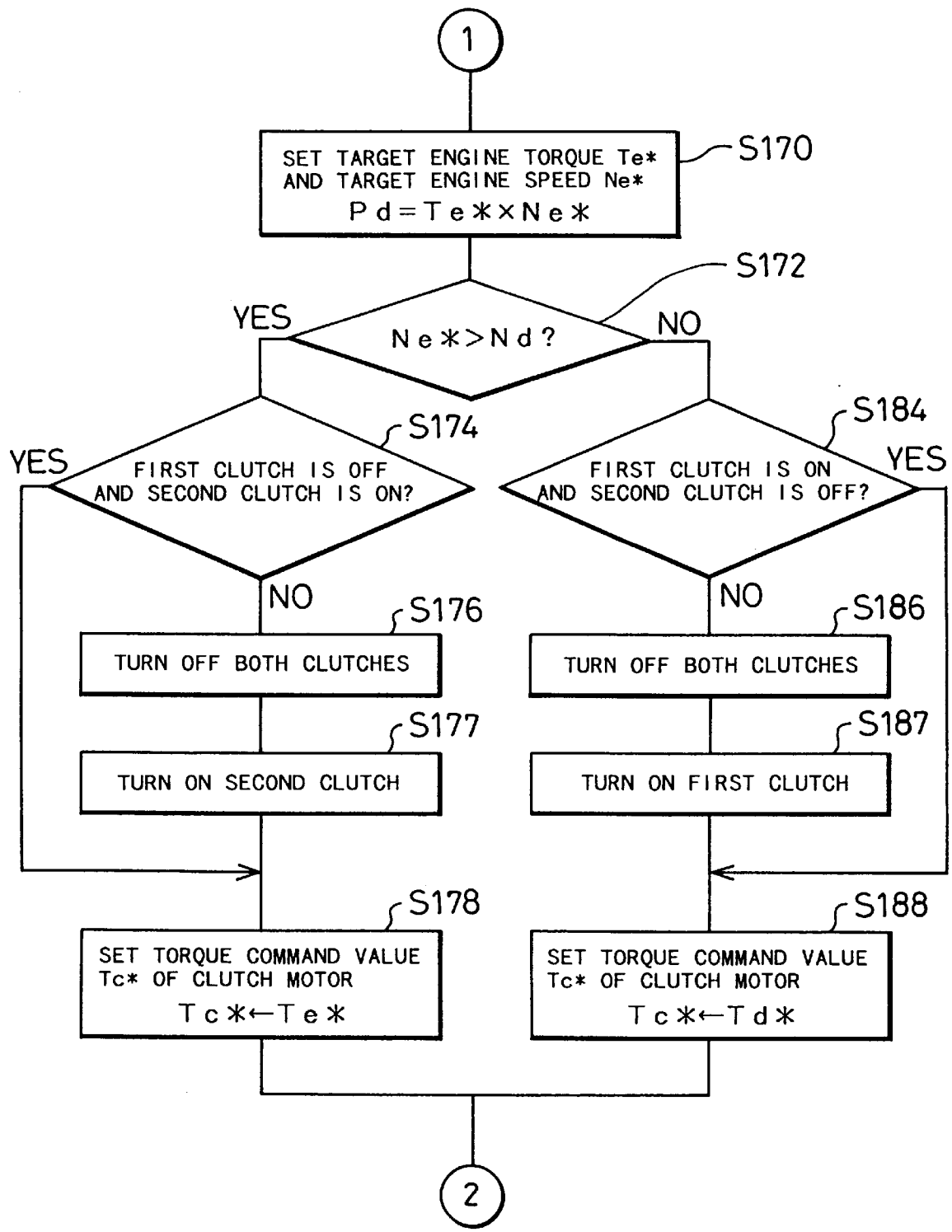

The torque control in the ordinary driving mode at step S112 in the flowchart of FIG. 11 is carried out according to a torque control routine in the ordinary driving mode shown in the flowcharts of FIGS. 15 and 16. When the program enters the routine of FIG. 15, the control CPU 90 of the controller 80 first reads the revolving speed Nd of the dive shaft 22 and the revolving speed Ne of the engine 50 at steps S150 and S152. The revolving speed Ne of the engine 50 may be calculated from the rotational angle θe of the crankshaft 56 read from the resolver 57 attached to the crankshaft 56 or directly measured with the speed sensor 76 mounted on the distributor 60. In case that the speed sensor 76 is used, the control CPU 90 receives data of the revolving speed Ne from the EFIECU 70 connecting with the speed sensor 76 through communication. The control CPU 90 then computes a revolving speed difference Nc between the input revolving speed Nd of the drive shaft 22 and the input revolving speed Ne of the engine 50 (Nc=Ne−Nd) at step S154.

At subsequent step S156, the control CPU 90 compares the current value of energy Pd calculated at step S106 in the operation control routine of FIG. 11 with a previous value of energy Pd used in the previous cycle of this routine. The 'previous cycle' herein represents the last time when the torque control routine in the ordinary driving mode shown in FIG. 15 is activated as the processing of step S112 is continuously executed in the operation control routine of FIG. 11. When the current value of energy Pd is different from the previous value of energy Pd, the program executes the processing of steps S170 through S188 in the flowchart of FIG. 16 to set a target torque Te* and a target revolving speed Ne* of the engine 50 and the torque command value Tc* of the clutch motor 30. When the current value of energy Pd is identical with the previous value of energy Pd, on the other hand, the program executes the processing of steps S158 and S160 in the flowchart of FIG. 15 to set the torque command value Tc* of the clutch motor 30. The following describes first the processing executed when the current value of energy Pd is different from the previous value of energy Pd and then the processing executed when the current value of energy Pd is identical with the previous value of energy Pd.

In case that the current value of energy Pd is different from the previous value of energy Pd, the control CPU 90 sets the target torque Te* and the target revolving speed Ne* of the engine 50 based on the amount of energy Pd to be output to the drive shaft 22 at step S170. When it is assumed that all the required energy Pd output to the drive shaft 22 is supplied by the engine 50, the energy output from the engine 50 is equal to the product of the torque Te and the revolving speed Ne of the engine 50, so that the relationship between the output energy Pd, the target engine torque Te*, and the target engine speed Ne* can be defined as Pd=Te*× Ne*. There are, however, numerous combinations of the target torque Te* and the target revolving speed Ne* of the engine 50 satisfying the above relationship. In this embodiment, favorable combinations of the target torque Te* and the target revolving speed Ne* of the engine 50 are experimentally or otherwise determined in advance for the respective amounts of energy Pd. In such favorable combinations, the engine 50 is driven at the highest possible efficiency and the driving state of the engine 50 is smoothly varied with a variation in amount of energy Pd. The predetermined favorable combinations are stored in the form of a map in the ROM 90b. In practice, the combination of the target torque Te* and the target revolving speed Ne* of the engine 50 corresponding to the amount of energy Pd is read from the map at step S170. The following gives a further description of the map.

Figure 17:
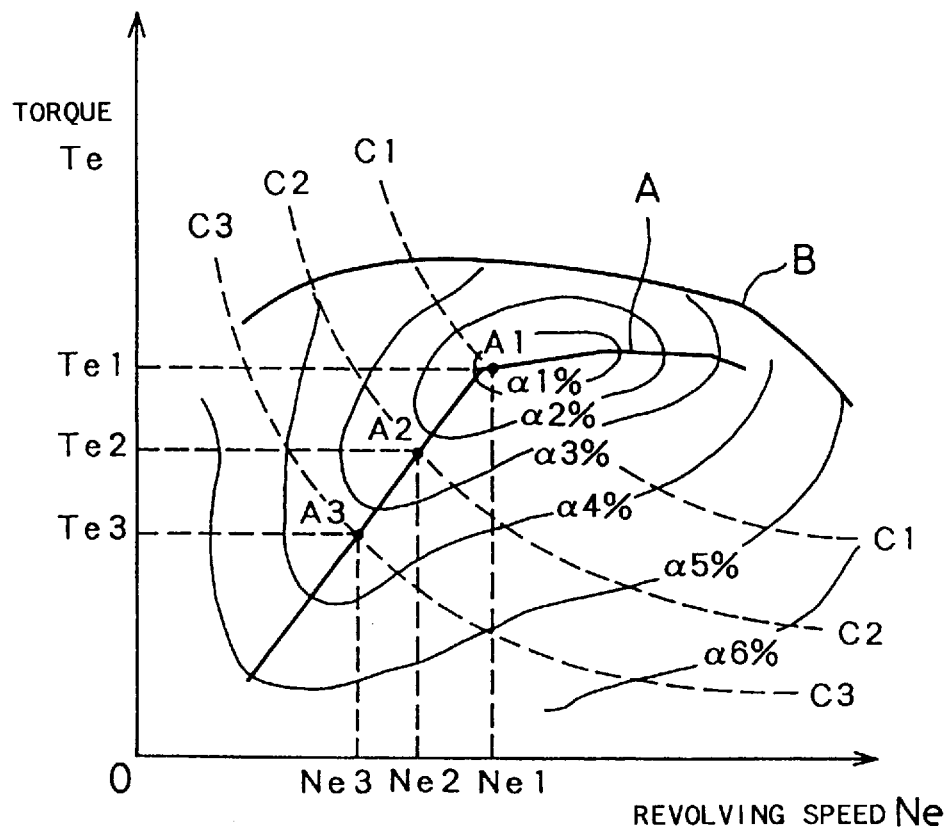
FIG. 17 is a graph showing the relationship between the driving point and the efficiency of the engine 50.

FIG. 17 is a graph showing the relationship between the driving point of the engine 50 and the efficiency of the engine 50. The curve B in FIG. 17 represents a boundary of an engine-operable range, in which the engine 50 can be driven. In the engine-operable range, efficiency curves, such as curves α1 through α6, can be drawn by successively joining the driving points having the identical efficiency under the condition of certain characteristics of the engine 50. In the engine-operable range, constant energy curves expressed as the product of the torque Te and the revolving speed Ne, such as curves C1—C1 through C3—C3, can also be drawn. The graph of FIG. 18 shows the efficiency of the respective driving points along the curves C1—C1 through C3—C3 of the constant energy Pe plotted against the revolving speed Ne of the engine 50.

Figure 18:
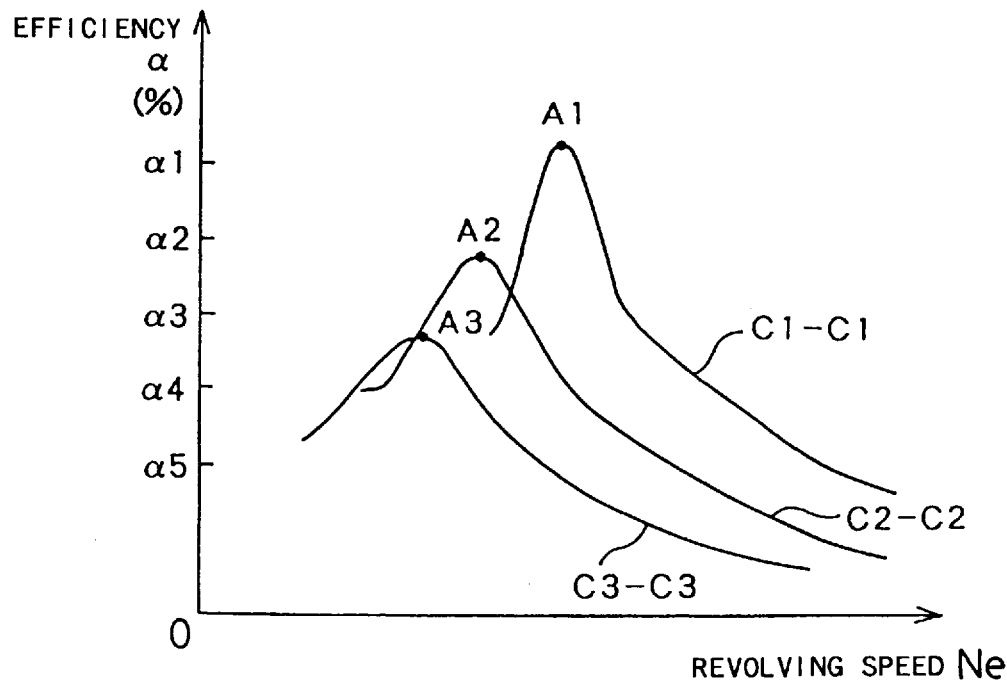
FIG. 18 is a graph showing the relationship between the efficiency and the revolving speed Ne of the engine 50 at the respective driving points along the curves of constant energy Pe.

Referring to FIG. 18, even when the energy Pe output from the engine 50 is constant, the efficiency of the engine 50 is significantly varied by the driving point of the engine 50. On the constant energy curve C1—C1, for example, the efficiency of the engine 50 reaches its maximum when the engine 50 is driven at a driving point A1 (torque Te1 and revolving speed Ne1). Such a driving point attaining the highest possible efficiency exists on each curve of constant energy Pe; a driving point A2 on the constant energy curve C2—C2 and a driving point A3 on the constant energy curve C3—C3. The curve A in FIG. 17 is obtained by joining such driving points attaining the highest possible efficiency of the engine 50 for the respective amounts of energy Pe output from the engine 50 by a continuous curve. In this embodiment, the map representing the relationship between each driving point (torque Te and revolving speed Ne) on the curve A and the amount of energy Pe is used at step S170 in the flowchart of FIG. 16 in order to set the target torque Te* and the target revolving speed Ne* of the engine 50.

The curve A should be continuous because of the following reason. In case that discontinuous curves are used to set the driving points of the engine 50 against a variation in amount of energy Pe, the driving state of the engine 50 is abruptly varied with a variation in amount of energy Pe crossing over the discontinuous driving points. The abrupt variation may prevent the driving state from being smoothly shifted to a target level, thereby knocking or even stopping the vehicle. Each driving point on the continuous curve A may accordingly not correspond to the driving point attaining the highest possible efficiency on the curve of constant energy Pe.

After setting the target torque Te* and the target revolving speed Ne* of the engine 50, the control CPU 90 compares the target engine speed Ne* with the revolving speed Nd of the drive shaft 22 at step S172. In case that the target engine speed Ne* is higher than the revolving speed Nd of the drive shaft 22, the program carries out the processing of steps S174 through S177 and operates the first clutch 45 and the second clutch 46 in order to enable the first clutch 45 to be set in OFF position and the second clutch 46 to be set in ON position (that is, to attain the structure shown in the schematic view of FIG. 3). The program then goes to step S178 to set the target torque Te* of the engine 50 to the torque command value Tc* of the clutch motor 30. The following describes a concrete procedure of operating the first clutch 45 and the second clutch 46. At step S174, the control CPU 90 detects the current states of the clutches 45 and 46 and determines whether or not the current states of the clutches 45 and 46 are identical with the target states. When the current states of the clutches 45 and 46 are not identical with the target states, both the clutches 45 and 46 are turned off at step S176, and only the second clutch 46 is turned on at subsequent step S177. Both the clutches 45 and 46 are turned off, in order to prevent the undesirable state, in which the crankshaft 56 is mechanically connected to the drive shaft 22 via the clutches 45 and 46 both in ON position and the engine 50 can not be driven freely. The target engine torque Te* is set to the torque command value Tc* of the clutch motor 30, because of the following reason. In the structure shown in the schematic view of FIG. 3, the torque Tc of the clutch motor 30 is identical with the loading torque Te of the engine 50. The clutch motor 30 is thus required to output a loading torque identical with the target engine torque Te*, in order to enable the engine 50 to be driven stably at a driving point defined by the target engine torque Te* and the target engine speed Ne*.

Figure 4:
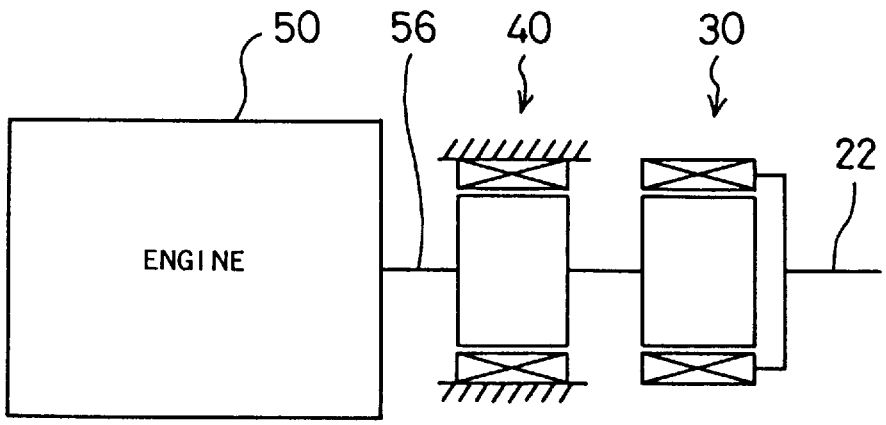
FIG. 4 schematically shows structure of the power output apparatus 20 of the embodiment, wherein the first clutch 45 is in ON position and the second clutch 46 is in OFF position.

In case that the target engine speed Ne* is not higher than the revolving speed Nd of the drive shaft 22 at step S172, the program carries out the processing of steps S184 through S187 and operates the first clutch 45 and the second clutch 46 in order to enable the first clutch 45 to be set in ON position and the second clutch 46 to be set in OFF position (that is, to attain the structure shown in the schematic view of FIG. 4). The program then goes to step S188 to set an output torque command value Td*, which is to be output to the drive shaft 22, to the torque command value Tc* of the clutch motor 30. The concrete procedure of operating the first clutch 45 and the second clutch 46 is similar to that executed when the target engine speed Ne* is higher than the revolving speed Nd. At step S184, the control CPU 90 detects the current states of the clutches 45 and 46 and determines whether or not the current states of the clutches 45 and 46 are identical with the target states. When the current states of the clutches 45 and 46 are not identical with the target states, both the clutches 45 and 46 are turned off at step S186, and only the first clutch 45 is turned on at subsequent step S187. The output torque command value Td* to be output to the drive shaft 22 is set to the torque command value Tc* of the clutch motor 30, because the torque Tc of the clutch motor 30 is directly applied as the torque Td of the drive shaft 22 in the structure shown in the schematic view of FIG. 4.

Figure 3:
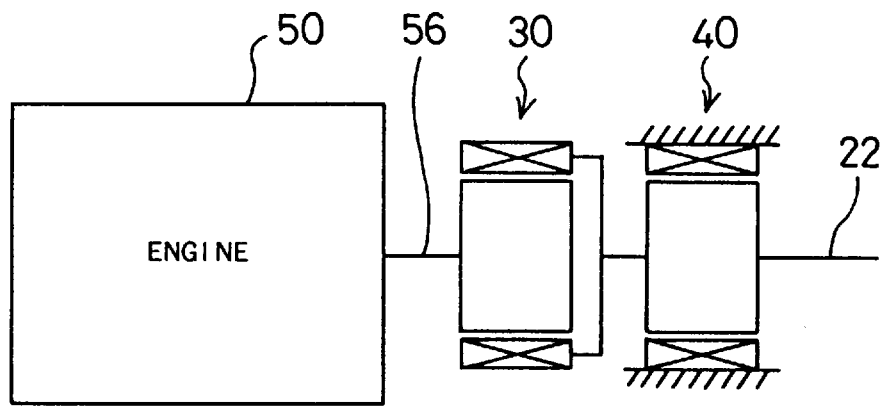
FIG. 3 schematically shows structure of the power output apparatus 20 of the embodiment, wherein a first clutch 45 is in OFF position and a second clutch 46 is in ON position.

The following describes the reasons why the first clutch 45 and the second clutch 46 are operated in order to enable the power output apparatus 20 of the embodiment to have the structure shown in FIG. 3 when the target revolving speed Ne* of the engine 50 is higher than the revolving speed Nd of the drive shaft 22 and to enable the power output apparatus 20 to have the structure shown in FIG. 4 when the target revolving speed Ne* is not higher than the revolving speed Nd. Once the target revolving speed Ne* of the engine 50 is set, a control procedure of the engine 50 (discussed later) enables the engine 50 to be driven at the target revolving speed Ne*. Namely the state in which the target revolving speed Ne* of the engine 50 is higher than or lower than the revolving speed Nd of the drive shaft 22 is equivalent to the state in which the revolving speed Ne of the engine 50 is higher than or lower than the revolving speed Nd of the drive shaft 22.

In case that the revolving speed Ne of the engine 50 is higher than the revolving speed Nd of the drive shaft 22, the torque conversion shown in FIG. 5 is carried out in the structure of FIG. 3 and the torque conversion shown in FIG. 7 is carried out in the structure of FIG. 4. Among these torque conversion processes, the torque conversion shown in FIG. 5 (in the structure of FIG. 3) results in the smaller amounts of electric power regenerated by the clutch motor 30 and consumed by the assist motor 40. Namely the electric power Pc1 regenerated by the clutch motor 30 and the electric power Pa1 consumed by the assist motor 40 in the torque conversion of FIG. 5 are smaller than the corresponding electric powers Pc3 and Pa3 in the torque conversion of FIG. 7 by an area (Ta×Nc) in which the electric powers Pc3 and Pa3 overlap each other. In general, the energy loss by the motor increases with an increase in electric power regenerated or consumed by the motor. Compared with the torque conversion shown in FIG. 7, the torque conversion shown in FIG. 5 can decrease the energy loss by the clutch motor 30 and the assist motor 40, thereby enhancing the energy efficiency of the whole power output apparatus 20. Because of this reason, when the target revolving speed Ne* of the engine 50 is higher than the revolving speed Nd of the drive shaft 22, the structure of the embodiment turns off the first clutch 45 and on the second clutch 46, so as to attain the structure shown in the schematic view of FIG. 3.

In case that the revolving speed Ne of the engine 50 is not higher than the revolving speed Nd of the drive shaft 22, on the contrary, the torque conversion shown in FIG. 6 is carried out in the structure of FIG. 3 and the torque conversion shown in FIG. 8 is carried out in the structure of FIG. 4. By the same considerations as those when the revolving speed Ne of the engine 50 is higher than the revolving speed Nd of the drive shaft 22, compared with the torque conversion shown in FIG. 6, the torque conversion shown in FIG. 8 (in the structure of FIG. 4) results in the smaller amounts of electric power consumed by the clutch motor 30 and regenerated by the assist motor 40, and can decrease the energy loss by the clutch motor 30 and the assist motor 40, thereby enhancing the energy efficiency of the whole power output apparatus 20. Because of this reason, when the target revolving speed Ne* of the engine 50 is not higher than the revolving speed Nd of the drive shaft 22, the structure of the embodiment turns on the first clutch 45 and off the second clutch 46, so as to attain the structure shown in the schematic view of FIG. 4.

Referring back to the flowchart of FIG. 15, in case that the current value of energy Pd is identical with the previous value of energy Pd at step S156, the control CPU 90 subtracts the actual revolving speed Ne of the engine 50 from the target revolving speed Ne* to calculate a revolving speed difference or deviation αNe at step S158. The control CPU 90 then calculates a value Tc* from the revolving speed difference αNe thus obtained according to Equation (1) given below and sets the calculated value Tc* as the torque command value Tc* of the clutch motor 30 at step S160. The second term in the right side of Equation (1) is a proportional term to cancel the deviation of the actual revolving speed Ne from the target revolving speed Ne*, and the third term is an integral term to cancel a stationary deviation. In the stationary state (that is, when the deviation αNe of the actual revolving speed Ne from the target revolving speed Ne* is equal to zero), the previous torque command value Tc* is set to the torque command value Tc* of the clutch motor 30. Kc1 and Kc2 in Equation (1) denote proportional constants. The procedure of setting the torque command value Tc* of the clutch motor 30 in this manner enables the engine 50 to be driven stably at the driving point defined by the target engine torque Te* and the target engine speed Ne*.

$$Tc^* \leftarrow previousTc^* + Kc1\Delta Ne + Kc2\int \Delta Nedt \qquad (1)$$

After operating the clutches 45 and 46 and setting the torque command value Tc* of the clutch motor 30, the control CPU 90 calculates an electric power Pc regenerated or consumed by the clutch motor 30 according to Equation (2) given below at step S162. The control CPU 90 then calculates a value Ta* from the electric power Pc thus obtained according to Equation (3) given below and sets the calculated value Ta* as the torque command value Ta* of the assist motor 40 at step S164. Ksc in Equation (2) denotes the efficiency of the clutch motor 30, and Ksa in Equation (3) denotes the efficiency of the assist motor 40. The electric power Pc calculated according to Equation (2) represents the amount of electric power regenerated by the clutch motor 30 when it is determined that the target revolving speed Ne* of the engine 50 is higher than the revolving speed Nd of the drive shaft 22 at step S172 in the flowchart of FIG. 16 and the first clutch 45 and the second clutch 46 are operated to attain the structure shown in FIG. 3. The electric power Pc represents the amount of electric power consumed by the clutch motor 30, on the other hand, when it is determined that the target revolving speed Ne* is not higher than the revolving speed Nd at step S172 and the first clutch 45 and the second clutch 46 are operated to attain the structure shown in FIG. 4.

$$Pc = Ksc \times Nc \times Tc \qquad (2)$$

$$Ta^* = Ksa \times Pc/Nd \qquad (3)$$

After setting the target torque Te* and the target revolving speed Ne* of the engine 50 and the torque command values Tc* and Ta* of the clutch motor 30 and the assist motor 40, the program proceeds to steps S166, S168, and S169 to respectively control the clutch motor 30, the assist motor 40, and the engine 50 based on these values. For the convenience of illustration, the control operations of the clutch motor 30, the assist motor 40, and the engine 50 are shown as separate steps in the torque control routine of this embodiment. In the actual procedure, however, these control operations are carried out independently of this routine and comprehensively. By way of example, the control CPU 90 controls the clutch motor 30 and the assist motor 40 in parallel at a different timing from this routine by utilizing an interrupting process, while transmitting an instruction to the EFIECU 70 through communication in order to allow the EFIECU 70 to control the engine 50 in parallel.

Figure 19:
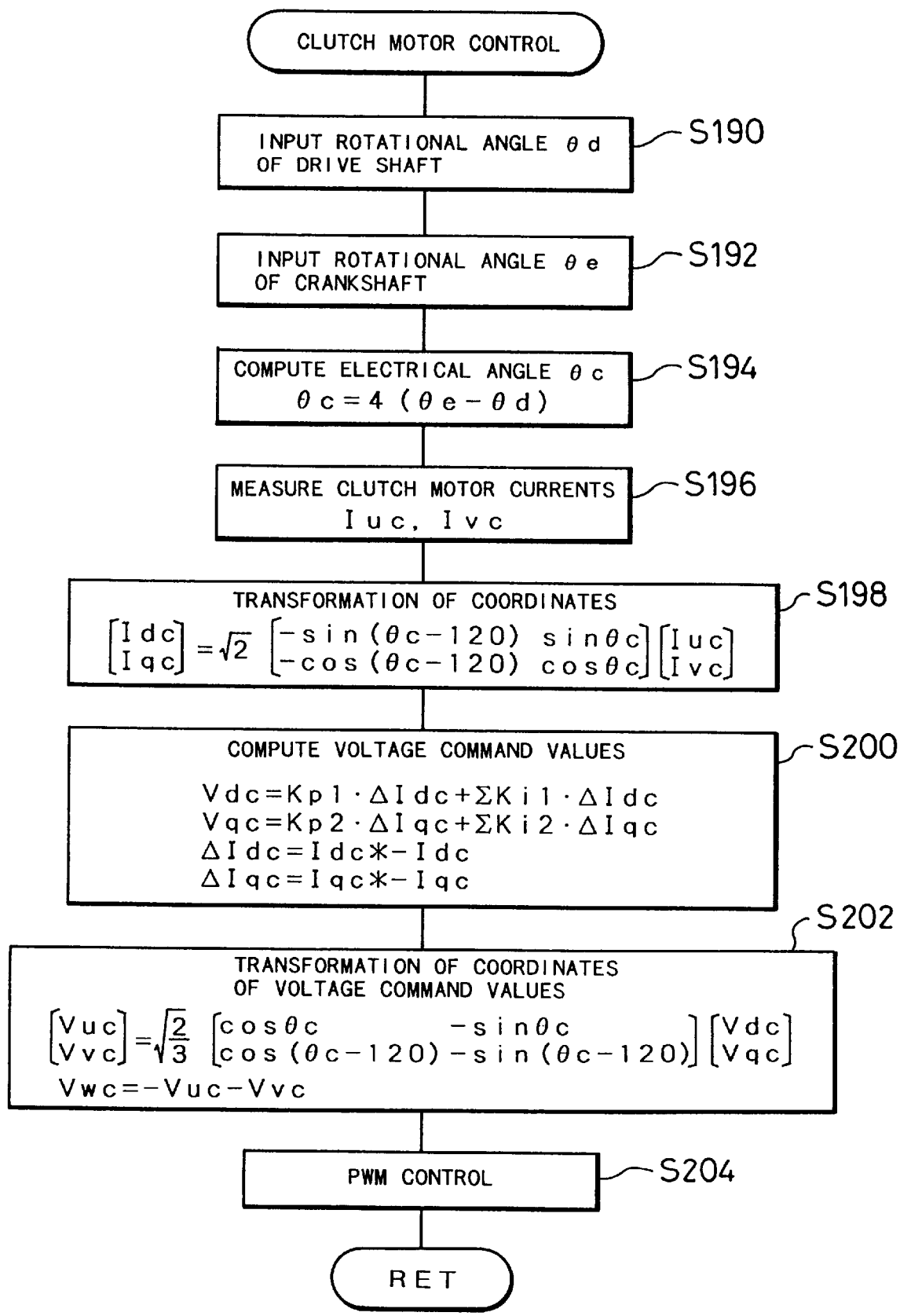
FIG. 19 is a flowchart showing a clutch motor control routine executed by the control CPU 90 of the controller 80.

The control procedure of the clutch motor 30 executed at step S166 in the flowchart of FIG. 15 follows a clutch motor control routine shown in the flowchart of FIG. 19. When the program enters the clutch motor control routine, the control CPU 90 of the controller 80 first reads the rotational angle θd of the drive shaft 22 from the resolver 37 and the rotational angle θe of the crankshaft 56 of the engine 50 from the resolver 57 at steps S190 and S192. The control CPU 90 then computes an electrical angle θc of the clutch motor 30 from the input rotational angles θe and θd at step S194. A synchronous motor having four pairs of poles is used as the clutch motor 30 in this embodiment, and the electrical angle θc is thus obtained by an equation of θc=4(θe−θd).

The program proceeds to step S196, at which the control CPU 90 reads the clutch motor currents Iuc and Ivc, which respectively flow through the U phase and V phase of the three-phase coils 34 in the clutch motor 30 and are measured by the ammeters 95 and 96. Although the electric currents naturally flow through all the three phases U, V, and W, measurement is required only for the electric currents passing through the two phases since the sum of the currents is equal to zero. At subsequent step S198, the control CPU 90 executes transformation of coordinates (three-phase to two-phase transformation) using the values of electric currents flowing through the three phases obtained at step S196. The transformation of coordinates maps the values of electric currents flowing through the three phases to the values of electric currents passing through d and q axes of the permanent magnet-type synchronous motor and is implemented by the operation of Equation (4) given below. The transformation of coordinates is carried out because the electric currents flowing through the d and q axes are essential quantities for the torque control in the permanent magnet-type synchronous motor. Alternatively, the torque control may be executed directly with the electric currents flowing through the three phases.

$$\begin{bmatrix} Idc \\ Iqc \end{bmatrix} = \sqrt{2} \begin{bmatrix} -\sin(\theta c - 120) & \sin \theta c \\ -\cos(\theta c - 120) & \cos \theta c \end{bmatrix} \begin{bmatrix} Iuc \\ Ivc \end{bmatrix} \quad (4)$$

After the transformation to the electric currents of two axes, the control CPU 90 computes deviations of electric currents Idc and Iqc actually flowing through the d and q axes from electric current command values Idc* and Iqc* of the respective axes, which are calculated from the torque command value Tc* of the clutch motor 30, and subsequently determines voltage command values Vdc and Vqc with respect to the d and q axes at step S200. In accordance with a concrete procedure, the control CPU 90 executes arithmetic operations of Equations (5) and Equations (6) given below. In Equations (5) and (6), Kp1, Kp2, Ki1, and Ki2 represent coefficients, which are adjusted to be suited to the characteristics of the motor applied. Each voltage command value Vdc (Vqc) includes a part in proportion to the deviation ΔI from the current command value I* (the first term in the right side of Equation (6)) and a summation of historical data of the deviations ΔI for 'i' times (the second term in the right side).

$$\Delta Idc = Idc^* - Idc$$

$$\Delta Iqc = Iqc^* - Iqc \quad (5)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (6)$$

The control CPU 90 then re-transforms the coordinates of the voltage command values thus obtained (two-phase to three-phase transformation) at step S202. This corresponds to an inverse of the transformation executed at step S198. The inverse transformation determines voltages Vuc, Vvc, and Vwc actually applied to the three-phase coils 34 as expressed by Equations (7) given below:

$$\begin{bmatrix} Vuc \\ Vvc \end{bmatrix} = \sqrt{\frac{2}{3}} \begin{bmatrix} \cos \theta c & -\sin \theta c \\ \cos(\theta c - 120) & -\sin(\theta c - 120) \end{bmatrix} \begin{bmatrix} Vdc \\ Vqc \end{bmatrix} \quad (7)$$

$$Vwc = -Vuc - Vvc$$

The actual voltage control is accomplished by on-off operation of the transistors Tr1 through Tr6 in the first driving circuit 91. At step S204, the on- and off-time of the transistors Tr1 through Tr6 in the first driving circuit 91 is PWM (pulse width modulation) controlled in order to attain the voltage command values Vuc, Vvc, and Vwc determined by Equations (7) above.

The torque command value Tc* of the clutch motor 30 is positive when a positive torque is applied to the drive shaft 22 in the direction of rotation of the crankshaft 56. By way of example, it is assumed that a positive value is set to the torque command value Tc*. When the revolving speed Ne of the engine 50 is higher than the revolving speed Nd of the drive shaft 22 on this assumption, that is, when the revolving speed difference Nc (=Ne−Nd) is positive, the clutch motor 30 is controlled to carry out the regenerative operation and produce a regenerative electric current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 in the first driving circuit 91 are controlled to enable a positive torque to be applied to the drive shaft 22 by the combination of the magnetic field generated by the permanent magnets 32 set on the inner rotor 31 with the revolving magnetic field generated by the electric currents flowing through the three-phase coils 34 mounted on the outer rotor 33 of the clutch motor 30. The identical switching control is executed for both the regenerative operation and the power operation of the clutch motor 30 as long as the sign of the torque command value Tc* is not changed. The clutch motor control routine of FIG. 19 is thus applicable to both the regenerative operation and the power operation. Under the condition of braking the drive shaft 22 or moving the vehicle in reverse, the torque command value Tc* has the negative sign. The clutch motor control routine of FIG. 19 is also applicable to the control procedure under such conditions, when the electrical angle θc obtained at step S194 is varied in the reverse direction.

Figure 20:
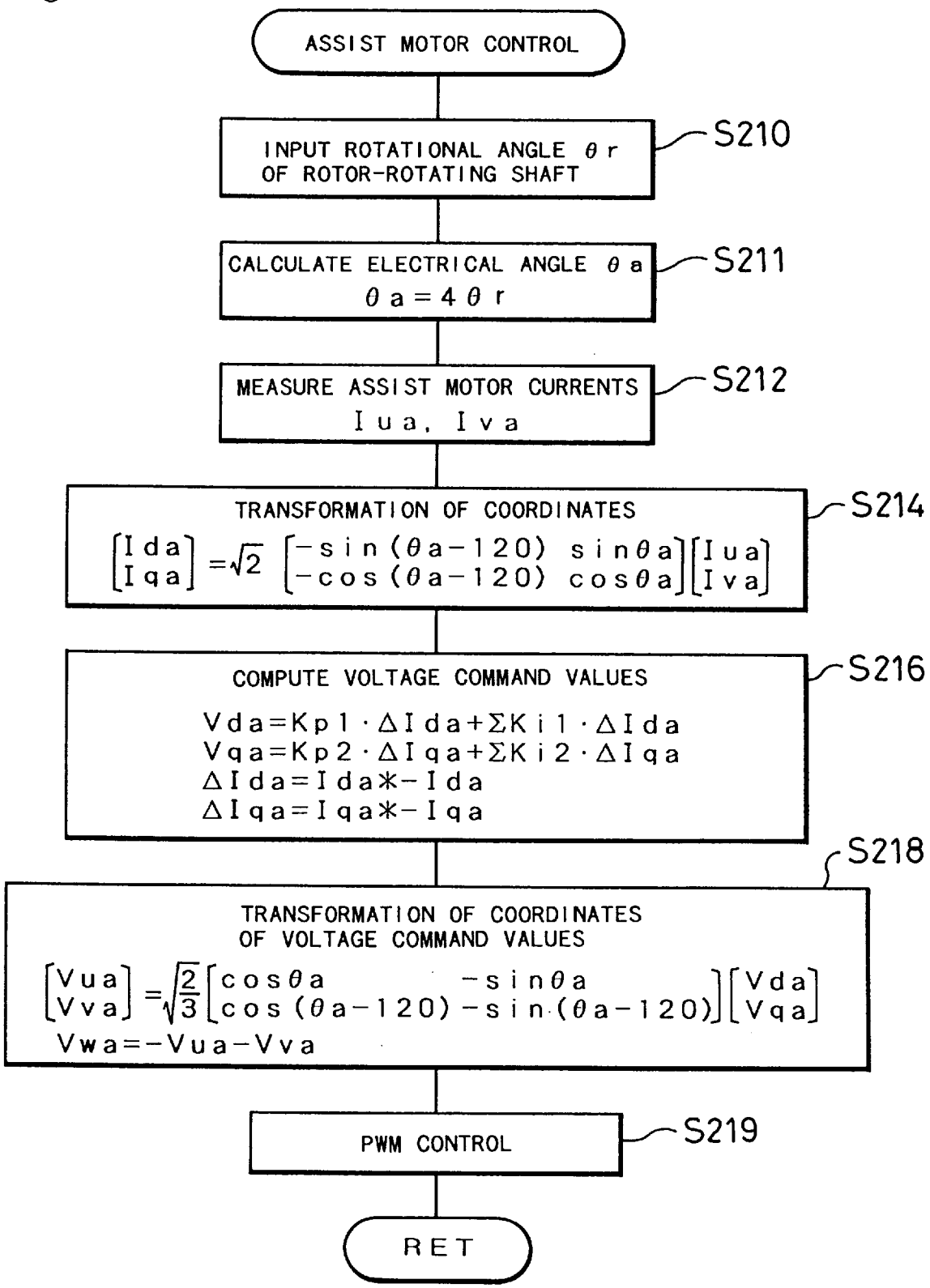
FIG. 20 is a flowchart showing an assist motor control routine executed by the control CPU 90 of the controller 80.

The control procedure of the assist motor 40 executed at step S168 in the flowchart of FIG. 15 follows an assist motor control routine shown in the flowchart of FIG. 20. When the program enters the assist motor control routine, the control CPU 90 of the controller 80 first reads the rotational angle θr of the rotor-rotating shaft 38 from the resolver 47 at step S210, and calculates an electrical angle θa of the assist motor 40 from the measured rotational angle θr at step S211. In this embodiment, a synchronous motor having four pairs of poles is used as the assist motor 40, and the electrical angle θa is thus obtained by an equation of θa=4θr. The control CPU 90 then receives data of assist motor currents Iua and Iva at step S212, which respectively flow through the U phase and V phase of the three-phase coils 44 in the assist motor 40 and are measured with the ammeters 97 and 98. The control CPU 90 subsequently executes transformation of coordinates for the electric currents of the three phases at step S214, computes voltage command values Vda and Vqa at step S216, and executes inverse transformation of coordinates for the voltage command values at step S218. At subsequent step S219, the control CPU 90 determines the on- and off-time of the transistors Tr11 through Tr16 in the second driving circuit 92 for PWM (pulse width modulation) control. The processing executed at steps S214 through S219 is similar to that executed at steps S198 through S204 of the clutch motor control routine shown in the flowchart of FIG. 19.

The torque command value Ta* of the assist motor 40 is obtained by the arithmetic operations including the revolving speed difference Nc and the torque command value Tc* of the clutch motor 30 and executed at steps S162 and S164 in the flowchart of FIG. 15. In case that the drive shaft 22 rotates in the direction of rotation of the crankshaft 56, when the revolving speed Ne of the engine 50 is higher than the revolving speed Nd of the drive shaft 22, that is, when the revolving speed difference Nc is positive, a positive value is set to the torque command value Ta* and the assist motor 40 thereby carries out the power operation. When the revolving speed Ne of the engine 50 is lower than the revolving speed Nd of the drive shaft 22, that is, when the revolving speed difference Nc is negative, on the contrary, a negative value is set to the torque command value Ta* and the assist motor 40 thereby carries out the regenerative operation. Like the control of the clutch motor 30, the assist motor control routine shown in the flowchart of FIG. 20 is applicable to both the power operation and the regenerative operation of the assist motor 40. This is also true when the drive shaft 22 rotates in reverse of the rotation of the crankshaft 56. It is here assumed that the torque command value Ta* of the assist motor 40 is positive when a positive torque is applied to the rotor-rotating shaft 38 in the direction of rotation of the crankshaft 56.

The control of the engine 50 (step S169 in the flowchart of FIG. 15) is executed in the following manner. In order to enable the engine 50 to be stationarily driven at the driving point defined by the target engine torque Te* and the target engine speed Ne* set at step S170 in the flowchart of FIG. 16, the control CPU 90 regulates the torque Te and the revolving speed Ne of the engine 50. In accordance with a concrete procedure, the control CPU 90 of the controller 80 controls the torque Tc of the clutch motor 30 as the loading torque of the engine 50, while transmitting the target engine torque Te* and the target engine speed Ne* to the EFIECU 70 through communication and enabling the EFIECU 70 to regulate the position of the throttle valve 66, fuel injection from the fuel injection valve 51, and ignition with the ignition plug 62 based on the target engine torque Te* and the target engine speed Ne*. This procedure allows the engine 50 to be driven at the driving point defined by the target torque Te* and the target revolving speed Ne*. Since the output torque Te and the revolving speed Ne of the engine 50 vary with a variation in its loading torque, the control only with the EFIECU 70 does not enable the engine 50 to be driven at the driving point of the target torque Te* and the target revolving speed Ne*. It is accordingly required to control the torque Tc of the clutch motor 30 giving the loading torque. The concrete procedure of controlling the torque Tc of the clutch motor 30 is described previously based on the clutch motor control routine.

As discussed above, when the revolving speed Ne of the engine 50 is higher than the revolving speed Nd of the drive shaft 22, the torque control process in the ordinary driving mode turns off the first clutch 45 and on the second clutch 46 to attain the structure shown in FIG. 3 and makes the amounts of electric power regenerated by the clutch motor 30 and consumed by the assist motor 40 smaller than those in the structure of FIG. 4. This effectively reduces the energy loss by the clutch motor 30 and the assist motor 40 and thereby enhances the energy efficiency of the whole power output apparatus 20. When the revolving speed Ne of the engine 50 is lower than the revolving speed Nd of the drive shaft 22, on the other hand, the torque control process in the ordinary driving mode turns on the first clutch 45 and off the second clutch 46 to attain the structure of FIG. 4 and makes the amounts of electric power consumed by the clutch motor 30 and regenerated by the assist motor 40 smaller than those in the structure of FIG. 3. This effectively reduces the energy loss by the clutch motor 30 and the assist motor 40 and thereby enhances the energy efficiency of the whole power output apparatus 20. This structure of the embodiment can realize the higher energy efficiency than that of the fixed structure of either FIG. 3 or FIG. 4.

The torque control process in the ordinary driving mode specifies the target torque Te* and the target revolving speed Ne* of the engine 50, in order to enable the engine 50 to be driven with the highest possible efficiency while the energy Pe output from the engine 50 is constant. This enhances the energy efficiency of the whole power output apparatus 20. When the efficiencies Ksc and Ksa of the clutch motor 30 and the assist motor 40 are assumed to the value '1', the clutch motor 30 and the assist motor 40 function to convert the output power of the engine 50 expressed by the target torque Te* and the target revolving speed Ne* to the power expressed by the torque command value Td* and the revolving speed Nd and output the converted power to the drive shaft 22. The torque to be output to the drive shaft 22 (output torque command value Td*) depends upon the step-on amount of the accelerator pedal 64 by the driver, and the target torque Te* and the target revolving speed Ne* of the engine 50 are determined according to this output torque command value Td*, so that a desired power required by the driver can be output to the drive shaft 22.

(3) Torque Control Process in Charge-Discharge Mode

Figure 21:
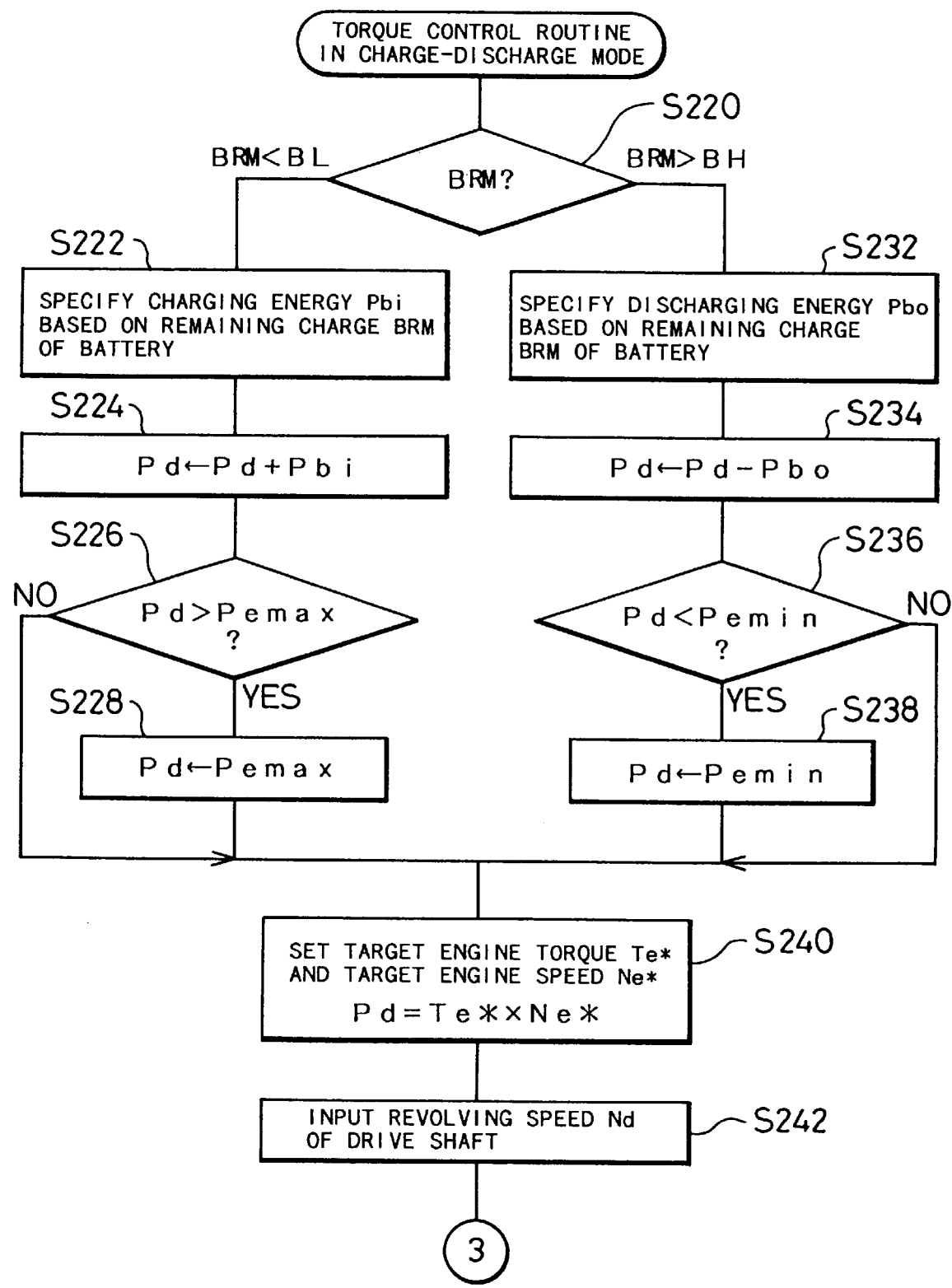
FIGS. 21 and 22 are flowcharts showing a torque control routine in the charge-discharge mode executed by the control CPU 90 of the controller 80.
Figure 22:
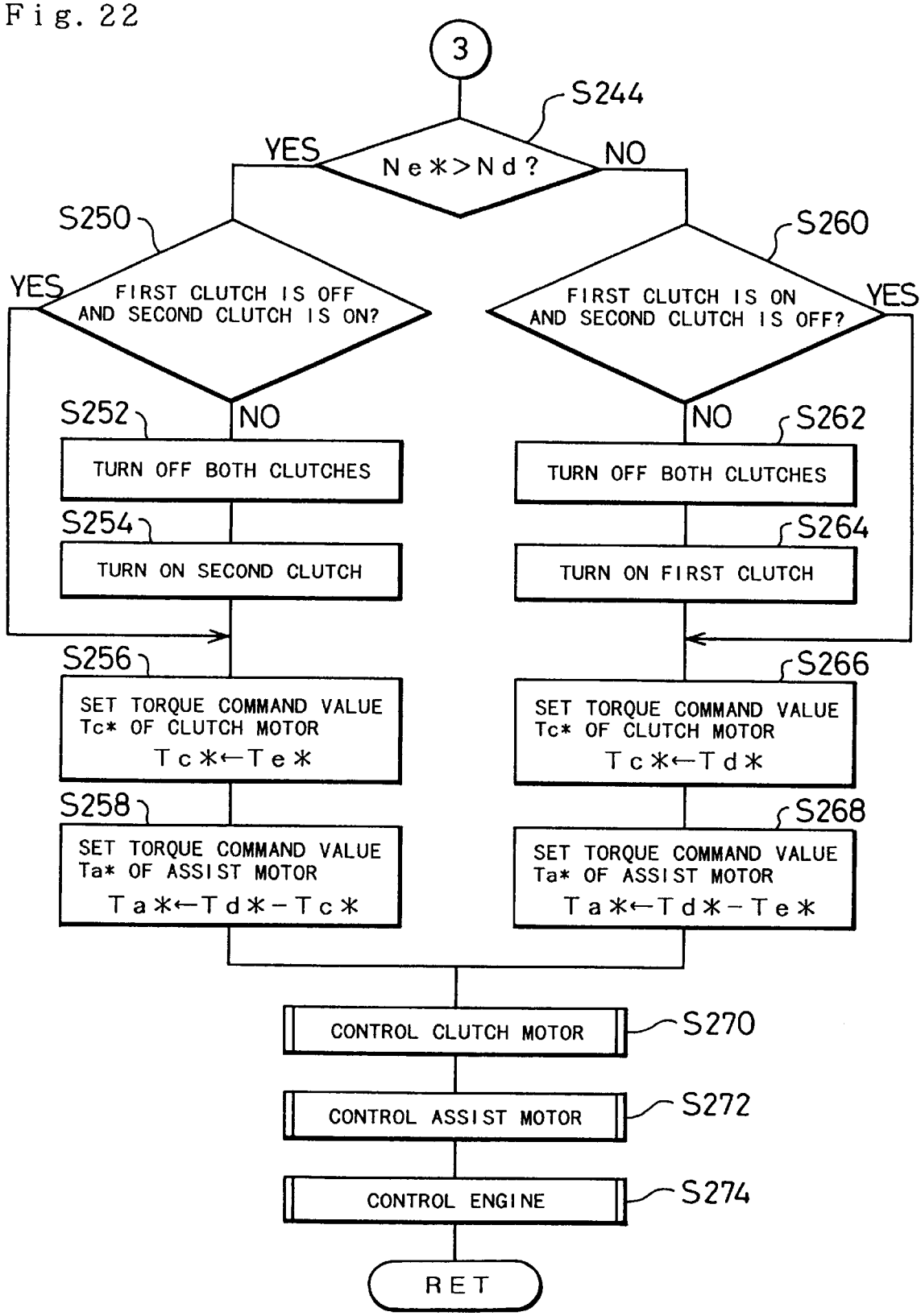

The torque control in the charge-discharge mode at step S114 in the flowchart of FIG. 11 is carried out according to a torque control routine in the charge-discharge mode shown in the flowcharts of FIGS. 21 and 22. As discussed previously, the charge-discharge mode is selected as the optimal operation mode of the power output apparatus 20 at step S132 in the flowchart of FIG. 13, when it is determined at step S130 that the remaining charge BRM of the battery 94 is out of the specific range defined by the first threshold value BL and the second threshold value BH and that the battery 94 thereby requires either charging or discharging. This routine is executed under such conditions.

When the program enters the routine of FIG. 21, the control CPU 90 of the controller 80 first compares the remaining charge BRM of the battery 94 with the first threshold value BL and the second threshold value BH at step S220. The definitions of the first threshold value BL and the second threshold value BH are given above in the description of step S130 in the flowchart of FIG. 13. In case that the remaining charge BRM of the battery 94 is less than the first threshold value BL, the program determines that the battery 94 requires charging and carries out the process of setting the energy Pd by taking into account the required energy for charging the battery 94 (charging energy Pbi) at steps S222 through S228. In case that the remaining charge BRM of the battery 94 is greater than the second threshold value BH, on the other hand, the program determines that the battery 94 requires discharging and carries out the process of setting the energy Pd by taking into account the energy discharged from the battery 94 (discharging energy Pbo) at steps S232 through S238.

Figure 23:
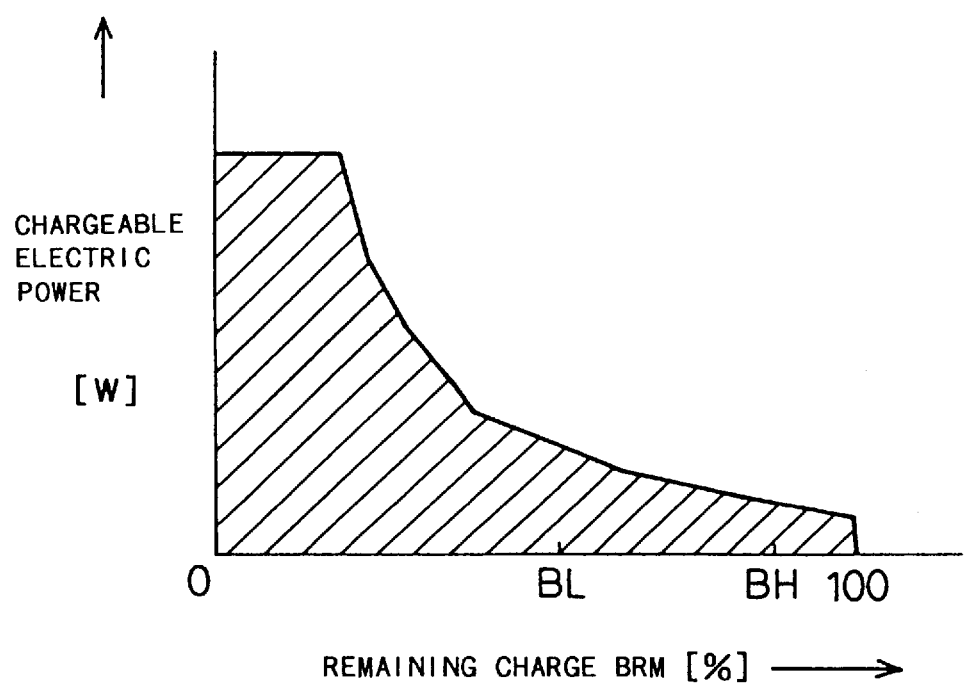
FIG. 23 is a graph showing the relationship between the remaining charge BRM of the battery 94 and the chargeable electric power.

The following describes a concrete procedure of setting the energy Pd by taking into account the required energy for charging the battery 94 (charging energy Pbi) at steps S222 through S228. The control CPU 90 of the controller 80 first sets the charging energy Pbi based on the remaining charge BRM of the battery 94 at step S222. The charging energy Pbi is set based on the remaining charge BRM of the battery 94, since the chargeable electric power (energy) of the battery 94 as well as appropriate charging voltage and charging current vary with a variation in remaining charge BRM. FIG. 23 is a graph showing the chargeable electric power plotted against the remaining charge BRM of the battery 94. In this embodiment, optimum values of charging energy Pbi are determined experimentally or otherwise for the respective values of remaining charge BRM of the battery 94 and stored in advance as a map (not shown) in the ROM 90b. In accordance with a concrete procedure, at step S222, the charging energy Pbi corresponding to the remaining charge BRM of the battery 94 is read from the map stored in the ROM 90b. The control CPU 90 sets the energy Pd to be output to the drive shaft 22 anew by adding the charging energy Pbi to the energy Pd at step S224. It is then determined at step S226 whether or not the newly set energy Pd exceeds a maximum energy Pemax that can be output from the engine 50. When the newly set energy Pd exceeds the maximum energy Pemax, the maximum energy Pemax is set to the energy Pd at step S228. This limits the energy Pd to the maximum energy Pemax.

The following describes a concrete procedure of setting the energy Pd by taking into account the energy discharged from the battery 94 (discharging energy Pbo) at steps S232 through S238. The control CPU 90 of the controller 80 first sets the discharging energy Pbo based on the remaining charge BRM of the battery 94 at step S232. The discharging energy Pbo is set based on the remaining charge BRM of the battery 94, since the dischargeable electric power (energy) of the battery 94 may be varied with a variation in remaining charge BRM. In this embodiment, optimum values of discharging energy Pbo are determined experimentally or otherwise for the respective values of remaining charge BRM of the battery 94 and stored in advance as a map (not shown) in the ROM 90b. In accordance with a concrete procedure, at step S232, the discharging energy Pbo corresponding to the remaining charge BRM of the battery 94 is read from the map stored in the ROM 90b. The control CPU 90 sets the energy Pd to the output to the drive shaft 22 anew by subtracting the discharging energy Pbo from the energy Pd at step S234. It is then determined at step S236 whether or not the newly set energy Pd is smaller than a minimum energy Pemin that can be output from the engine 50. When the newly set energy Pd is smaller than the minimum energy Pemin, the minimum energy Pemin is set to the energy Pd at step S238. This limits the energy Pd to the minimum energy Pemin.

After newly setting the energy Pd to be output to the drive shaft 22 by taking into account the charging energy Pbi or the discharging energy Pbo, the control CPU 90 sets the target torque Te* and the target revolving speed Ne* of the engine 50 based on the newly set energy Pd at step S240. The concrete procedure of setting the target engine torque Te* and the target engine speed Ne* is identical with the processing of step S170 in the flowchart of FIG. 16.

The control CPU 90 subsequently reads the revolving speed Nd of the drive shaft 22 at step S242 and compares the target revolving speed Ne* of the engine 50 thus specified with the input revolving speed Nd of the drive shaft 22 at step S244 in the flowchart of FIG. 22. In case that the target revolving speed Ne* of the engine 50 is higher than the revolving speed Nd of the drive shaft 22, the program carries out the processing of steps S250 through S254 and operates the first clutch 45 and the second clutch 46 in order to enable the first clutch 45 to be set in OFF position and the second clutch 46 to be set in ON position (that is, to attain the structure shown in the schematic view of FIG. 3). The control CPU 90 subsequently sets the target torque Te* of the engine 50 to the torque command value Tc* of the clutch motor 30 at step S256, and sets the value, which is obtained by subtracting the torque command value Tc* of the clutch motor 30 from the torque command value Td* to be output to the drive shaft 22, to the torque command value Ta* of the assist motor 40 at step S258. In the structure of FIG. 3, the torque output to the drive shaft 22 is the sum of the torque Tc output from the clutch motor 30 and the torque Ta output from the assist motor 40. When the torque command value Tc* of the clutch motor 30 and the torque command value Ta* of the assist motor 40 are specified in this manner, the total torque (corresponding to the torque command value Td*) can be output to the drive shaft 22. The concrete procedure of operating the first clutch 45 and the second clutch 46 in order to enable the power output apparatus 20 of the embodiment to have the structure shown in FIG. 3 (that is, the processing of steps S250 through S254) is identical with the processing of steps S174 through S177 in the torque control routine in the ordinary driving mode shown in the flowcharts of FIGS. 15 and 16. This includes the reason why both the clutches 45 and 46 are once turned off when the current states of the clutches 45 and 46 are not identical with the target states.

In case that the target revolving speed Ne* of the engine 50 is not higher than the revolving speed Nd of the drive shaft 22, on the other hand, the program carries out the processing of steps S260 through S264 and operates the first clutch 45 and the second clutch 46 in order to enable the first clutch 45 to be set in ON position and the second clutch 46 to be set in OFF position (that is, to attain the structure shown in the schematic view of FIG. 4). The control CPU 90 subsequently sets the output torque command value Td* to be output to the drive shaft 22 to the torque command value Tc* of the clutch motor 30 at step S266, and sets the value, which is obtained by subtracting the target torque Te* of the engine 50 from the output torque command value Td* to be output to the drive shaft 22, to the torque command value Ta* of the assist motor 40 at step S268. In the structure of FIG. 4, the torque output to the drive shaft 22 is equal to the torque Tc output from the clutch motor 30. When the output torque command value Td* is set to the torque command value Tc* of the clutch motor 30, the torque corresponding to the output torque command value Td* can be output to the drive shaft 22. The value obtained by subtracting the target torque Te* of the engine 50 from the output torque command value Td* is set to the torque command value Ta* of the assist motor 40, in order to enable the assist motor 40 to supplement the insufficiency of the torque corresponding to the target torque Te* output from the engine 50. The concrete procedure of operating the first clutch 45 and the second clutch 46 in order to enable the power output apparatus 20 of the embodiment to have the structure shown in FIG. 4 (that is, the processing of steps S260 through S264) is identical with the processing of steps S184 through S187 in the torque control routine in the ordinary driving mode shown in the flowcharts of FIGS. 15 and 16. This includes the reason why both the clutches 45 and 46 are once turned off when the current states of the clutches 45 and 46 are not identical with the target states.

After operating the first clutch 45 and the second clutch 46 according to the target revolving speed Ne* of the engine 50 and the revolving speed Nd of the drive shaft 22 and specifying the torque command values Tc* and Ta* of the clutch motor 30 and the assist motor 40, the program carries out the processing of steps S270 through S274 to control the clutch motor 30, the assist motor 40, and the engine 50 based on these values. The concrete procedures are identical with those executed at steps S166 through S169 in the torque control routine in the ordinary driving mode shown in the flowcharts of FIGS. 15 and 16 and are not specifically described here. The control operations of the clutch motor 30, the assist motor 40, and the engine 50 carried out in the respective torque control routines discussed below also follow the procedures of steps S166 through S169 in the torque control routine in the ordinary driving mode shown in the flowcharts of FIGS. 15 and 16, unless otherwise specified.

Figure 24:
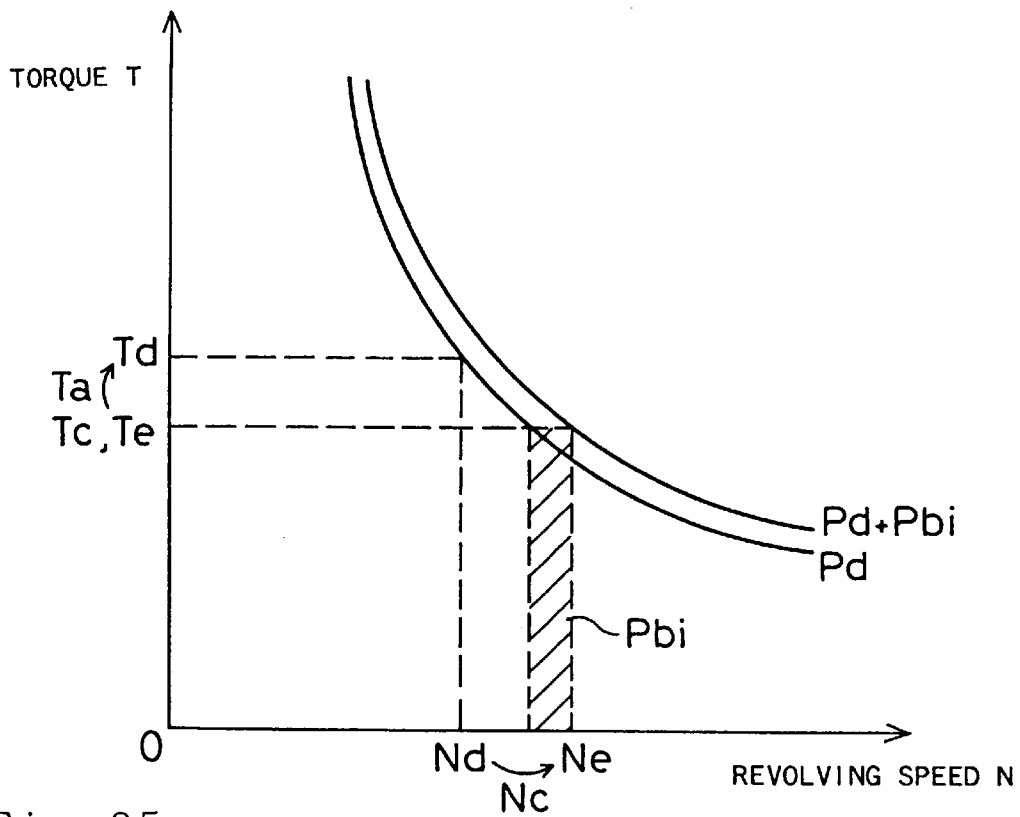
FIG. 24 shows the state of charging the battery 94 in the structure of FIG. 3.
Figure 25:
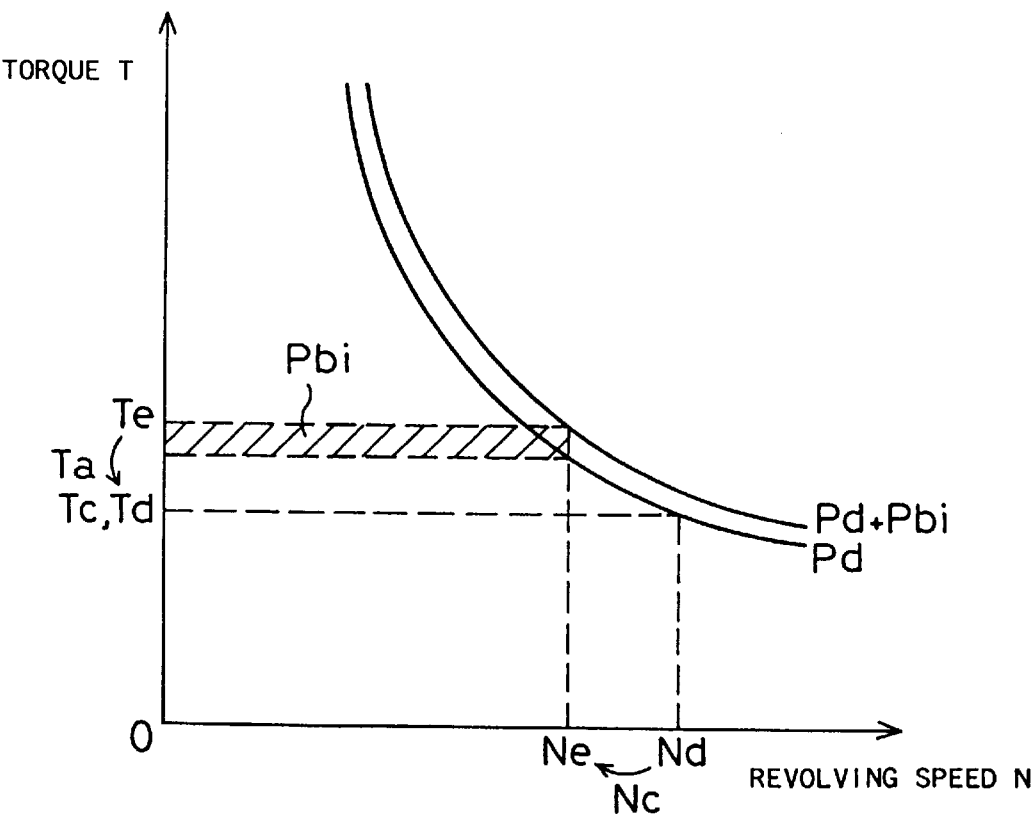
FIG. 25 shows the state of charging the battery 94 in the structure of FIG. 4.

The following describes the state of charging the battery 94 and the state of discharging the battery 94 by the torque control process in the charge-discharge mode. When the remaining charge BRM of the battery 94 is smaller than the first threshold value BL at step S220 in the flowchart of FIG. 21, the amount of energy Pd is set anew by adding the charging energy Pbi to the energy Pd, and the target torque Te* and the target revolving speed Ne* of the engine 50 are then specified based on the newly set energy Pd. The torque command value Tc* of the clutch motor 30 and the torque command value Ta* of the assist motor 40 are specified, on the other hand, to enable the output torque command value Td* to be output to the drive shaft 22, irrespective of the target revolving speed Ne* of the engine 50 and the revolving speed Nd of the drive shaft 22. This makes the energy Pe output from the engine 50 greater than the energy Pd output to the drive shaft 22. In the structure shown in the schematic view of FIG. 3 wherein the target revolving speed Ne* of the engine 50 is lower than the revolving speed Nd of the drive shaft 22, the electric power regenerated by the clutch motor 30 becomes greater than the electric power consumed by the assist motor 40. In the structure shown in the schematic view of FIG. 4 wherein the target revolving speed Ne* of the engine 50 is higher than the revolving speed Nd of the drive shaft 22, on the contrary, the electric power regenerated by the assist motor 40 becomes greater than the electric power consumed by the clutch motor 30. In either structure, there is an excess electric power. In this embodiment, the battery 94 is charged with this excess electric power. FIG. 24 shows the state of charging the battery 94 when the power output apparatus 20 of the embodiment has the structure of FIG. 3, and FIG. 25 shows the state of charging the battery 94 when the power output apparatus 20 of the embodiment has the structure of FIG. 4. In the drawings of FIGS. 24 and 25, hatched areas represent the excess electric power, that is, the charging energy Pbi.

Figure 26:
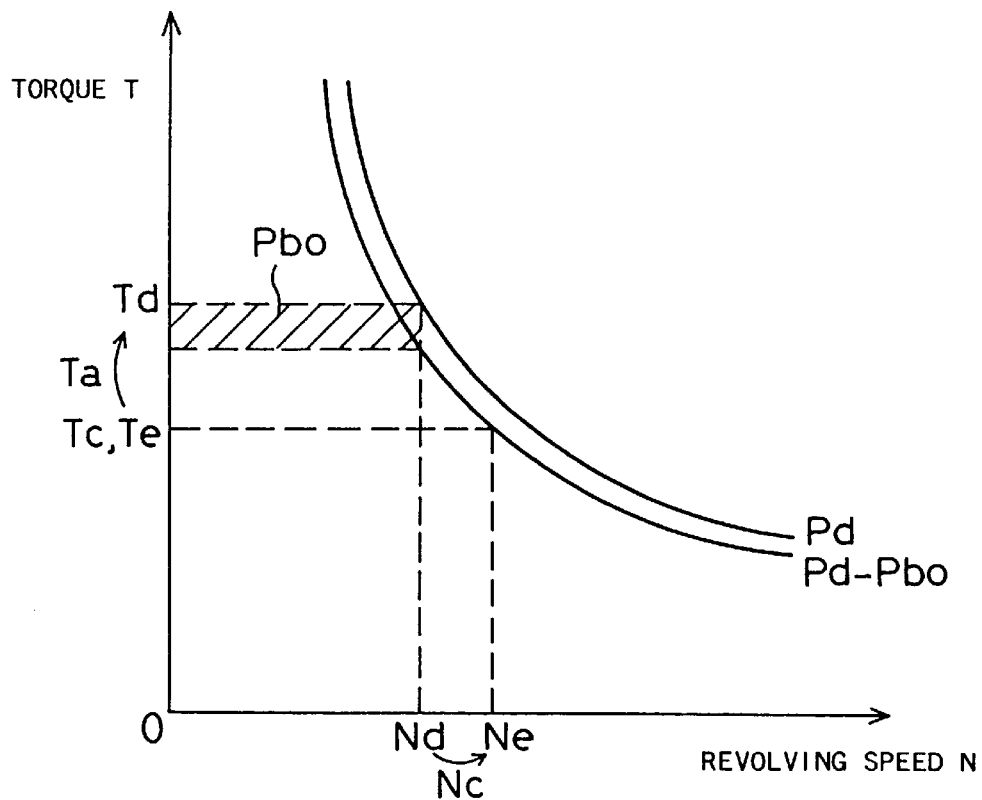
FIG. 26 shows the state of discharging electric power from the battery 94 in the structure of FIG. 3.
Figure 27:
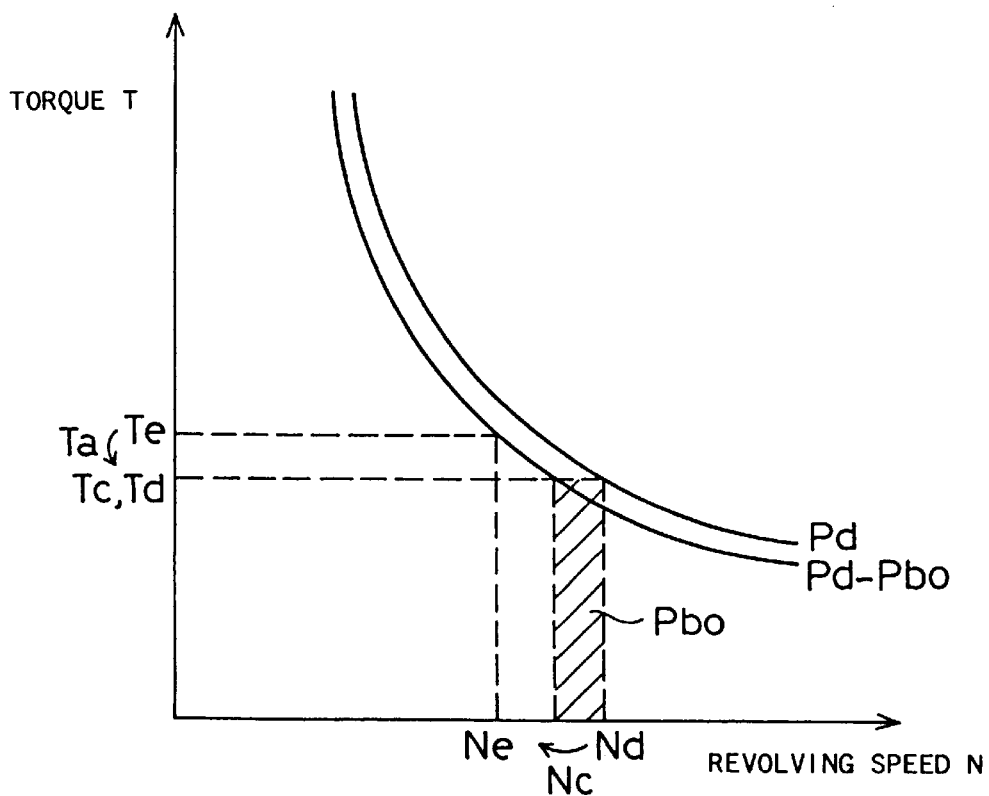
FIG. 27 shows the state of discharging electric power from the battery 94 in the structure of FIG. 4.

When the remaining charge BRM of the battery 94 is greater than the second threshold value BH at step S220 in the flowchart of FIG. 21, the amount of energy Pd is set anew by subtracting the discharging energy Pbo from the energy Pd, and the target torque Te* and the target revolving speed Ne* of the engine 50 are then specified based on the newly set energy Pd. The torque command value Tc* of the clutch motor 30 and the torque command value Ta* of the assist motor 40 are specified, on the other hand, to enable the output torque command value Td* to be output to the drive shaft 22, irrespective of the target revolving speed Ne* of the engine 50 and the revolving speed Nd of the drive shaft 22. This makes the energy Pe output from the engine 50 smaller than the energy Pd output to the drive shaft 22. In the structure shown in the schematic view of FIG. 3 wherein the target revolving speed Ne* of the engine 50 is lower than the revolving speed Nd of the drive shaft 22, the electric power regenerated by the clutch motor 30 becomes smaller than the electric power consumed by the assist motor 40. In the structure shown in the schematic view of FIG. 4 wherein the target revolving speed Ne* of the engine 50 is higher than the revolving speed Nd of the drive shaft 22, on the contrary, the electric power regenerated by the assist motor 40 becomes smaller than the electric power consumed by the clutch motor 30. In either structure, there is an insufficiency of electric power. In this embodiment, the battery 94 is discharged to supplement the insufficiency of electric power. FIG. 26 shows the state of discharging the battery 94 when the power output apparatus 20 of the embodiment has the structure of FIG. 3, and FIG. 27 shows the state of discharging the battery 94 when the power output apparatus 20 of the embodiment has the structure of FIG. 4. In the drawings of FIGS. 26 and 27, hatched areas represent the electric power supplied by the battery 94, that is, the discharging energy Pbo.

The torque control process in the charge-discharge mode discussed above can keep the remaining charge BRM of the battery 94 in a desired range, thereby effectively preventing the battery 94 from being charged or discharged to an excessive degree. The sum of the energy Pe output from the engine 50 and the electric power discharged from the battery 94 or the difference between the energy Pe and the electric power used to charge the battery 94 is subjected to energy conversion and is output as a desired power to the drive shaft 22. This torque control process also operates the first clutch 45 and the second clutch 46 based on the revolving speed Ne of the engine 50 and the revolving speed Nd of the drive shaft 22 to attain the structure of FIG. 3 or the structure of FIG. 4. This reduces the energy loss by the clutch motor 30 and the assist motor 40 and thereby enhances the energy efficiency of the whole power output apparatus 20. The engine 50 may be driven at any driving point that can output the preset energy Pd. This allows the engine 50 to be driven at a desired driving point of highest possible efficiency, thereby further enhancing the efficiency of the whole power output apparatus 20.

Although the power output apparatus 20 of the embodiment sets the charging energy Pbi and the discharging energy Pbo based on the remaining charge BRM of the battery 94, the charging energy Pbi and the discharging energy Pbo may be any predetermined values.

(4) Torque Control Process in Power Assist Mode

Figure 28:
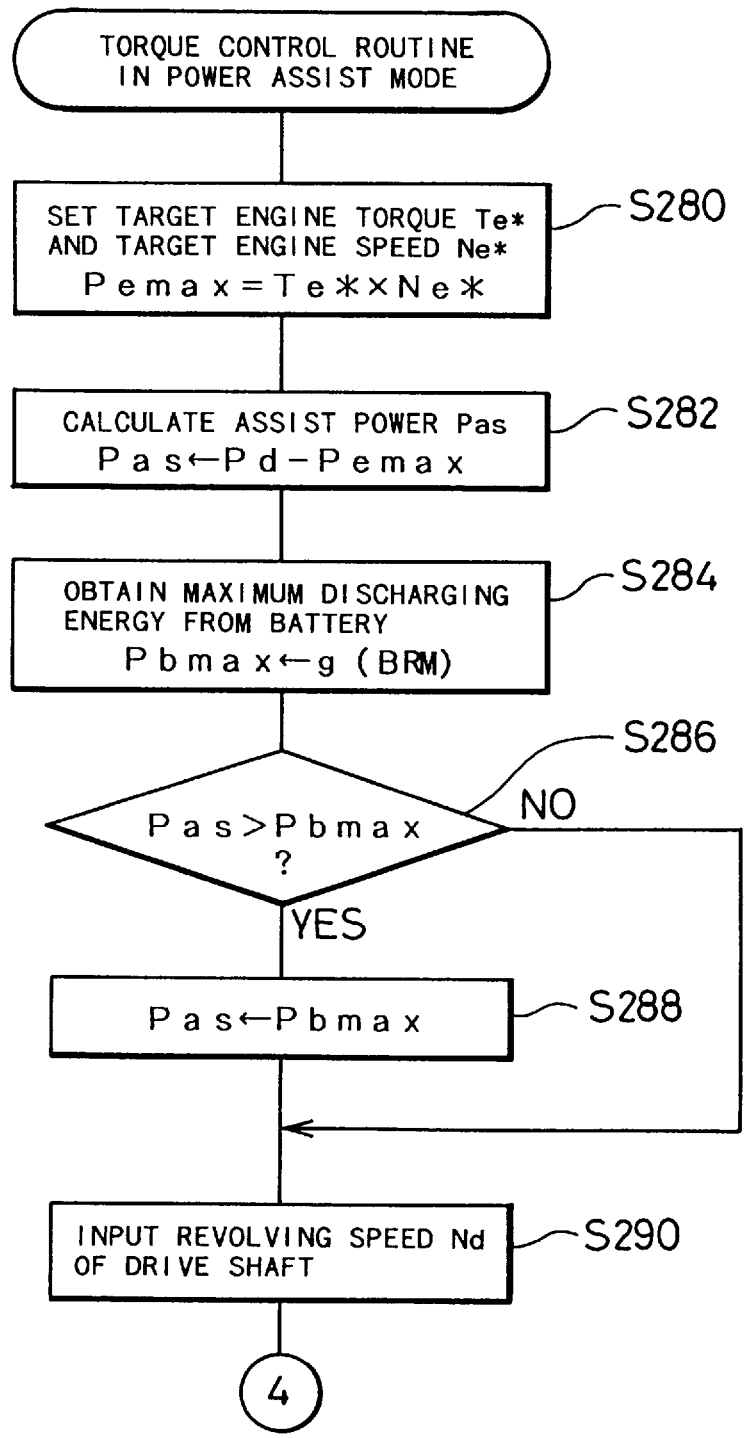
FIGS. 28 and 29 are flowcharts showing a torque control routine in the power assist mode executed by the control CPU 90 of the controller 80.
Figure 29:
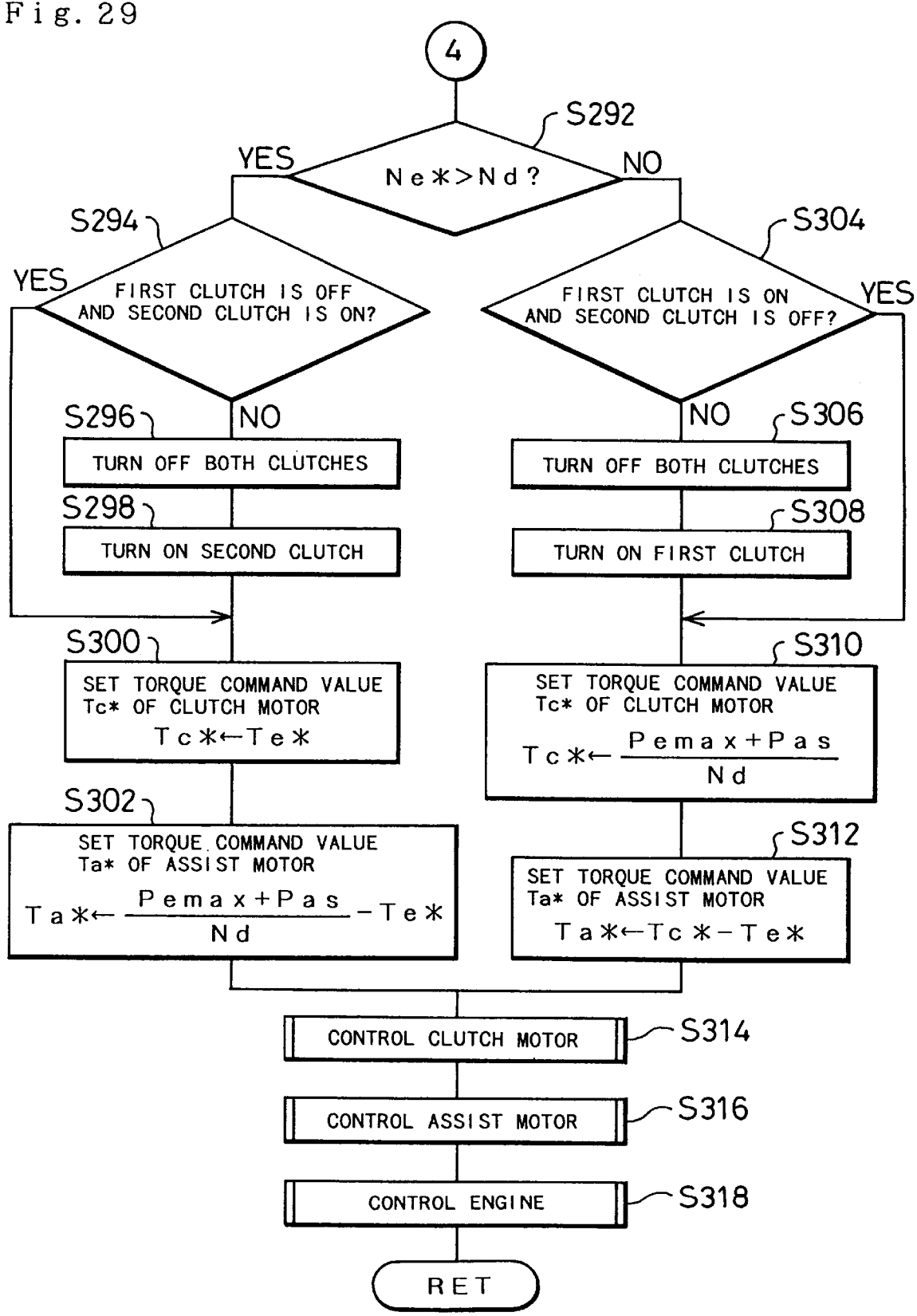

The torque control in the power assist mode at step S116 in the flowchart of FIG. 11 is carried out according to a torque control routine in the power assist mode shown in the flowcharts of FIG. 28 and 29. As discussed previously, the power assist mode is selected as the optimal operation mode of the power output apparatus 20 at step S136 in the flowchart of FIG. 13, when it is determined at step S134 that the energy Pd to be output to the drive shaft 22 exceeds the maximum energy Pemax that can be output from the engine 50. This routine is executed under such conditions.

When the program enters the routine of FIG. 28, the control CPU 90 of the controller 80 first sets the target torque Te* and the target revolving speed Ne* of the engine 50 based on the maximum energy Pemax that can be output from the engine 50 at step S280. At step S134 in the operation mode determination routine of FIG. 13, it is determined that the energy Pd to be output to the drive shaft 22 is greater than the maximum energy Pemax. The maximum energy Pemax is accordingly set to the energy Pe output from the engine 50, in order to enable a largest possible portion of the required output energy Pd to the drive shaft 22 to be supplied by the power output from the engine 50.

The control CPU 90 then subtracts the maximum output energy Pemax of the engine 50 from the energy Pd to be output to the dive shaft 22, so as to calculate the insufficiency of the energy Pe output from the engine 50 as an assist power Pas at step S282. The control CPU 90 obtains a maximum discharging energy Pbmax, which is the maximum of dischargeable energy from the battery 94, based on the remaining charge BRM of the battery 94 at step S284, and compares the calculated assist power Pas with the maximum discharging energy Pbmax thus obtained at step S286. The maximum discharging energy Pbmax is set based on the remaining charge BRM of the battery 94, since the dischargeable electric power (energy) of the battery 94 may be varied with a variation in remaining charge BRM. In this embodiment, values of maximum discharging energy Pbmax are determined experimentally or otherwise for the respective values of remaining charge BRM of the battery 94 and stored in advance as a map (not shown) in the ROM 90b. In accordance with a concrete procedure, at step S284, the maximum discharging energy Pbmax corresponding to the remaining charge BRM of the battery 94 is read from the map stored in the ROM 90b. In case that the assist power Pas is greater than the maximum discharging energy Pbmax, the maximum discharging energy Pbmax is set to the assist power Pas at step S288. This prevents the assist power Pas from exceeding the maximum discharging energy Pbmax.

The control CPU 90 then reads the revolving speed Nd of the drive shaft 22 at step S290 and compares the revolving speed Nd of the drive shaft 22 with the target revolving speed Ne* of the engine 50 at step S292 in the flowchart of FIG. 29. In case that the target revolving speed Ne* of the engine 50 is higher than the revolving speed Nd of the drive shaft 22, the program carries out the processing of steps S294 through S298 and operates the first clutch 45 and the second clutch 46 in order to enable the first clutch 45 to be set in OFF position and the second clutch 46 to be set in ON position (that is, to attain the structure shown in the schematic view of FIG. 3). The control CPU 90 subsequently sets the target torque Te* of the engine 50 to the torque command value Tc* of the clutch motor 30 at step S300, and calculates the torque command value Ta* of the assist motor 40 according to Equation (8) given below. In the structure of FIG. 3, the procedure of setting the torque command value Tc* of the clutch motor 30 and the torque command value Ta* of the assist motor 40 in this manner enables the energy defined by the sum of the maximum output energy Pemax of the engine 50 and the assist power Pas limited to the maximum discharging energy Pbmax to be subjected to the torque conversion and output to the drive shaft 22.

$$Ta^* \leftarrow \frac{Pemax + Pas}{Nd} - Te^* \qquad (8)$$

In case that the target revolving speed Ne* of the engine 50 is not higher than the revolving speed Nd of the drive shaft 22, on the other hand, the program carries out the processing of steps S304 through S308 and operates the first clutch 45 and the second clutch 46 in order to enable the first clutch 45 to be set in ON position and the second clutch 46 to be set in OFF position (that is, to attain the structure shown in the schematic view of FIG. 4). The control CPU 90 subsequently calculates the torque command value Tc* of the clutch motor 30 according to Equation (9) given below at step S310, and determines the torque command value Ta* of the assist motor 40 by subtracting the target torque Te* of the engine 50 from the torque command value Tc* of the clutch motor 30 at step S312. In the structure of FIG. 4, the procedure of setting the torque command value Tc* of the clutch motor 30 and the torque command value Ta* of the assist motor 40 in this manner also enables the energy defined by the sum of the maximum output energy Pemax of the engine 50 and the assist power Pas limited to the maximum discharging energy Pbmax to be subjected to the torque conversion and output to the drive shaft 22.

$$Tc^* \leftarrow \frac{Pemax + Pas}{Nd} \qquad (9)$$

The concrete procedure of operating the first clutch 45 and the second clutch 46 in order to enable the power output apparatus 20 of the embodiment to have the structure shown in FIG. 3 or the structure shown in FIG. 4 (that is, the processing of steps S294 through S298 or the processing of steps S304 through S308) is identical with the processing of steps S174 through S177 or steps S184 through S187 in the torque control routine in the ordinary driving mode shown in the flowcharts of FIGS. 15 and 16. This includes the reason why both the clutches 45 and 46 are once turned off when the current states of the clutches 45 and 46 are not identical with the target states.

After operating the first clutch 45 and the second clutch 46 according to the target revolving speed Ne* of the engine 50 and the revolving speed Nd of the drive shaft 22 and specifying the torque command values Tc* and Ta* of the clutch motor 30 and the assist motor 40, the program carries out the processing of steps S314 through S318 to control the clutch motor 30, the assist motor 40, and the engine 50 based on these values.

Figure 30:
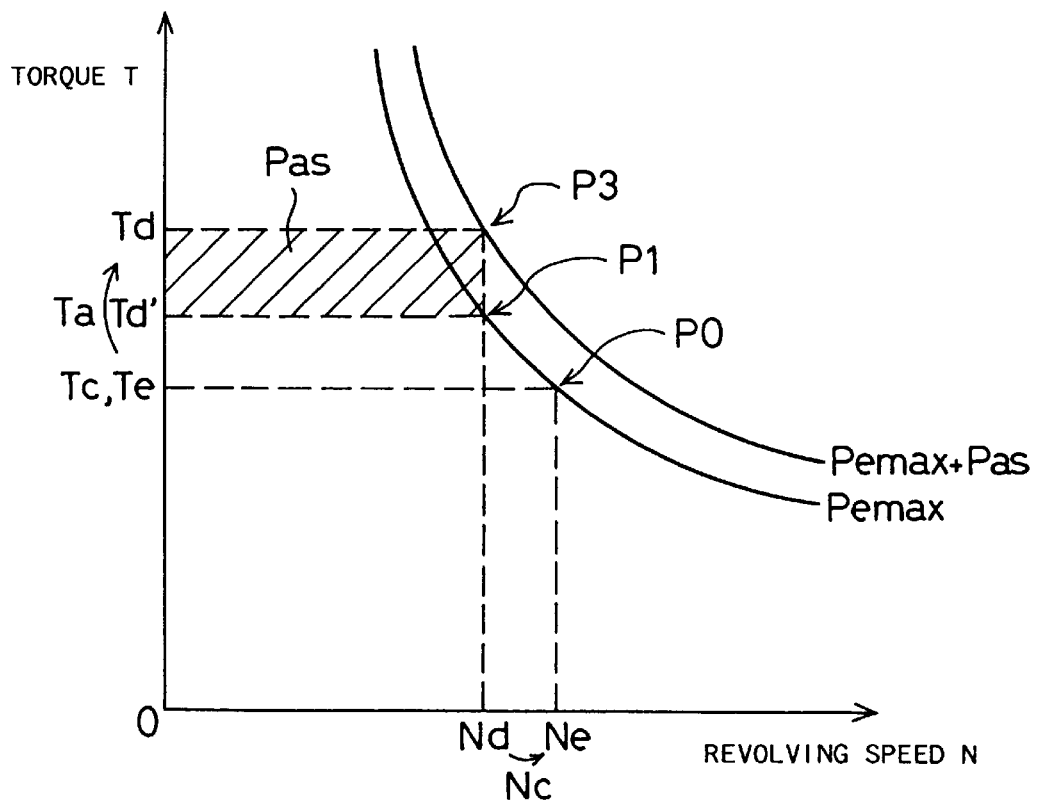
FIG. 30 shows the state of torque conversion when the power output apparatus 20 has the structure of FIG. 3 in the torque control process in the power assist mode.
Figure 31:
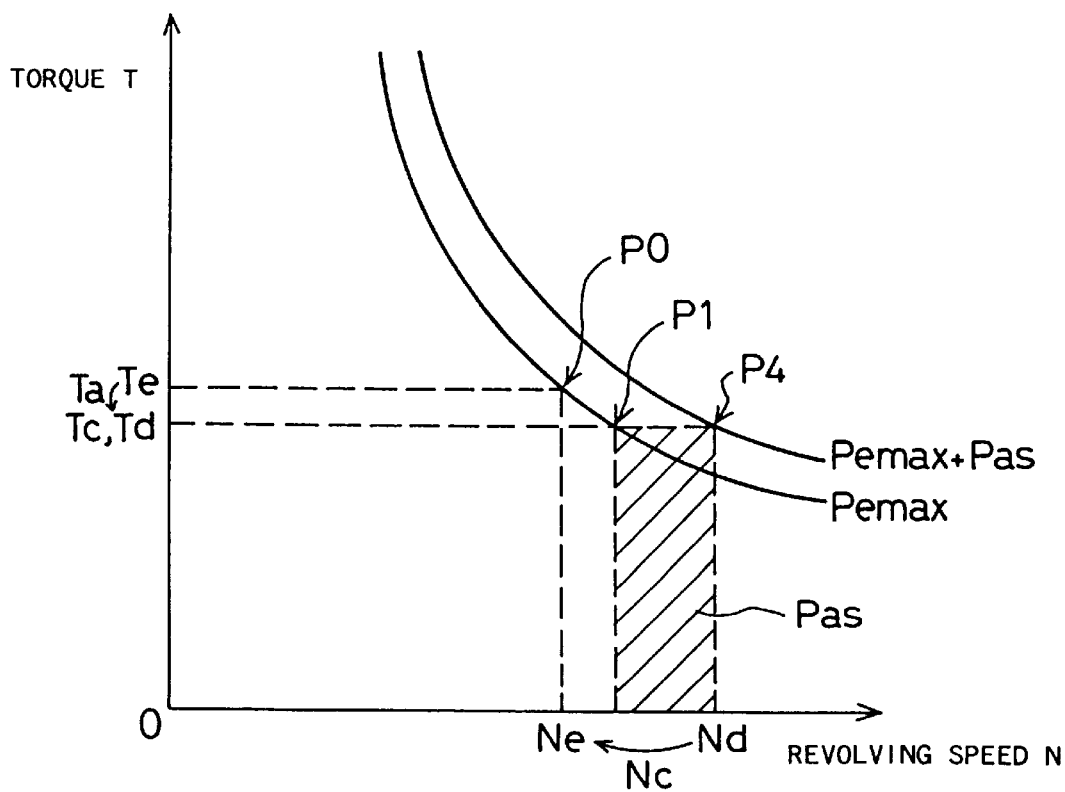
FIG. 31 shows the state of torque conversion when the power output apparatus 20 has the structure of FIG. 4 in the torque control process in the power assist mode.

The following describes the state of torque conversion in the torque control process in the power assist mode. FIGS. 30 and 31 respectively show the states of torque conversion in the structure of FIG. 3 and in the structure of FIG. 4 by the torque control process in the power assist mode. When the power output apparatus 20 of the embodiment has the structure shown in the schematic view of FIG. 3, the maximum output energy Pemax of the engine 50 driven at a driving point P0 is converted to a possible output torque Td' to the drive shaft 22 rotating at the revolving speed Nd. The possible output torque Td' expressed by a driving point P1 is smaller than the desired torque Td required by the driver and expressed by a driving point P3 as shown in FIG. 30. An amount of energy Pas defined by the hatched area in the drawing is accordingly short, compared with the required energy for applying the desired power. In this embodiment, the energy Pas is supplied as the assist power Pas from the battery 94 and output to the drive shaft 22 via the assist motor 40. The similar procedure is carried out when the power output apparatus 20 has the structure shown in the schematic view of FIG. 4. In this case, an amount of energy Pas that corresponds to an insufficiency of the maximum output energy Pemax of the engine 50 is supplied as the assist power Pas from the battery 94 as shown in FIG. 31.

The torque control process in the power assist mode discussed above enables energy equal to or greater than the maximum output energy Pemax of the engine 50 to be output to the drive shaft 22. The engine 50 used in the power output apparatus 20 may accordingly have a low rated capacity having the maximum energy smaller than the required output energy to the drive shaft 22. This effectively reduces the size of the whole power output apparatus 20 and saves energy. This torque control process also operates the first clutch 45 and the second clutch 46 based on the revolving speed Ne of the engine 50 and the revolving speed Nd of the drive shaft 22 to attain the structure of FIG. 3 or the structure of FIG. 4. This reduces the energy loss by the clutch motor 30 and the assist motor 40 and thereby enhances the energy efficiency of the whole power output apparatus 20. The engine 50 may be driven at any driving point that can output the maximum energy Pemax. This allows the engine 50 to be driven at a desired driving point of highest possible efficiency, thereby further enhancing the efficiency of the whole power output apparatus 20.

(5) Torque Control Process in Direct Output Mode

Figure 32:
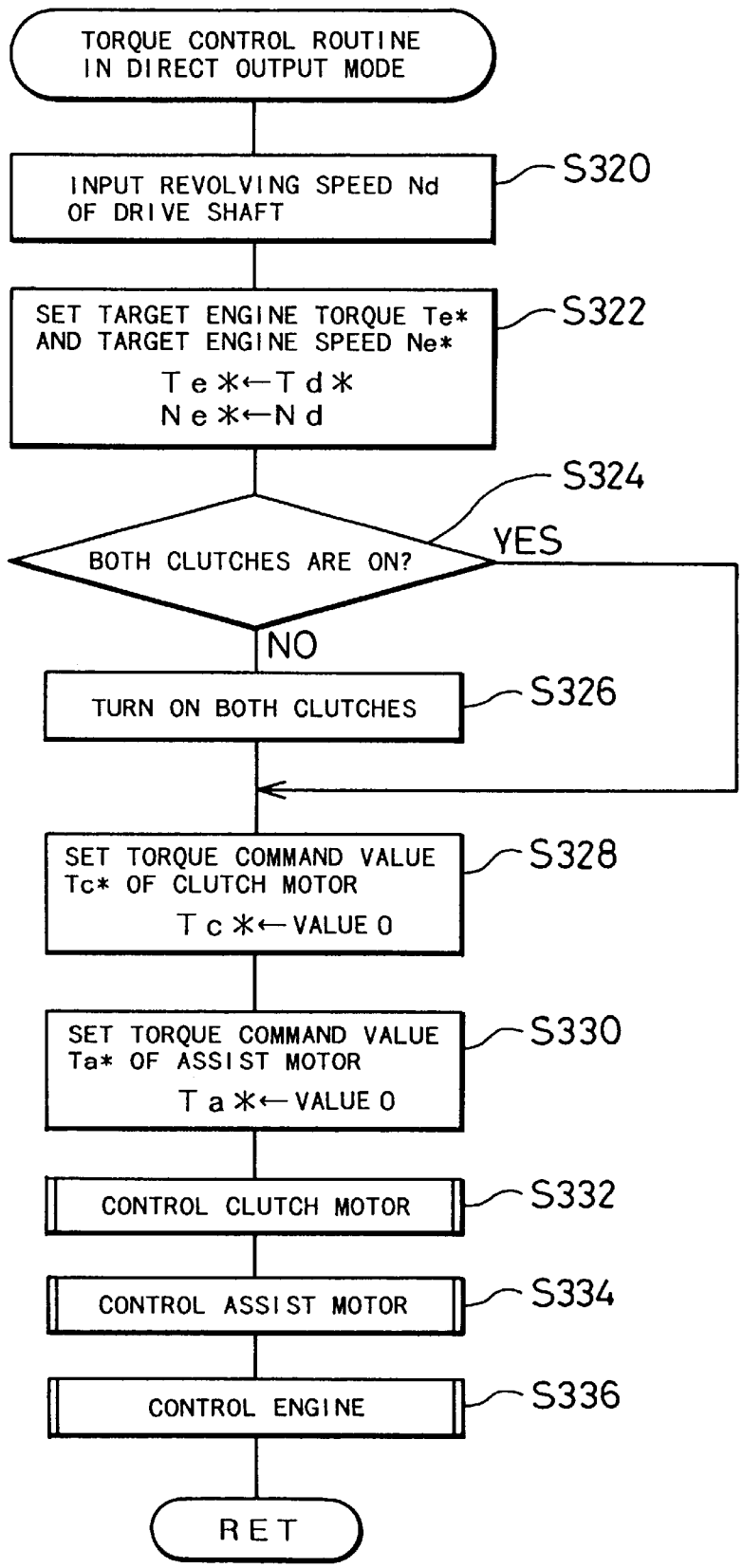
FIG. 32 is a flowchart showing a torque control routine in the direct output mode executed by the control CPU 90 of the controller 80.

The torque control in the direct output mode at step S118 in the flowchart of FIG. 11 is carried out according to a torque control routine in the direct output mode shown in the flowchart of FIG. 32. As discussed previously, the direct output mode is selected as the optimal operation mode of the power output apparatus 20 at step S140 in the flowchart of FIG. 13, when it is determined at step S138 that the torque command value Td* and the revolving speed Nd of the drive shaft 22 are within the efficient driving range of the engine 50 (that is, the area PA shown in FIG. 14). This routine is executed under such conditions. When the program enters the routine of FIG. 32, the control CPU 90 of the controller 80 first reads the revolving speed Nd of the drive shaft 22 at S320, and respectively sets the torque command value Td* and the revolving speed Nd of the drive shaft 22 to the target torque Te* and the target revolving speed Ne* of the engine 50 at step S322.

At subsequent step S324, the control CPU 90 determines whether or not both the first clutch 45 and the second clutch 46 are in ON position. In case that both the clutches 45 and 46 are not in ON position, the clutches 45 and 46 are turned to ON position at step S326. Such operation of the first clutch 45 and the second clutch 46 enables the power output apparatus 20 to have the structure shown in the schematic view of FIG. 9, wherein the crankshaft 56 is directly connected to the drive shaft 22. The control CPU 90 then sets both the torque command value Tc* of the clutch motor 30 and the torque command value Ta* of the assist motor 40 equal to zero at steps S328 and S330, and carries out the control operations of the clutch motor 30, the assist motor 40, and the engine 50 at steps S332, S334, and S336. The control operation of the assist motor 40 under the condition of the torque command value Ta*=0 may follow the assist motor control routine shown in the flowchart of FIG. 20. In this embodiment, however, the control operation of the assist motor 40 turns off the transistors Tr11, Tr13, and Tr15 in the second driving circuit 92 while turning on the transistors Tr12, Tr14, and Tr16, in order to make the electric currents flowing through the respective phases of the three-phase coils 44 of the assist motor 40 all equal to zero. Like the control operation of the assist motor 40, the control operation of the clutch motor 30 also turns on the transistors Tr1, Tr3, and Tr5 in the first driving circuit 91 while turning on the transistors Tr2, Tr4, and Tr6. When both the first clutch 45 and the second clutch 46 are in ON position, the revolving speed difference Nc between the crankshaft 56 and the drive shaft 22 is equal to zero. The alternative operation may thus turn off all the transistors Tr1 through Tr6 in the first driving circuit 91.

The torque control process in the direct output mode discussed above keeps both the first clutch 45 and the second clutch 46 in ON position, thereby enabling the power generated by the engine 50 to be output to the drive shaft 22 not via the clutch motor 30 and the assist motor 40 but directly. This makes the energy loss by the clutch motor 30 and the assist motor 40 equal to zero. The torque control process in the direct output mode is carried out when the torque to be output to the drive shaft 22 (torque command value Td*) and the revolving speed Nd of the drive shaft 22 are within the efficient driving range of the engine 50. This attains the efficient output of the power to the drive shaft 22.

In the power output apparatus 20 of the embodiment, both the torque command value Tc* of the clutch motor 30 and the torque command value Ta* of the assist motor 40 are set equal to zero.

The operation under such conditions is identical with that in the structure without the clutch motor 30 and the assist motor 40. In accordance with another possible structure, the assist motor 40 may output the power to the drive shaft 22 with electrical energy discharged from the battery 94 or regenerate electric power from the drive shaft 22 to charge the battery 94. This alternative structure does not restrict the torque control process in the direct output mode to the case in which both the torque to be output to the drive shaft 22 (torque command value Td*) and the revolving speed Nd of the drive shaft 22 are within the efficient driving range of the engine 50 (the area PA shown in FIG. 14), but enables the torque control process in the direct output mode to be carried out as long as the revolving speed Nd of the drive shaft 22 is within the efficient driving range of the engine 50. Such torque control in the direct output mode follows a modified torque control routine in the direct output mode shown in the flowchart of FIG. 33.

Figure 33:
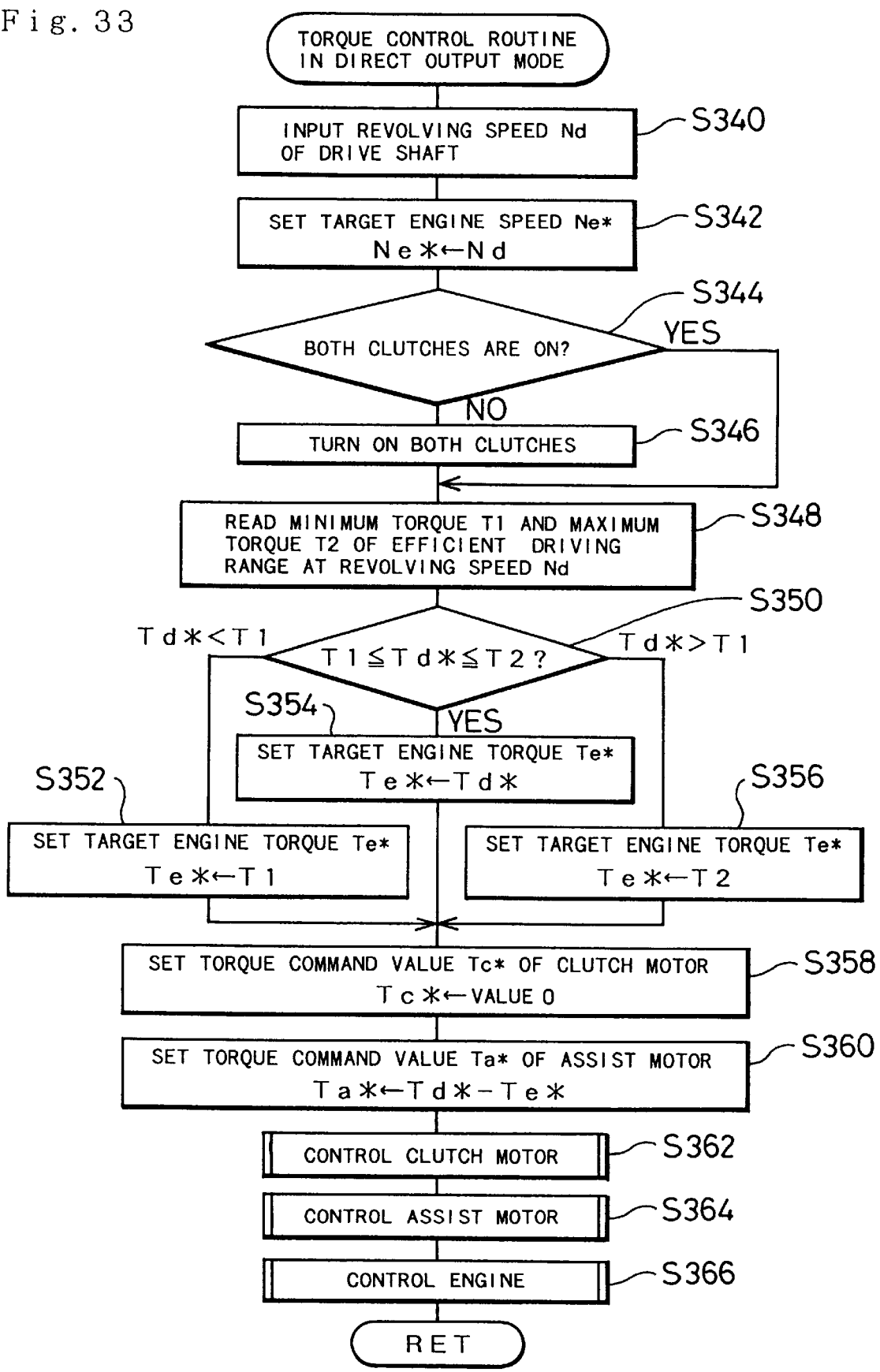
FIG. 33 is a flowchart showing a modified torque control routine in the direct output mode.

When the program enters the routine of FIG. 33, the control CPU 90 of the controller 80 first reads the revolving speed Nd of the drive shaft 22 at S340, and sets the input revolving speed Nd of the drive shaft 22 to the target revolving speed Ne* of the engine 50 at step S342. At subsequent step S344, the control CPU 90 determines whether or not both the first clutch 45 and the second clutch 46 are in ON position. In case that both the clutches 45 and 46 are not in ON position, the clutches 45 and 46 are set in ON position at step S346. The control CPU 90 then reads a minimum torque T1 and a maximum torque T2 in the efficient driving range of the engine 50 (the area PA shown in FIG. 14) with respect to the revolving speed Nd of the drive shaft 22 at step S348. The torque command value Td* is then compared with the input minimum torque T1 and maximum torque T2 at step S350. In this embodiment, values of minimum torque T1 and maximum torque T2 in the efficient driving range of the engine 50 are determined experimentally or otherwise for the respective values of the revolving speed Nd of the drive shaft 22 and stored in advance as a map (not shown) in the ROM 90b. In accordance with a concrete procedure, at step S348, the minimum torque T1 and the maximum torque T2 corresponding to the input revolving speed Nd of the drive shaft 22 are read from the map stored in the ROM 90b.

When the torque command value Td* is not less than the minimum torque T1 and not greater than the maximum torque T2 at step S350, the torque command value Td* is set to the target torque Te* of the engine 50 at step S354. When the torque command value Td* is less than the minimum torque T1, the minimum torque T1 is set to the target engine torque Te* at step S352. When the torque command value Td* is greater than the maximum torque T2, on the contrary, the maximum torque T2 is set to the target engine torque Te* at step S356. This procedure enables the driving point of the engine 50 defined by the target torque Te* and the target revolving speed Ne* to be within the efficient driving range of the engine 50 (that is, the area PA shown in FIG. 14).

The control CPU 90 then sets the torque command value Tc* of the clutch motor 30 equal to zero at step S358, and sets the torque command value Ta* of the assist motor 40 equal to the value obtained by subtracting the target torque Te* of the engine 50 from the torque command value Td* at step S360. After setting the target torque Te* and the target revolving speed Ne* of the engine 50 and the torque command values Tc* and Ta* of the clutch motor 30 and the assist motor 40, the program carries out the processing of steps S362 through S366 to control the clutch motor 30, the assist motor 40, and the engine 50 based on these values.

Figure 34:
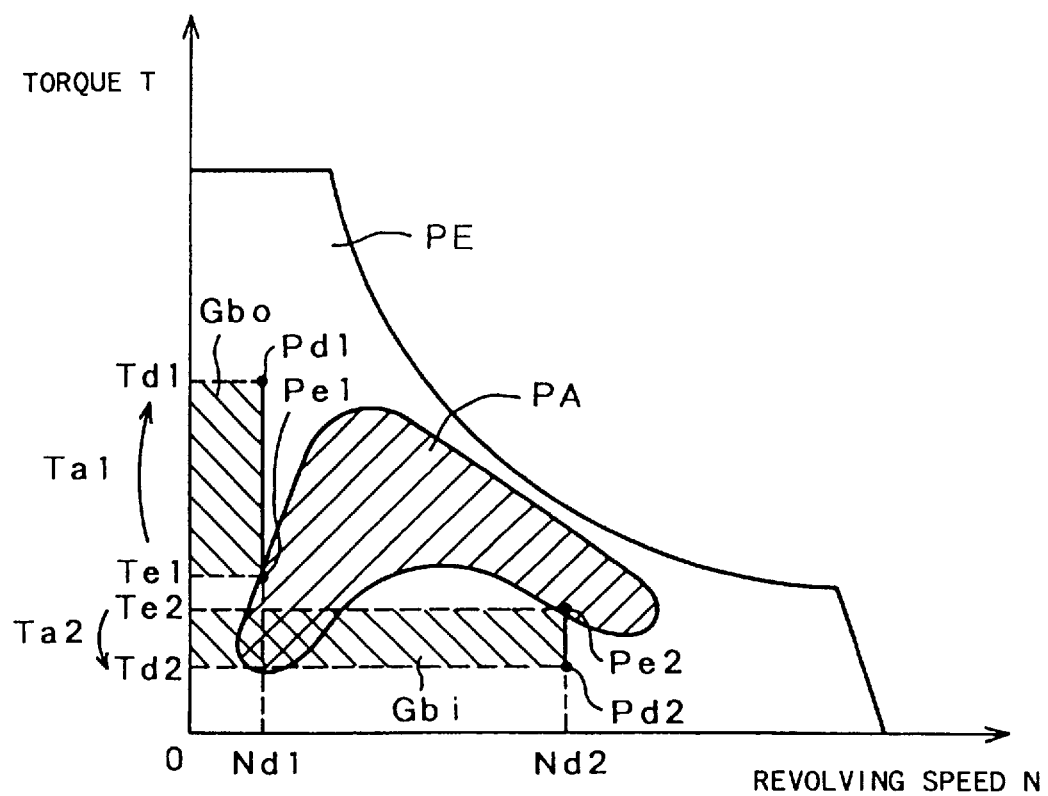
FIG. 34 shows the state of outputting the power to the drive shaft 22 by the modified torque control routine in the direct output mode.

FIG. 34 shows the state of outputting the power to the drive shaft 22 when the torque control routine in the direct output mode shown in the flowchart of FIG. 33 is executed. By way of example, it is assumed that the drive shaft 22 rotates at a revolving speed Nd1 and the output torque command value Td* depending upon the step-on amount of the accelerator pedal 64 is equal to a value Td1; that is, the drive shaft 22 is desired to rotate at a driving point Pd1 in the drawing of FIG. 34. While the revolving speed Nd1 is within an efficient driving range PA of the engine 50, the torque command value Td* is significantly greater than the upper limit of this efficient driving range PA. Under such conditions, an upper limit torque Te1 of the range PA at the revolving speed Nd1 is set as the maximum torque T2 to the target torque Te* of the engine 50 (at step S356 in FIG. 33), whereas the revolving speed Nd1 is set to the target revolving speed Ne* of the engine 50 (at step S342). The engine 50 is thus driven at a driving point Pe1 defined by the torque Te1 and the revolving speed Nd1. The torque command value Ta* of the assist motor 40 is set equal to a torque Ta1 obtained by subtracting the target torque Te* (=Te1) of the engine 50 from the torque command value Td* (=Td1) (at step S360).

While both the first clutch 45 and the second clutch 46 are in ON position, the energy given to the drive shaft 22 is equal to a sum (Td1×Nd1) of energy (Te1×Nd1) directly output from the engine 50 to the drive shaft 22 and energy (Ta1×Nd1) directly output from the assist motor 40 to the drive shaft 22. The energy output from the assist motor 40 to the drive shaft 22 is supplied by the electric power discharged from the battery 94.

As another example, it is assumed that the drive shaft 22 rotates at a revolving speed Nd2 and the output torque command value Td* is equal to a value Td2; that is, the drive shaft 22 is desired to rotate at a driving point Pd2 in the drawing of FIG. 34. While the revolving speed Nd2 is within the efficient driving range PA of the engine 50, the torque command value Td* is significantly smaller than the lower limit of this efficient driving range PA. Under such conditions, a lower limit torque Te2 of the range PA at the revolving speed Nd2 is set as the minimum torque T1 to the target torque Te* of the engine 50 (at step S352 in FIG. 33), whereas the revolving speed Nd2 is set to the target revolving speed Ne* of the engine 50 (at step S342). The engine 50 is thus driven at a driving point Pe2 defined by the torque Te2 and the revolving speed Nd2. The torque command value Ta* of the assist motor 40 is set equal to a torque Ta2 (negative value) obtained by subtracting the target torque Te* (=Te2) of the engine 50 from the torque command value Td* (=Td2) (at step S360). While both the first clutch 45 and the second clutch 46 are in ON position, the energy given to the drive shaft 22 is equal to a difference (Td2×Nd2) obtained by subtracting energy (Ta2×Nd2) corresponding to electric power regenerated by the assist motor 40 from energy (Te2×Nd2) directly output from the engine 50 to the drive shaft 22. The energy regenerated by the assist motor 40 is used to charge the battery 94.

As discussed above, the power output apparatus 20 of the embodiment can implement the torque control process in the direct output mode according to the modified torque control routine in the direct output mode shown in the flowchart of FIG. 33, as long as the revolving speed Nd of the drive shaft 22 is within the efficient driving range of the engine 50 (that is, the area PA shown in FIG. 14) even if the torque to be output to the drive shaft 22 (torque command value Td*) is not within this efficient driving range PA. The assist motor 40 is driven with the torque difference between the target torque Te* of the engine 50 and the torque command value Td* through charge and discharge of the battery 94, so that a desired torque can be applied to the drive shaft 22.

(6) Torque Control Process in Motor Driving Mode

Figure 35:
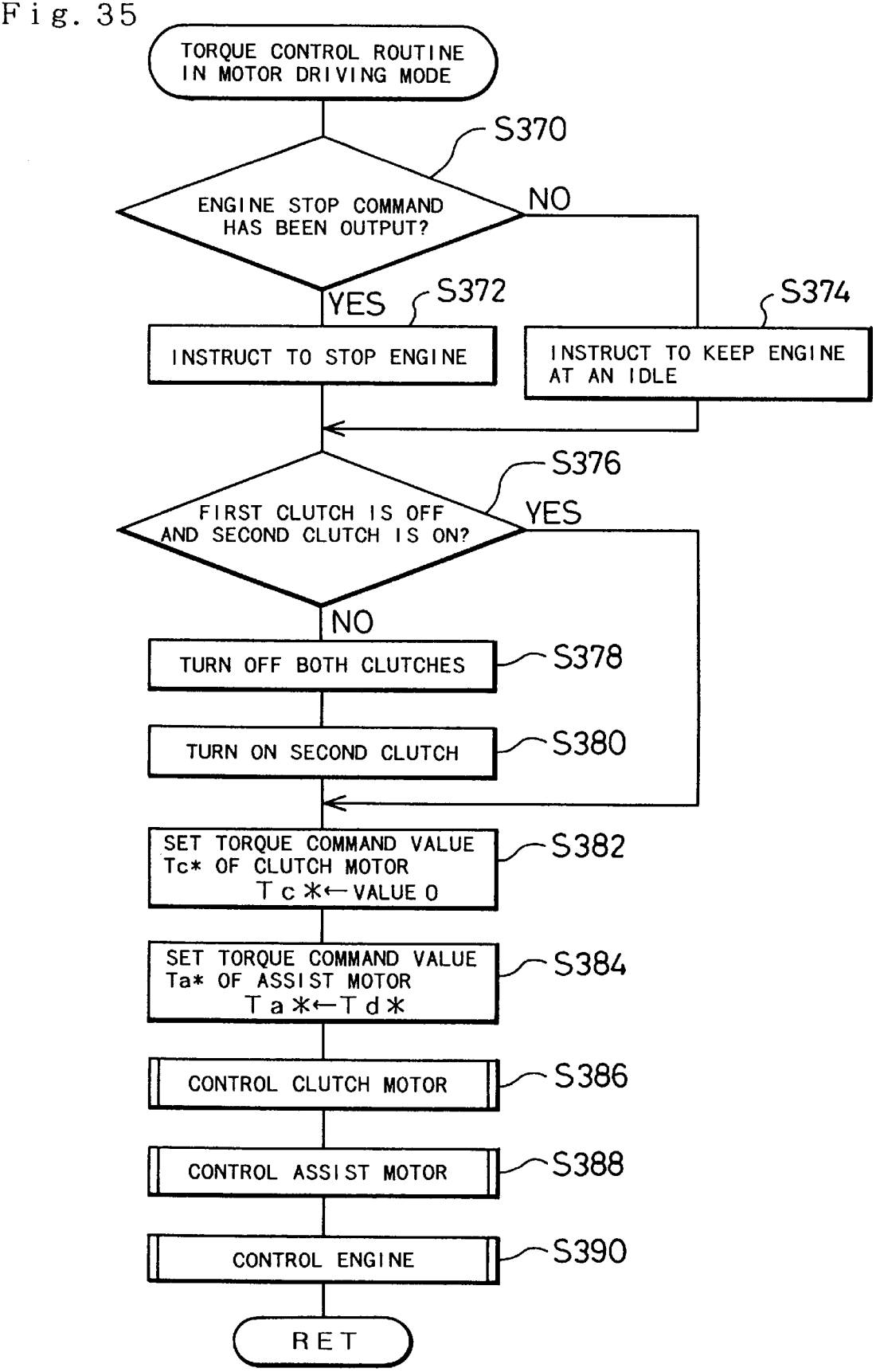
FIG. 35 is a flowchart showing a torque control routine in the motor driving mode executed by the control CPU 90 of the controller 80.

The torque control in the motor driving mode at step S120 in the flowchart of FIG. 11 is carried out according to a torque control routine in the motor driving mode shown in the flowchart of FIG. 35. As discussed previously, the motor driving mode is selected as the optimal operation mode of the power output apparatus 20 at step S144 in the flowchart of FIG. 13, when it is determined at step S142 that the energy Pd to be output to the drive shaft 22 is smaller than the predetermined energy PML and that the revolving speed Nd of the drive shaft 22 is lower than the predetermined revolving speed NML. This routine is executed under such conditions.

When the program enters the routine of FIG. 35, the control CPU 90 of the controller 80 first determines whether or not an operation stop command of the engine 50 has been output at step S370. When the operation stop command of the engine 50 has been output, the control CPU 90 transmits a signal to the EFIECU 70 to stop the operation of the engine 50 at step S372. When the operation stop command of the engine 50 has not been output, on the contrary, the control CPU 90 transmits a signal to the EFIECU 70 to keep the engine 50 at an idle at step S374. The operation stop command of the engine 50 may be output from the EFIECU 70 according to the operating conditions of the engine 50 and the conditions of a catalytic converter (not shown) disposed in an exhaust manifold of the engine 50, or alternatively output when the driver turns on a switch (not shown) to instruct a stop of the engine 50. Although the control process of the engine 50 is shown as step S390 in the flowchart of FIG. 35 for the convenience of illustration, the actual control procedure of the engine 50 is carried out independently of this torque control routine as discussed previously. In accordance with the actual procedure, when the control CPU 90 of the controller 80 transmits the signal to the EFIECU 70 to stop the operation of the engine 50 or to keep the engine 50 at an idle, the EFIECU 70 immediately starts the control of the engine 50 in order to stop the operation of the engine 50 or keep the engine 50 at an idle. When the operation stop command of the engine 50 has been output, the actual control procedure of the engine 50 stops fuel injection from the fuel injection valve 51 as well as application of the voltage to the ignition plug 62. When the signal is transmitted to keep the engine 50 at an idle, on the other hand, the actual control procedure of the engine 50 fully closes the throttle valve 66 and subsequently regulates the amount of fuel injection as well as the position of an idle speed control valve (not shown) disposed in a connection pipe for idling control (not shown) that bypasses the throttle valve 66 in order to enable the engine 50 to be driven at an idle revolving speed.

The control CPU 90 determines whether or not the first clutch 45 is in OFF position and the second clutch 46 is in ON position (that is, the structure shown in the schematic view of FIG. 3) at step S376. When the current states of the clutches 45 and 46 are not identical with the target states, both the clutches 45 and 46 are turned off at step S378, and only the second clutch 46 is turned on at subsequent step S380. The control CPU 90 subsequently sets the torque command value Tc* of the clutch motor 30 equal to zero at step S382, and sets the output torque command value Td* to be output to the drive shaft 22 to the torque command value Ta* of the assist motor 40 at step S384. The program then carries out the processing of step S386 through S390 to control the clutch motor 30, the assist motor 40, and the engine 50. The control operation of the clutch motor 30 under the condition of the torque command value Tc*=0 may follow the clutch motor control routine shown in the flowchart of FIG. 19. In this embodiment, however, the control operation of the clutch motor 30 turns off the transistors Tr1, Tr3, and Tr5 in the first driving circuit 91 while turning on the transistors Tr2, Tr4, and Tr6, in order to make the electric currents flowing through the respective phases of the three-phase coils 34 of the clutch motor 30 all equal to zero.

The torque control process in the motor driving mode discussed above sets the first clutch 45 in OFF position and the second clutch 46 in ON position so as to enable the power output apparatus 20 to have the structure shown in the schematic view of FIG. 3, while setting the torque command value Tc* of the clutch motor 30 equal to zero. This enables the vehicle to be driven only with the power output from the assist motor 40. This torque control process is carried out to stop the operation of the engine 50 or otherwise to keep the engine 50 at an idle, when the energy Pd to be output to the drive shaft 22 represents a driving point having the low efficiency of the engine 50. This accordingly prevents the energy efficiency from being lowered due to the operation of the engine 50 at the driving point of low efficiency.

In this embodiment, the torque control process in the motor driving mode sets the first clutch 45 in OFF position and the second clutch 46 in ON position so as to enable the power output apparatus 20 to have the structure shown in the schematic view of FIG. 3, thereby allowing the assist motor 40 to output the power to the drive shaft 22. In accordance with another possible structure, the torque control in the motor driving mode may set the first clutch 45 in ON position and the second clutch 46 in OFF position so as to enable the power output apparatus 20 to have the structure shown in the schematic view of FIG. 4, thereby allowing both the clutch motor 30 and the assist motor 40 to output the power to the drive shaft 22. Such torque control in the motor driving mode follows, for example, a modified torque control routine in the motor driving mode shown in the flowchart of FIG. 36. The modified torque control process in the motor driving mode is described briefly.

In this modified routine, after transmitting the signal to the EFIECU 70 to stop the operation of the engine 50 or otherwise to keep the engine 50 at an idle (steps S400 through S404), the control CPU 90 determines whether or not the first clutch 45 is in ON position and the second clutch 46 is in OFF position (that is, the structure shown in the schematic view of FIG. 4) at step S406. When the current states of the clutches 45 and 46 are not identical with the target states, both the clutches 45 and 46 are turned off at step S408, and only the first clutch 45 is turned on at subsequent step S410. The control CPU 90 subsequently sets the output torque command value Td* to be output to the drive shaft 22 to both the torque command value Tc* of the clutch motor 30 and the torque command value Ta* of the assist motor 40 at steps S412 and S414. The program then carries out the processing of steps S416 through S419 to control the clutch motor 30, the assist motor 40, and the engine 50. Setting the output torque command value Td* to the torque command value Tc* of the clutch motor 30 enables the clutch motor 30 to output the torque corresponding to the output torque command value Td* to the drive shaft 22. The output torque command value Td* is also set to the torque command value Ta* of the assist motor 40, because of the following reason. When the clutch motor 30 outputs the torque corresponding to the output torque command value Td* to the drive shaft 22, a torque having the same magnitude but the reverse direction is output as a reaction force to the crankshaft 56. The assist motor 40 is accordingly required to output a torque that cancels the torque as the reaction force. Although the output torque command value Td* is set to the torque command value Ta* of the assist motor 40 at step S414 in the flowchart of FIG. 36, the assist motor 40 may be locked up when the engine 50 is at a stop. When the engine 50 is kept at an idle, the torque command value Ta* of the assist motor 40 may be feedback controlled to make the revolving speed Ne of the crankshaft 56 equal to an idle revolving speed.

In the embodiment, the torque control process in the motor driving mode sets the first clutch 45 in OFF position and the second clutch 46 in ON position so as to enable the power output apparatus 20 to have the structure shown in the schematic view of FIG. 3, thereby allowing the assist motor 40 to output the power to the drive shaft 22. In accordance with still another possible structure, the torque control in the motor driving mode may set both the clutches 45 and 46 in ON position so as to enable the power output apparatus 20 to have the structure shown in the schematic view of FIG. 9, thereby allowing the assist motor 40 to drive the drive shaft 22. Such torque control in the motor driving mode follows, for example, a modified torque control routine in the motor driving mode shown in the flowchart of FIG. 37. The modified torque control process in the motor driving mode is described briefly.

Figure 37:
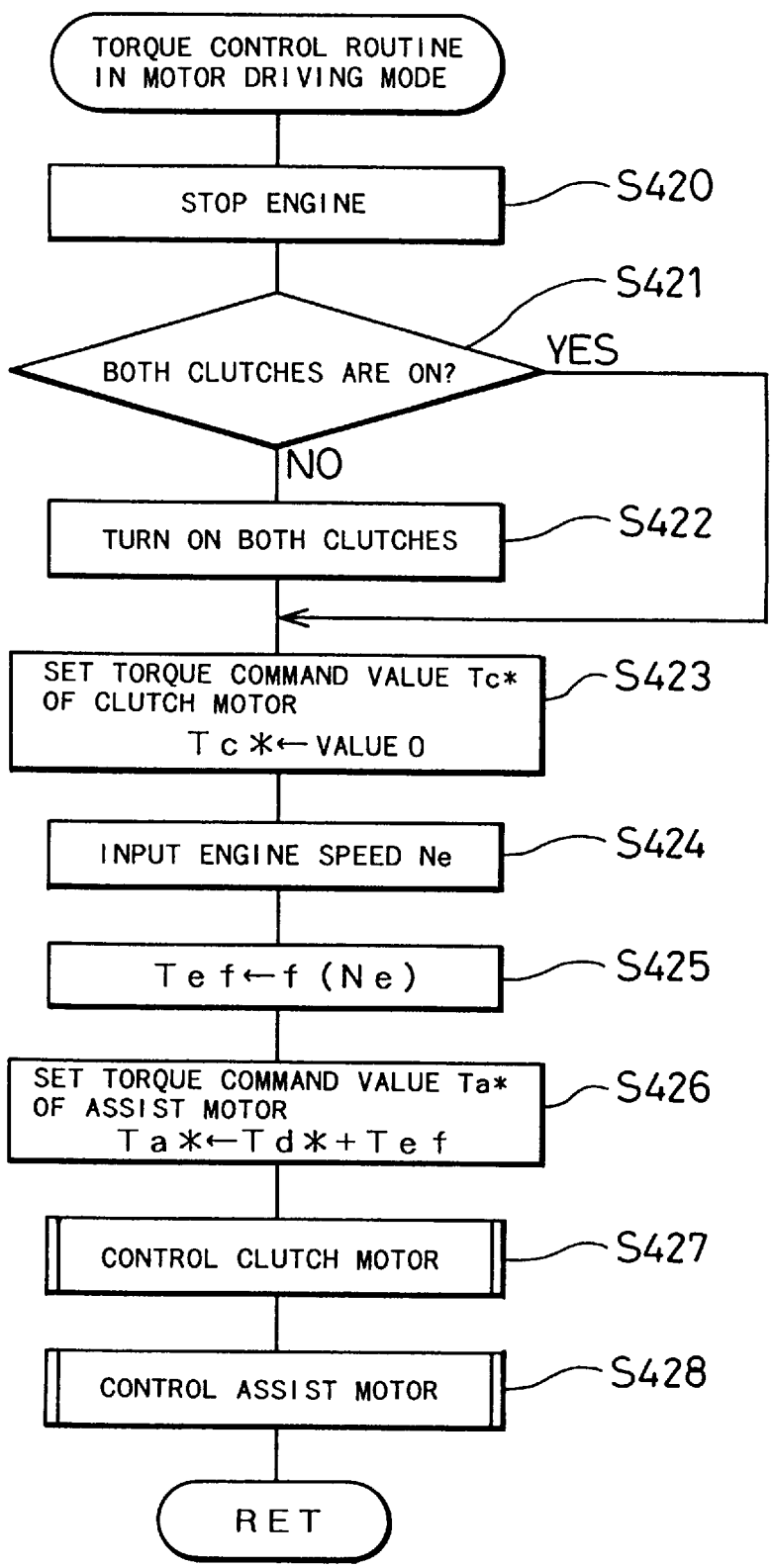
FIG. 37 is a flowchart showing a modified torque control routine in the motor driving mode.

When the program enters the modified routine of FIG. 37, the control CPU 90 of the controller 80 first transmits a signal to the EFIECU 70 to stop the operation of the engine 50 at step S420. The EFIECU 70 receives the signal to stop the operation of the engine 50, and stops ignition as well as fuel injection to the engine 50 so as to stop the operation of the engine 50. The control CPU 90 subsequently determines whether or not both the first clutch 45 and the second clutch 46 are in ON position (that is, the structure shown in the schematic view of FIG. 9) at step S421. Both the clutches 45 and 46 are set in ON position at step S422 in case that both the clutches 45 and 46 are determined not to be in ON position at step S421. At subsequent step S423, the torque command value Tc* of the clutch motor 30 is set equal to zero. The control CPU 90 then reads the revolving speed Ne of the crankshaft 56 of the engine 50 at step S424, and obtains a friction torque Tef of the engine 50 based on the input revolving speed Ne at step S425. The friction torque Tef represents a required torque for enabling the engine 50 that is at a stop to rotate at the revolving speed Ne. In this embodiment, the relationship between the revolving speed Ne of the engine 50 and the friction torque Tef is determined experimentally or otherwise and stored in advance as a map (not shown) in the ROM 90b. In accordance with a concrete procedure, at step S425, the friction torque Tef corresponding to the input revolving speed Ne is read from the map stored in the ROM 90b. The sum of the friction torque Tef thus obtained and the output torque command value Td* to be output to the drive shaft 22 is then set as the torque command value Ta* of the assist motor 40 at step S426.

The program subsequently carries out the control of the clutch motor 30 and the assist motor 40 based on the preset values at steps S427 and S428.

The modified torque control process in the motor driving mode sets the sum of the friction torque Tef and the output torque command value Td* to the torque command value Ta* of the assist motor 40, thereby enabling the torque (the value Td*) corresponding to the step-on amount of the accelerator pedal 64 to be output to the drive shaft 22 while the engine 50 is kept in the follow-up state with both the clutches 45 and 46 in ON position. This modified routine determines the friction torque Tef of the engine 50 based on the revolving speed Ne of the engine 50. The friction torque Tef may, however, be determined according to the revolving speed Nd of the drive shaft 22, since both the clutches 45 and 46 are in ON position and the crank shaft 56 and the drive shaft 22 are mechanically linked with each other.

The operation control procedure discussed above enables the desired power required by the driver to be output to the drive shaft 22. The operation mode of highest possible efficiency is selected according to the power (energy Pd)

required by the driver, the remaining charge BRM of the battery 94, and the revolving speed Nd of the drive shaft 22. This enhances the energy efficiency of the whole power output apparatus 20. The first clutch 45 and the second clutch 46 are operated according to the target revolving speed Ne* of the engine 50 and the revolving speed Nd of the drive shaft 22 in the respective operation modes. This structure effectively reduces the energy loss of the clutch motor 30 and the assist motor 40 in the process of torque conversion of the power output from the engine 50. This further enhances the energy efficiency of the whole power output apparatus 20.

In the operation control procedure of the embodiment, the appropriate torque control process is selected among the torque control processes in the ordinary driving mode, in the charge-discharge mode, in the power assist mode, in the direct output mode, and in the motor driving mode, based on the power (energy Pd) required by the driver, the remaining charge BRM of the battery 94, and the revolving speed Nd of the drive shaft 22. Part of these torque control processes may, however, be omitted according to the requirements.

In the operation control procedure of the embodiment, the torque control process in the direct output mode is carried out when both the torque command value Td* to be output to the drive shaft 22 and the revolving speed Nd of the drive shaft 22 are within the efficient driving range of the engine 50 (that is, the area PA shown in FIG. 14). In accordance with another possible structure, the torque control process in the direct output mode may be carried out when both the target revolving speed Ne* of the engine 50 and the revolving speed Nd of the drive shaft 22 are within a predetermined range or when the revolving speed difference Nc between the revolving speed Ne of the engine 50 and the revolving speed Nd of the drive shaft 22 is within a predetermined range. The motor generally has the highest efficiency in the driving state close to the rated value and lowers its efficiency in the driving state remarkably apart from the rated value. The revolving speed of the clutch motor 30 represents the revolving speed difference Nc between the revolving speed Ne of the engine 50 and the revolving speed Nd of the drive shaft 22, and is equal to the difference between the target revolving speed Ne* of the engine 50 and the revolving speed Nd of the drive shaft 22 in a stationary state. When the difference is smaller, the clutch motor 30 is driven at a smaller revolving speed and has a lower efficiency. As discussed previously, the torque control process in the direct output mode sets both the first clutch 45 and the second clutch 46 in ON position and mechanically links the crankshaft 56 with the drive shaft 22, so as to enable the power output apparatus 20 to have the structure of FIG. 9 without the clutch motor 30. The torque control in the direct output mode, which is carried out when the clutch motor 30 is driven at a small revolving speed, accordingly prevents the energy efficiency of the whole power output apparatus 20 from being lowered with a decrease in efficiency of the clutch motor 30. When the difference between the target revolving speed Ne* of the engine 50 and the revolving speed Nd of the drive shaft 22 is small, the difference between the target torque Te* of the engine 50 and the torque command value Td* to be output to the drive shaft 22 also becomes small. This condition generally corresponds to the efficient driving range of the engine 50 (the area PA shown in FIG. 14).

Figure 9:
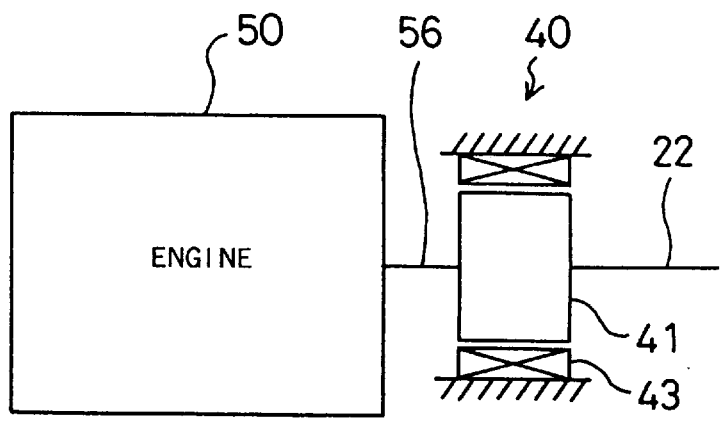
FIG. 9 schematically shows structure of the power output apparatus 20 of the present invention, wherein both the first clutch 45 and the second clutch 46 are in ON position.

In the operation control procedure of the embodiment, the torque control process in the direct output mode is carried out when both the torque command value Td* to be output to the drive shaft 22 and the revolving speed Nd of the drive shaft 22 are within the efficient driving range of the engine 50 (that is, the area PA shown in FIG. 14) or when the revolving speed Nd of the drive shaft 22 is within the efficient driving range of the engine 50 while the torque command value Td* is not within this range (see FIGS. 32 and 33). In the structure of FIG. 9 wherein both the first clutch 45 and the second clutch 46 are in ON position, the crankshaft 56 and the drive shaft 22 are connected to each other via the rotor-rotating shaft 38, so that the torque can be increased or decreased by the assist motor 40 under the condition that the revolving speed Ne of the engine 50 is identical with the revolving speed Nd of the drive shaft 22. The torque control in the structure of FIG. 9 is accordingly not restricted to the procedure when the revolving speed Nd of the drive shaft 22 is within the efficient driving range of the engine 50. For example, when some abnormality arises in the clutch motor 30, both the first clutch 45 and the second clutch 46 are set in ON position to attain the structure of FIG. 9 without the clutch motor 30, thereby enabling the power to be output from the engine 50 and the assist motor 40 to the drive shaft 22. When the vehicle starts driving or when the vehicle speed is sufficiently low to make the revolving speed Nd of the drive shaft 22 not higher than the minimum operable speed of the engine 50, the control procedure may keep the engine 50 in the follow-up state and enable the power to be output from the assist motor 40 to the drive shaft 22, thereby driving the vehicle. In case that the revolving speed Nd of the drive shaft 22 becomes equal to or higher than the minimum operable speed of the engine 50, the control procedure starts the engine 50 and enables the sum of the power output from the engine 50 and the power output from the assist motor 40 to be output to the drive shaft 22, thereby driving the vehicle. This structure can output the power to the drive shaft 22 in order to drive the vehicle even when some abnormality arises in the clutch motor 30.

In the operation control procedure of the embodiment, the torque control process in the motor driving mode is carried out when it is determined that the energy Pd to be output to the drive shaft 22 is smaller than the predetermined energy PML and that the revolving speed Nd of the drive shaft 22 is lower than the predetermined revolving speed NML. In accordance with another possible structure, however, the torque control process in the motor driving mode may be carried out irrespective of the energy Pd to be output to the drive shaft 22 or the revolving speed Nd of the drive shaft 22. For example, the torque control process in the motor driving mode may be carried out when the driver turns on a motor driving mode-setting switch (not shown).

D. Starting Control of Engine

The following describes a starting control process of the engine 50 executed by the power output apparatus 20 of the embodiment. The power output apparatus 20 of the embodiment can start the engine 50 not only when the vehicle is at a stop but while the vehicle is in a driving state. In the latter case, the vehicle starts driving by the torque control process in the motor driving mode while the engine 50 is at a stop, and it is then required to start the engine 50 so as to carry out the torque control process in another operation mode. The following describes first the starting control of the engine 50 while the vehicle is at a stop based on an engine starting process routine shown in the flowchart of FIG. 38 and then the starting control of the engine 50 while the vehicle is in a driving state.

Figure 38:
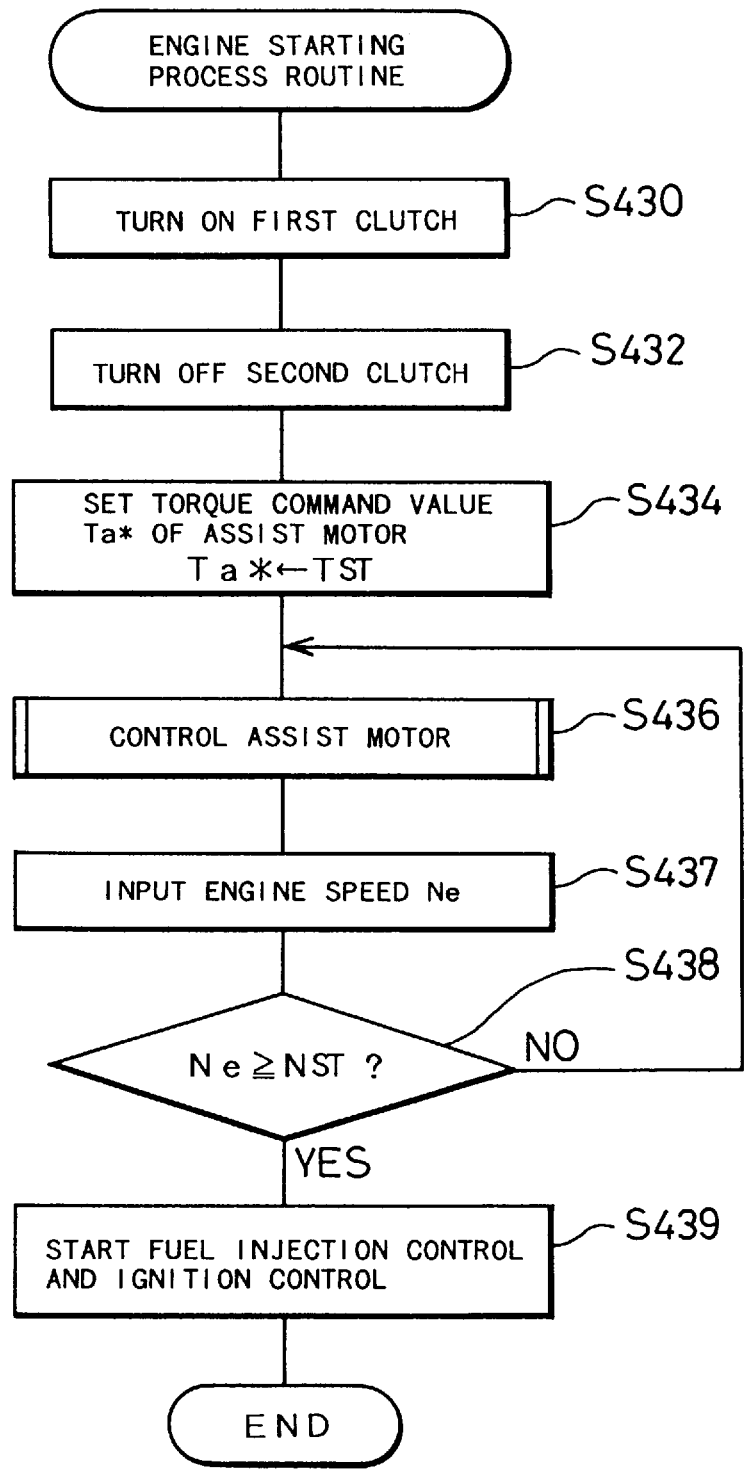
FIG. 38 is a flowchart showing an engine starting process routine executed by the control CPU 90 of the controller 80.

The engine starting process routine shown in the flowchart of FIG. 38 is executed, for example, when the driver turns on the starter switch 79. When the program enters the routine of FIG. 38, the control CPU 90 of the controller 80 first sets the first clutch 45 in ON position at step S430 and sets the second clutch 46 in OFF position at step S432, so as to enable the power output apparatus 20 to have the structure shown in the schematic view of FIG. 4. The control CPU 90 then sets a starter torque TST to the torque command value Ta* of the assist motor 40 at step S434, and controls the assist motor 40 at step S436. The operation of the clutches 45 and 46 and the control of the assist motor 40 in this manner allows motoring of the crankshaft 56 of the engine 50. The starter torque TST is set to overcome a friction torque of the engine 50 and rotate the engine 50 at a revolving speed of not lower than a predetermined speed NST. When the starter switch 79 is ON, the torque command value Tc* of the clutch motor 30 is set equal to zero, and the transistors Tr1, Tr3, and Tr5 in the first driving circuit 91 are off while the transistors Tr2, Tr4, and Tr6 are on. Even when the inner rotor 31 of the clutch motor 30 rotates with the rotation of the crankshaft 56, this structure keeps the electric currents flowing through the respective phases of the three-phase coils 34 of the clutch motor 30 equal to zero. The inner rotor 31 of the clutch motor 30 is accordingly raced.

The control CPU 90 subsequently reads the revolving speed Ne of the engine 50 at step S437 and compares the input revolving speed Ne with the predetermined revolving speed NST at step S438. The predetermined revolving speed NST is set to be not lower than a minimum revolving speed at which the engine 50 can be stably and continuously driven. In case that the revolving speed Ne of the engine 50 is lower than the predetermined revolving speed NST, the program returns to step S436 and repeats the processing of steps S436 through S438 until the revolving speed Ne of the engine 50 becomes equal to or higher than the predetermined revolving speed NST. When the revolving speed Ne of the engine 50 is not lower than the predetermined revolving speed NST, the control CPU 90 transmits a signal to the EFIECU 70 to start the fuel injection control and the ignition control at step S439. The program then exits from this routine. The EFIECU 70 receiving the signal to start the fuel injection control and the ignition control starts the fuel injection from the fuel injection valve 51 and the ignition with the ignition plug 62 while controlling the position of the idle speed control valve (not shown), thereby enabling the engine 50 to be driven at the idle revolving speed.

The engine starting process discussed above can start the engine 50 while the vehicle is at a stop. The engine starting process sets the first clutch 45 in ON position and the second clutch 46 in OFF position, so as to connect the crankshaft 56 to the rotor 41 of the assist motor 40 and enable the engine 50 to be driven by the assist motor 40. This structure does not require any additional motor for starting the engine 50, thereby reducing the size of the whole power output apparatus 20.

The engine starting process of the embodiment sets the first clutch 45 in ON position and the second clutch 46 in OFF position in order to enable the assist motor 40 to motor the engine 50. In accordance with another possible structure, the engine starting process may set the first clutch 45 in OFF position and the second clutch 46 in ON position in order to enable the clutch motor 30 to motor the engine 50. Such engine starting process follows an engine starting process routine shown in the flowchart of FIG. 39, which is described briefly.

Figure 39:
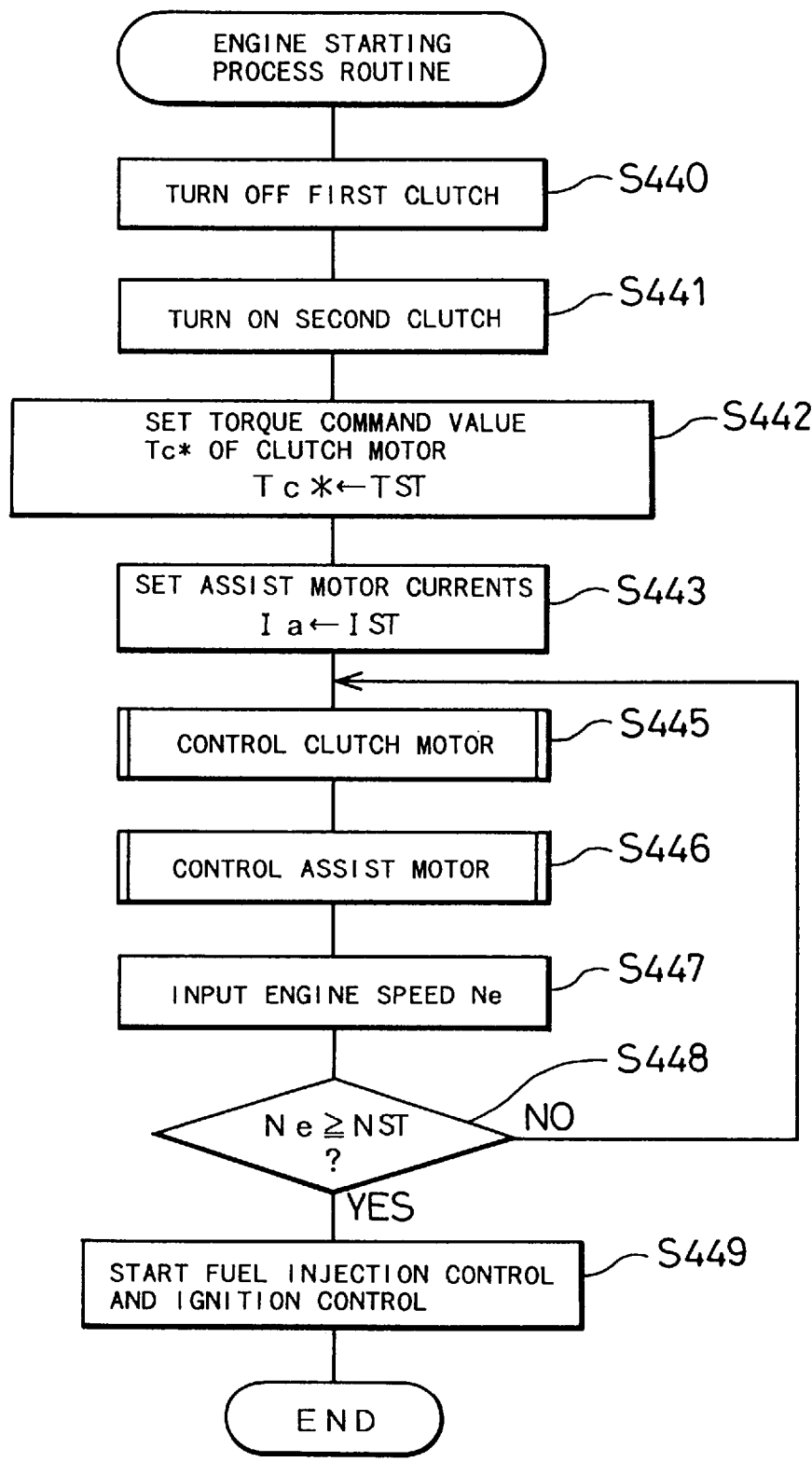
FIG. 39 is a flowchart showing a modified engine starting process routine.

When the program enters the routine of FIG. 39, the control CPU 90 of the controller 80 first sets the first clutch 45 in OFF position at step S440 and sets the second clutch 46 in ON position at step S441, so as to enable the power output apparatus 20 to have the structure shown in the schematic view of FIG. 3. The control CPU 90 then sets the starter torque TST to the torque command value Tc* of the clutch motor 30 at step S442, and specifies predetermined electric currents IST (IuST, IvST, and IwST) as the assist motor currents Ia (Iua, Iva, and Iwa) flowing through the respective phases of the three-phase coils 44 of the assist motor 40 at step S443. The program then carries out the processing of steps S445 and S446 to control the clutch motor 30 and the assist motor 40. The predetermined electric currents IST are set to be not smaller than the value of electric current that generates a torque to prevent rotation of the rotor-rotating shaft 38 in the assist motor 40 even when the starter torque TST is applied to the rotor-rotating shaft 38. The control of the clutch motor 30 and the assist motor 40 in this manner enables the drive shaft 22 linked with the rotor-rotating shaft 38 by means of the second clutch 46 to be fixed and restricted its rotation by the assist motor 40. The crankshaft 56 of the engine 50 is accordingly motored by the clutch motor 30, which outputs the starter torque TST to the crankshaft 56 as the reaction force of the torque supported by the assist motor 40. In the same manner as the engine starting process routine of FIG. 38, the control CPU 90 then waits until the revolving speed Ne of the engine 50 becomes equal to or higher than the predetermined revolving speed NST at steps S447 and S448 and transmits a signal to the EFIECU 70 to start the fuel injection control and the ignition control at step S449.

In the structure of FIG. 3 wherein the first clutch 45 is in OFF position and the second clutch 46 is in ON position, the engine starting process can start the engine 50 by means of the clutch motor 30 and the assist motor 40 while the vehicle is at a stop. This structure also does not require any additional motor for starting the engine 50, thereby reducing the size of the whole power output apparatus 20.

Figure 40:
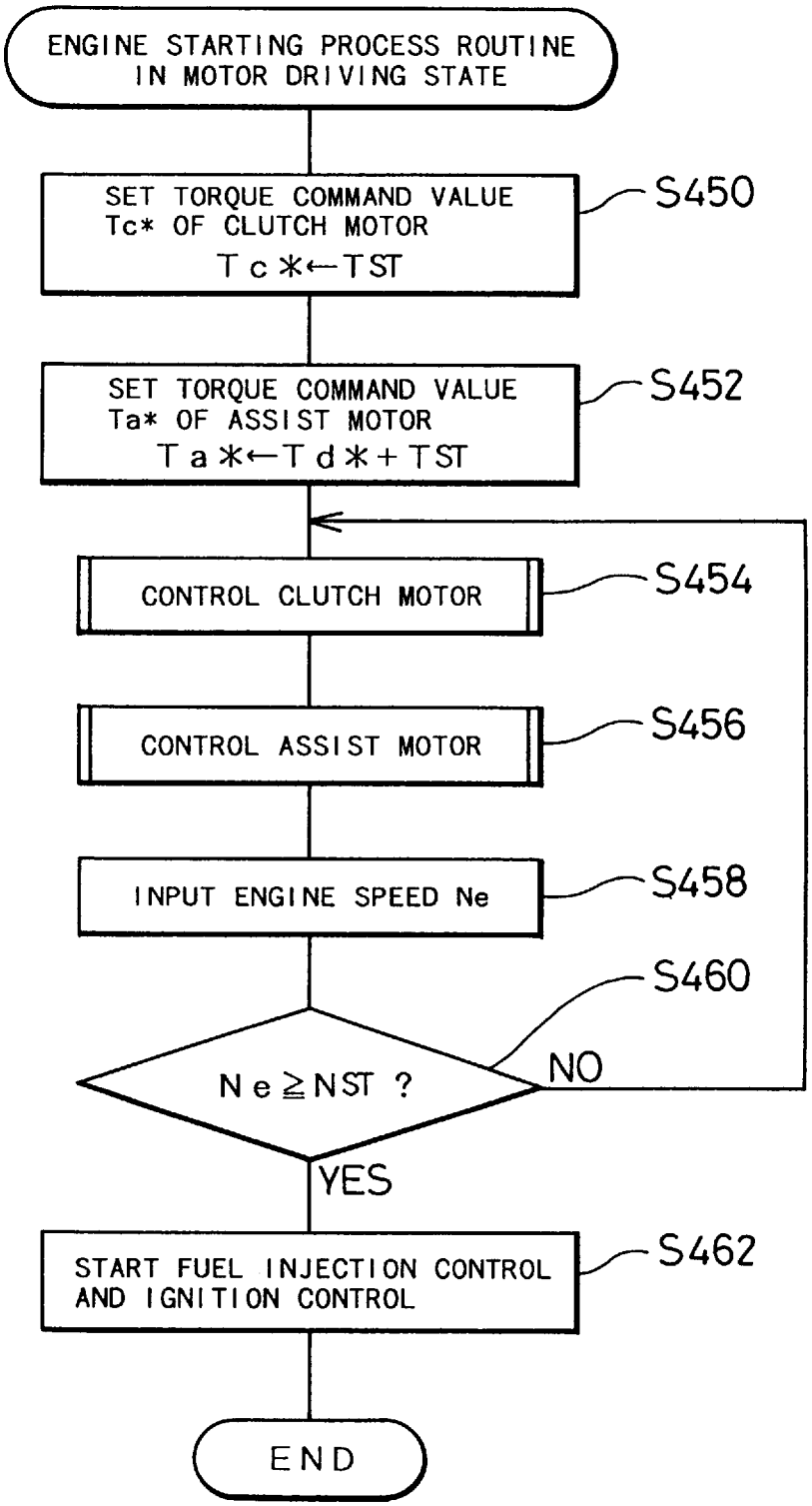
FIG. 40 is a flowchart showing an engine starting process routine in the motor driving state executed by the control CPU 90 of the controller 80.

The following describes the starting process of the engine 50 while the vehicle is in a driving state, which follows an engine starting process routine in the motor driving state shown in the flowchart of FIG. 40. This routine is executed when an operation mode other than the motor driving mode is selected in the operation mode determination routine of FIG. 13; for example, when the driver turns on the switch (not shown) to start the engine 50 or when the remaining charge BRM of the battery 94 becomes smaller than the first threshold value BL while the engine 50 is at a stop and the torque control process in the motor driving mode is carried out. In this embodiment, the torque control process in the motor driving mode is carried out according to the torque control routine in the motor driving mode shown in the flowchart of FIG. 35, that is, the process of outputting the torque command value Td* from the assist motor 40 to the drive shaft 22 when the power output apparatus 20 has the structure of FIG. 3 wherein the first clutch 45 is in OFF position and the second clutch 46 is in ON position.

When the program enters the routine of FIG. 40, the control CPU 90 of the controller 80 first sets the starter torque TST to the torque command value Tc* of the clutch motor 30 at step S450, and sets the sum of the torque command value Td* and the starter torque TST to the torque command value Ta* of the assist motor 40 at step S452. The program then carries out the processing of steps S454 and S456 to control the clutch motor 30 and the assist motor 40. As discussed previously, this routine is carried out when the power output apparatus 20 has the structure shown in FIG. 3. When the clutch motor 30 outputs the starter torque TST to the crankshaft 56 in this structure, the engine 50 is motored with this torque. At this moment, a torque having the same magnitude as but the reverse direction of the starter torque TST is output from the clutch motor 30 to the drive shaft 22 as the reaction force of the starter torque TST. If the output torque command value Td* is set to the torque command value Ta* of the assist motor 40 in the same manner as the processing at step S384 in the torque control routine in the motor driving mode shown in FIG. 35, the resulting torque output to the drive shaft 22 is smaller than the torque required by the driver (that is, the output torque command value Td*) by the torque output from the clutch motor 30 to the drive shaft 22. This causes a torque shock when the engine 50 starts operation. The structure of this embodiment, however, sets the sum of the output torque command value Td* and the starter torque TST to the torque command value Ta* of the assist motor 40 at step S452, thereby canceling such torque shock.

After motoring of the engine 50 by means of the clutch motor 30, like the processing of steps S437 and S438 in the engine starting process routine of FIG. 38, the control CPU 90 waits until the revolving speed Ne of the engine 50 becomes equal to or higher than the predetermined revolving speed NST at steps S458 and S460 and transmits a signal to the EFIECU 70 to start the fuel injection control and the ignition control at step S462.

The engine starting process routine in the motor driving state of the embodiment discussed above can start the engine 50 while the vehicle is driven only with the power output from the assist motor 40. Since the clutch motor 30 works to start the engine 50, no additional motor is required to start the engine 50. The torque output from the assist motor 40 to the drive shaft 22 is regulated to cancel the torque output from the clutch motor 30 to the drive shaft 22 in the course of motoring the engine 50. This effectively reduces or even eliminates the torque shock that may occur at the time of starting the engine 50.

Figure 36:
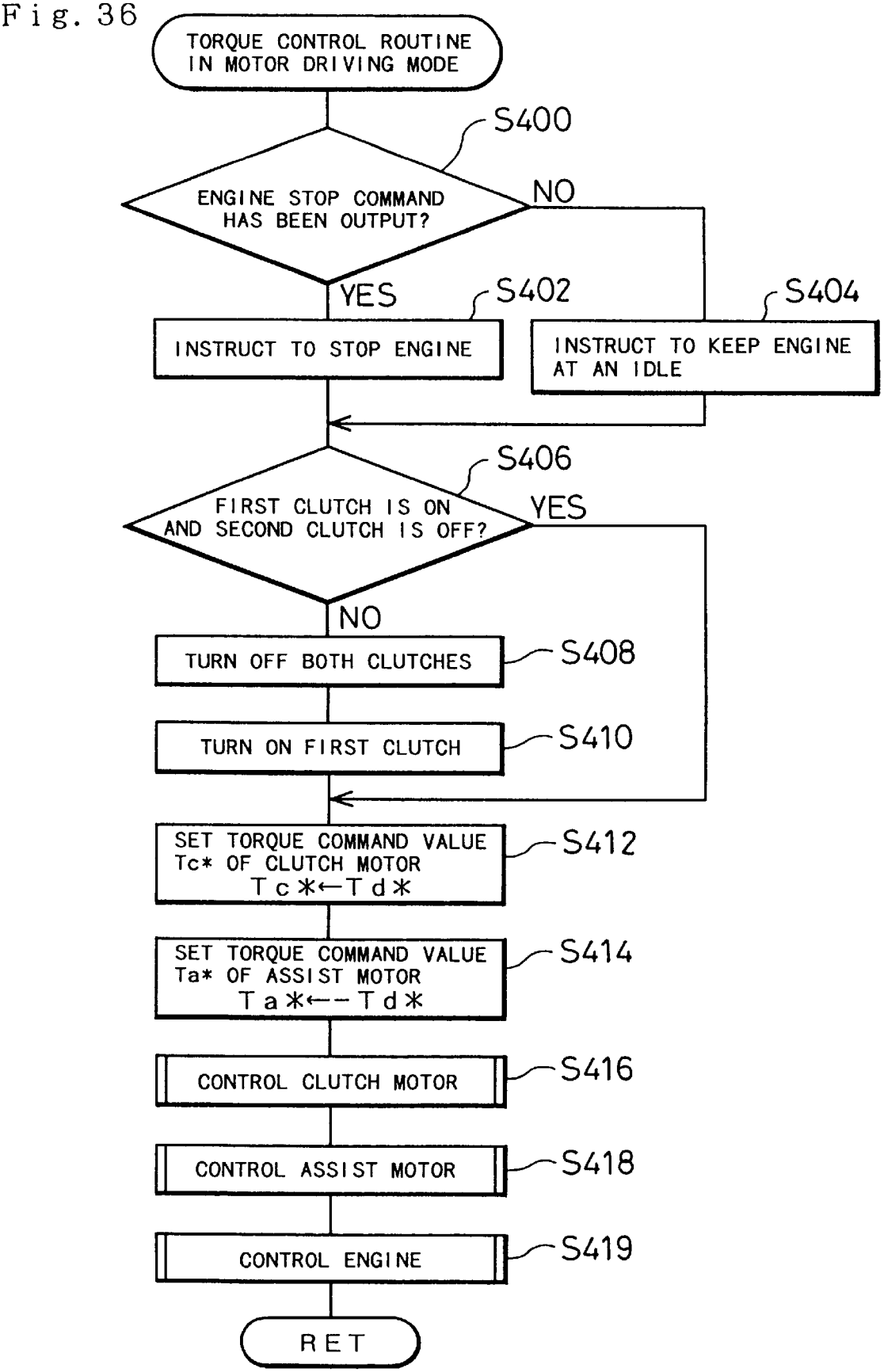
FIG. 36 is a flowchart showing a modified torque control routine in the motor driving mode.

The engine starting process routine in the motor driving state of the embodiment starts the engine 50 while the torque control routine in the motor driving mode shown in the flowchart of FIG. 35 is carried out to output a desired torque (torque command value Td*) from the assist motor 40 to the drive shaft 22 when the power output apparatus 20 has the structure shown in FIG. 3, wherein the first clutch 45 is in OFF position and the second clutch 46 is in ON position. Another engine starting process routine in the motor driving mode shown in the flowchart of FIG. 41 is alternatively executed to start the engine 50 while the torque control routine in the motor driving mode shown in the flowchart of FIG. 36 is carried out to fix the crankshaft 56 by means of the assist motor 40 and output the torque command value Td* from the clutch motor 30 to the drive shaft 22 when the power output apparatus 20 has the structure shown in FIG. 4, wherein the first clutch 45 is in ON position and the second clutch 46 is in OFF position.

Figure 41:
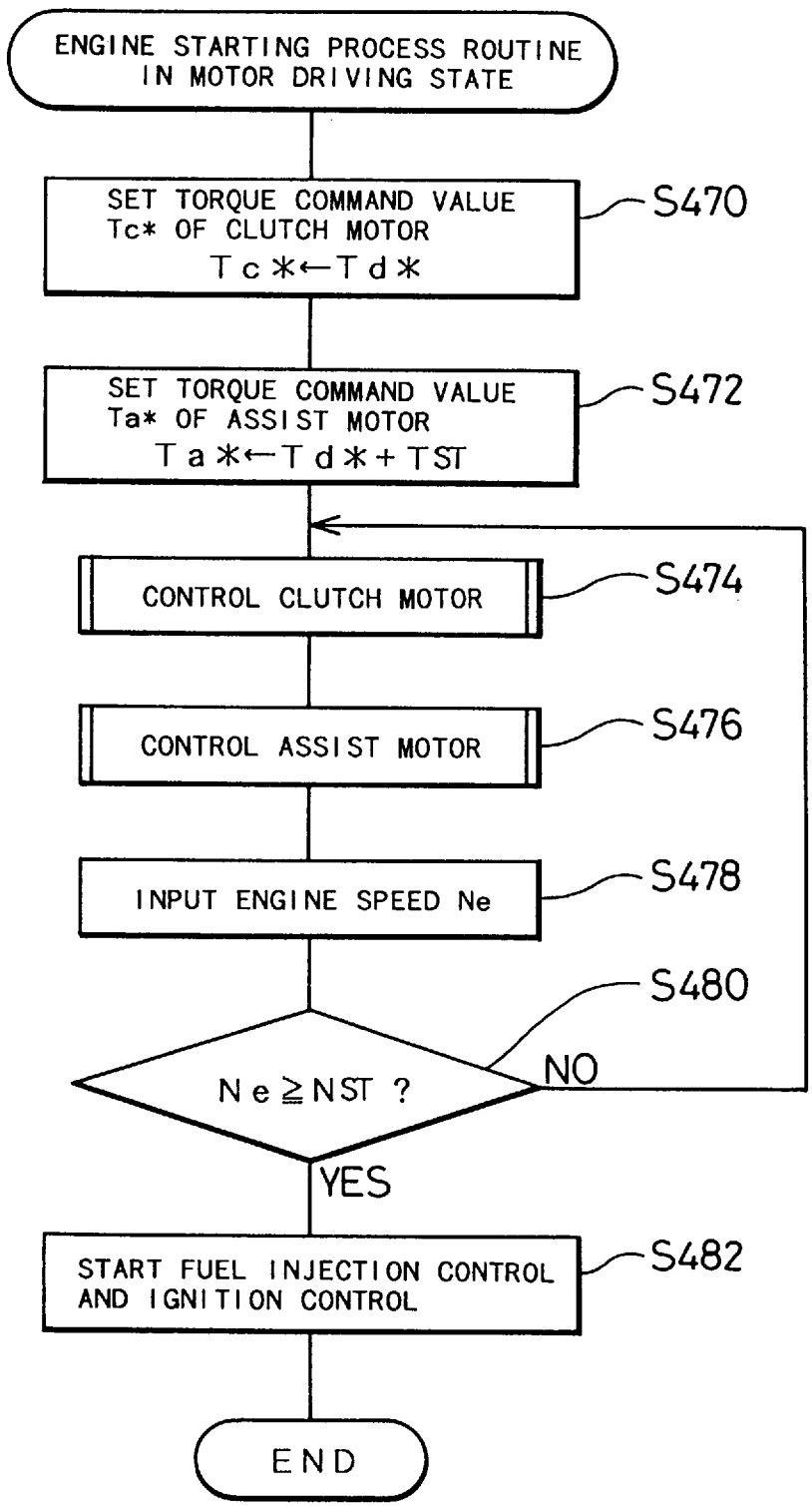
FIG. 41 is a flowchart showing a modified engine starting process routine in the motor driving state.

When the program enters the routine of FIG. 41, the control CPU 90 of the controller 80 first sets the output torque command value Td* to be output to the drive shaft 22 to the torque command value Tc* of the clutch motor 30 at step S470, and the sum of the output torque command value Td* and the starter torque TST to the torque command value Ta* of the assist motor 40 at step S472. The program then carries out the processing of steps S474 and S476 to control the clutch motor 30 and the assist motor 40. As discussed previously, this routine is carried out when the power output apparatus 20 has the structure shown in FIG. 4. In this structure, the assist motor 40 outputs the torque as the reaction force of the torque (torque command value Td*) that is output from the clutch motor 30 to the drive shaft 22, so as to fix the crankshaft 56. When the torque greater than the torque command value Td* is set to the torque command value Ta* of the assist motor 40 at step S472, the assist motor 40 can motor the engine 50. Since the torque corresponding to the torque command value Td* is output from the clutch motor 30 to the drive shaft 22 irrespective of the torque command value Ta* of the assist motor 40, there is no torque shock occurring at the time of starting the engine 50.

After motoring of the engine 50 by means of the assist motor 40, like the processing of steps S437 and S438 in the engine starting process routine of FIG. 38, the control CPU 90 waits until the revolving speed Ne of the engine 50 becomes equal to or higher than the predetermined revolving speed NST at steps S478 and S480 and transmits a signal to the EFIECU 70 to start the fuel injection control and the ignition control at step S482.

The modified engine starting process routine in the motor driving state discussed above can start the engine 50 while the vehicle is driven with the power output from the clutch motor 30 and the assist motor 40 produces the reaction force to fix the crankshaft 56. Since the assist motor 40 works to start the engine 50, no additional motor is required to start the engine 50. There is no variation in torque output from the clutch motor 30 to the drive shaft 22 in the course of motoring the engine 50. No torque shock accordingly occurs when the engine 50 starts operation.

The engine starting process routine in the motor driving state of the embodiment starts the engine 50 while the torque control routine in the motor driving mode shown in the flowchart of FIG. 35 is carried out to output a desired torque (torque command value Td*) from the assist motor 40 to the drive shaft 22 when the power output apparatus 20 has the structure shown in FIG. 3, wherein the first clutch 45 is in OFF position and the second clutch 46 is in ON position. Still another engine starting process routine in the motor driving mode shown in the flowchart of FIG. 42 is executed to start the engine 50 while the torque control routine in the motor driving mode shown in the flowchart of FIG. 37 is carried out to enable the assist motor 40 to keep the engine 50 in the follow-up state and output a desired torque (torque command value Td*) to the drive shaft 22 when the power output apparatus 20 has the structure shown in FIG. 9, wherein both the first clutch 45 and the second clutch 46 are in ON position.

Figure 42:
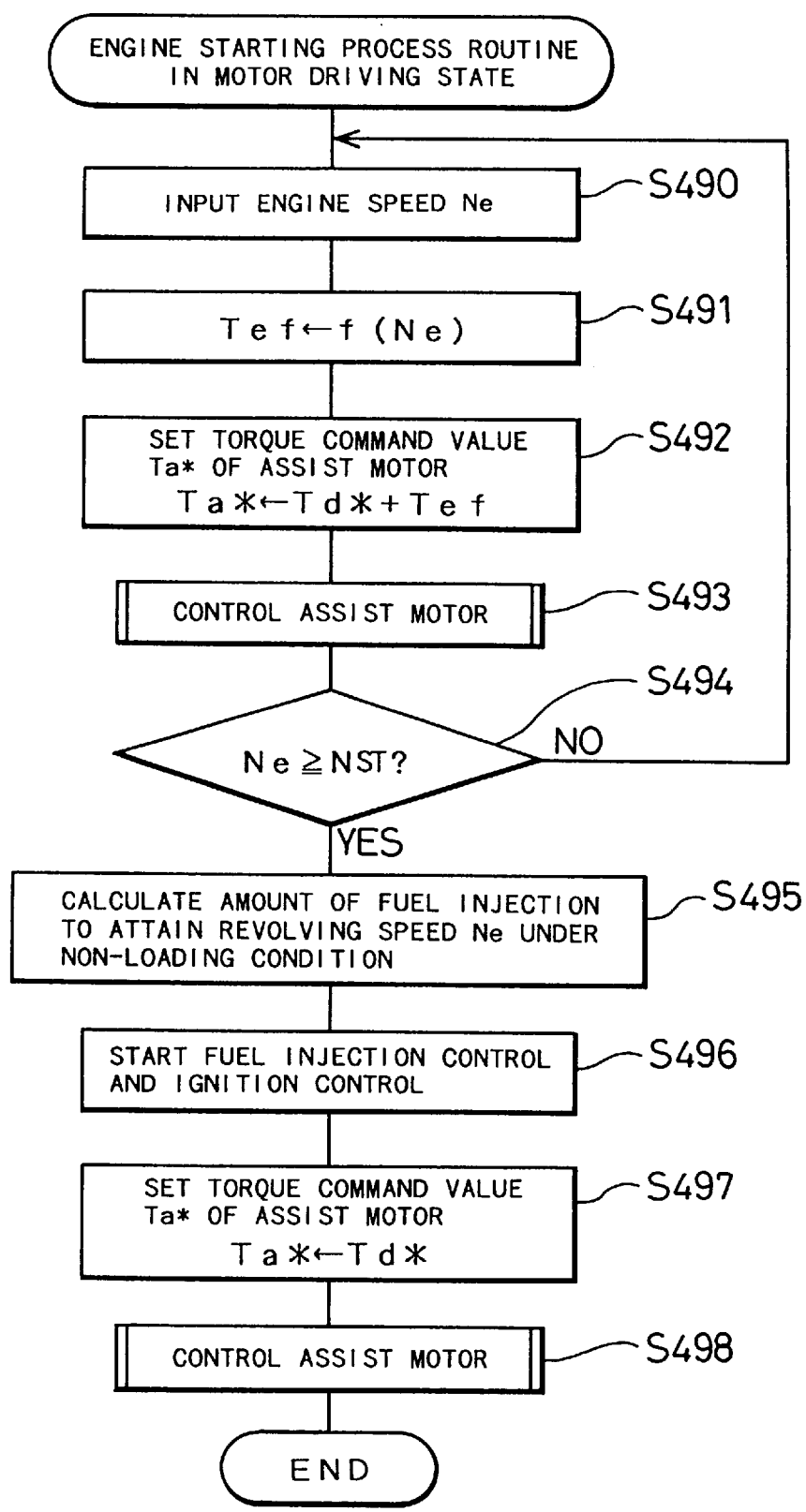
FIG. 42 is a flowchart showing a modified engine starting process routine in the motor driving state.

When the program enters the routine of FIG. 42, the control CPU 90 of the controller 80 first executes the processing identical with that of steps S424 through S426 and S428 in the torque control routine in the motor driving mode shown in the flowchart of FIG. 37. Namely the control CPU 90 reads the revolving speed Ne of the engine 50 at step S490, obtains the friction torque Tef of the engine 50 based on the input revolving speed Ne at step S491, and sets the sum of the friction torque Tef thus obtained and the torque command value Td* to the torque command value Ta* of the assist motor 40 at step S492. The control CPU 90 then controls the assist motor 40 based on this value at step S493.

The input revolving speed Ne is compared with the predetermined revolving speed NST at step S494. When the input revolving speed Ne is lower than the predetermined revolving speed NST, the program determines that the engine 50 can not be stably driven at the input revolving speed and returns to step S490 to repeat the processing of steps S490 through S494 until the revolving speed Ne becomes equal to or higher than the predetermined revolving speed NST. The processing identical with that of steps S424 through S426 and S428 in the torque control routine in the motor driving mode shown in the flowchart of FIG. 37 is repeated, since this starting process routine is executed when the assist motor 40 keeps the engine 50 in the follow-up state. In this state, the crankshaft 56 is connected to the drive shaft 22 via the first clutch 45 and the second clutch 46, so that the revolving speed Ne of the engine 50 can not be regulated prior to the revolving speed Nd of the drive shaft 22.

In case that the revolving speed Ne of the engine 50 is not lower than the predetermined revolving speed NST at step S494, the control CPU 90 calculates the amount of fuel injection when the engine 50 is driven at the revolving speed Ne under a non-loading condition at step S495, and transmits a signal to the EFIECU 70 to carry out the ignition control and the fuel injection control to inject the calculated amount of fuel from the fuel injection valve 51 at step S496. In this embodiment, the amounts of fuel injection are determined experimentally or otherwise for the respective revolving speeds Ne of the engine 50 under the non-loading condition and stored in advance as a map in the ROM 90b. In accordance with a concrete procedure, at step S495, the amount of fuel injection corresponding to the input revolving speed Ne is read from the map stored in the ROM 90b. The control CPU 90 subsequently sets the output torque command value Td* to the torque command value Ta* of the assist motor 40 at step S497 and controls the assist motor 40 at step S498. The program then exits from this routine. The friction torque Tef of the engine 50 is omitted from the value set to the torque command value Ta* of the assist motor 40, because the engine 50 is driven at the revolving speed Ne under the non-loading condition.

The modified engine starting process routine in the motor driving state discussed above can start the engine 50 while the assist motor 40 keeps the engine 50 in the follow-up state and outputs the power to the drive shaft 22. This engine starting process routine regulates the amount of fuel injection in order to enable the engine 50 to be driven at the revolving speed Ne under the non-loading condition and sets the output torque command value Td* to the torque command value Ta* of the assist motor 40, thereby effectively reducing the torque shock that occurs at the time of starting the engine 50. Although the modified engine starting process routine in the motor driving state controls the engine 50 to be driven at the revolving speed Ne under the non-loading condition, the engine 50 may be driven at the revolving speed Ne under a loading torque Te. In the latter case, the value obtained by subtracting the loading torque Te from the output torque command value Td* is set to the torque command value Ta* of the assist motor 40, in order to reduce the torque shock that occurs at the time of starting the engine 50. In the modified engine starting process routine in the motor driving state, the processing steps S490 through S494 is repeated when the revolving speed Ne of the engine 50 is lower than the predetermined revolving speed NST at step S494, since the revolving speed Ne of the engine 50 can not be regulated prior to the revolving speed Nd of the drive shaft 22. In case that the power output apparatus 20 is mounted on the structure than can change the revolving speed Nd of the drive shaft 22 relatively freely, such as a ship or an airplane, the process routine may control the revolving speed Ne of the engine 50 prior to the revolving speed Nd of the drive shaft 22.

E. Control in Reverse Driving

The following describes a control process when the power output apparatus 20 of the embodiment moves the vehicle back. The control process in the reverse driving state follows a torque control routine in the reverse driving state shown in the flowchart of FIG. 43. This routine is repeatedly executed at predetermined time 10 intervals (for example, at every 8 msec) when the gearshift position sensor 84 detects that the gearshift 82 is set in the reverse position by the driver.

Figure 43:
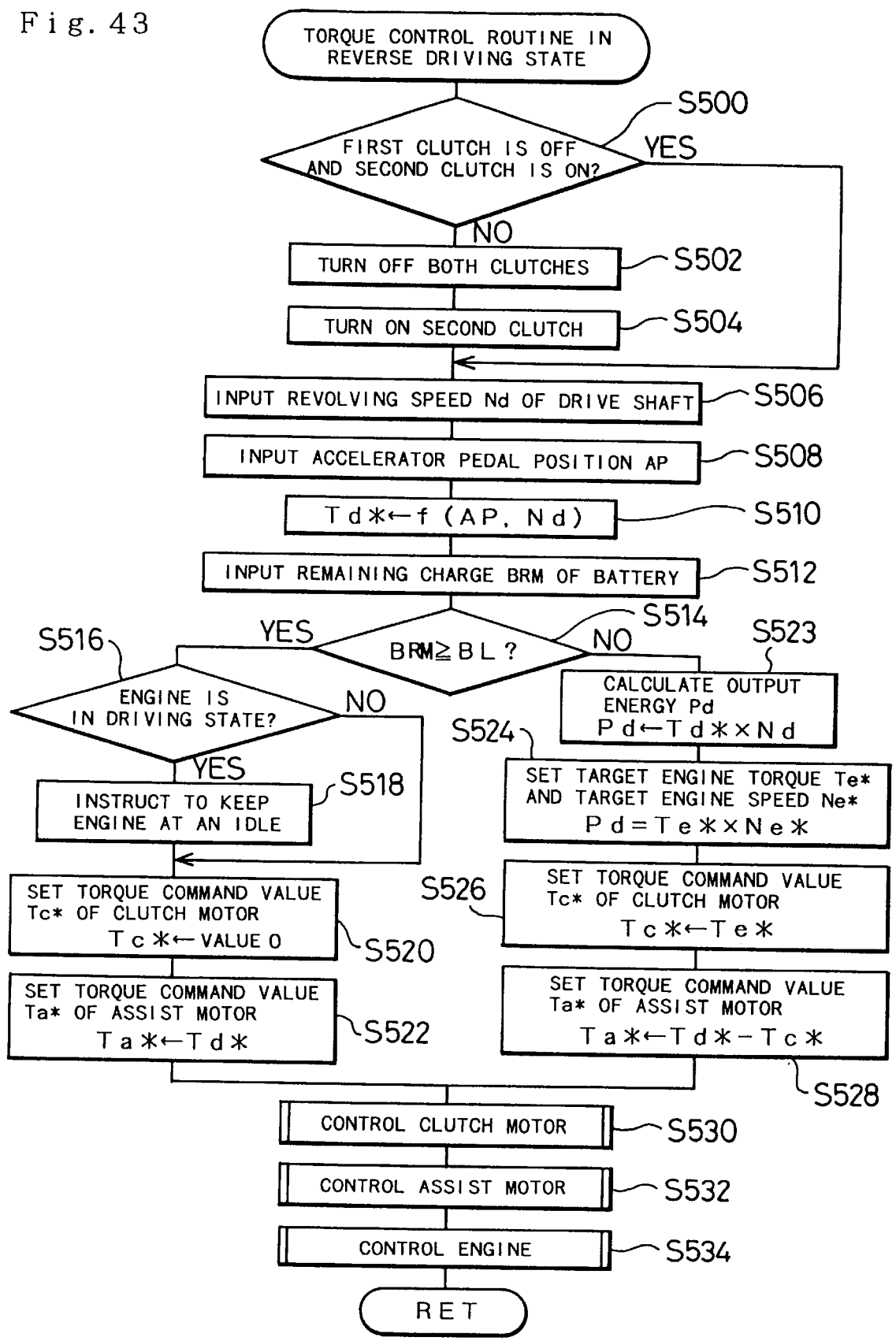
FIG. 43 is a flowchart showing a torque control routine in the reverse driving state executed by the control CPU 90 of the controller 80.

When the program enters the routine of FIG. 43, the control CPU 90 of the controller 80 first determines whether or not the first clutch 45 is in OFF position and the second clutch 46 is in ON position (that is, the structure shown in the schematic view of FIG. 3) at step S500. In case that the actual states of the clutches 45 and 46 are not identical with the target states, the control CPU 90 turns off both the clutches 45 and 46 at step S502 and turns on only the second clutch 46 at step S504. The reason why both the clutches 45 and 46 are once turned off when the actual states of the clutches 45 and 46 are not identical with the target states has been discussed previously. The control CPU 90 subsequently reads the revolving speed Nd of the drive shaft 22 at step S506 and reads the accelerator pedal position AP measured with the accelerator pedal position sensor 64a at step S508. The control CPU 90 obtains the torque (output torque command value Td*) to be output to the drive shaft 22 based on the input revolving speed Nd of the drive shaft 22 and the input accelerator pedal position AP at step S510. The procedure of obtaining the torque command value Td* is identical with the technique explained as the processing of step S104 in the operation control routine of FIG. 11. Since the gear shift 82 is set in the reverse position in this routine, a negative value is given as the torque command value Td*.

After obtaining the torque command value Td*, the control CPU 90 reads the remaining charge BRM of the battery 94 at step S512 and compares the input remaining charge BRM of the battery 94 with the first threshold value BL at step S514. In case that the remaining charge BRM of the battery 94 is not less than the first threshold value BL, the program determines that the remaining charge BRM of the battery 94 is sufficient for driving the assist motor 40 and proceeds to step S516 to determine whether or not the engine 50 is in the driving state. When the engine 50 is in the driving state, the control CPU 90 transmits a signal to the EFIECU 70 to keep the engine 50 at an idle at step S518. The control CPU 90 subsequently sets the torque command value Tc* of the clutch motor 30 equal to zero at step S520, sets the output torque command value Td* to the torque command value Ta* of the assist motor 40 at step S522, and controls the clutch motor 30, the assist motor 40, and the engine 50 at steps S530 through S534. The control procedure by the EFIECU 70 receiving the signal to keep the engine 50 at an idle and the control procedure of the clutch motor 30 when the torque command value Tc* is set equal to zero have been described previously. The electric power consumed by the assist motor 40 is supplied by the electric power discharged from the battery 94.

In case that the remaining charge BRM of the battery 94 is less than the first threshold value BL at step S514, on the contrary, the program proceeds to step S523 to calculate the energy Pd to be output to the drive shaft 22 by multiplying the torque (torque command value Td*) to be output to the drive shaft 22 by the revolving speed Nd of the drive shaft 22. The control CPU 90 then sets the target torque Te* and the target revolving speed Ne* of the engine 50 based on the calculated energy Pd at step S524. The procedure of setting the target torque Te* and the target revolving speed Ne* of the engine 50 is identical with the technique explained as the processing of step S170 in the torque control routine in the ordinary driving mode shown in the flowcharts of FIGS. 15 and 16. Although the torque command value Td* is negative as mentioned above, the revolving speed Nd of the drive shaft 22 also takes a negative value in the reverse driving state, so that the energy Pd has a positive value like in the forward driving state. The control CPU 90 subsequently sets the target engine torque Te* to the torque command value Tc* of the clutch motor 30 at step S526, sets the value obtained by subtracting the torque command value Tc* from the output torque command value Td* to the torque command value Ta* of the assist motor 40 at step S528, and controls the clutch motor 30, the assist motor 40, and the engine 50 at steps S530 through S534. Since the torque command value Td* is negative and the torque command value Tc* of the clutch motor 30 is positive, a negative value having the magnitude greater than the torque command value Td* is set to the torque command value Ta* of the assist motor 40.

Figure 44:
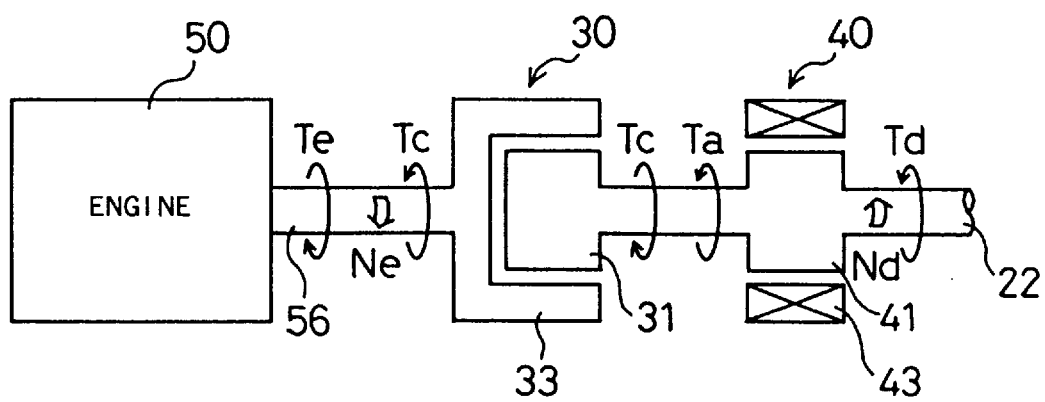
FIG. 44 shows the state of torques applied to the crankshaft 56 and the drive shaft 22 when the power output from the engine 50 is subjected to a torque conversion and applied to rotate the drive shaft 22 in a reverse direction.
Figure 45:
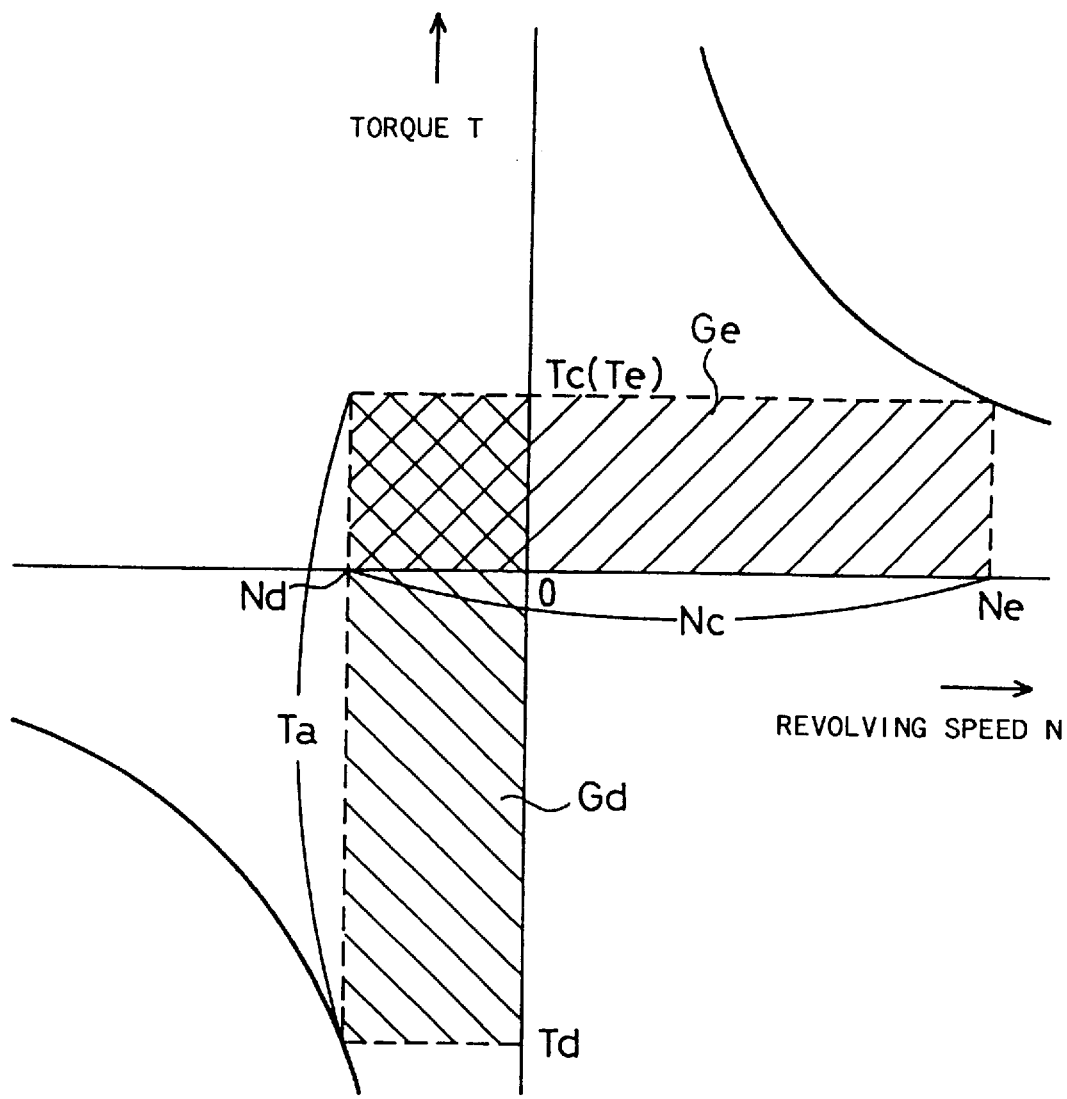
FIG. 45 shows the state of torque conversion when the power output from the engine 50 is subjected to a torque conversion and applied to rotate the drive shaft 22 in a reverse direction.

FIG. 44 shows the operating state of the engine 50, the clutch motor 30, and the assist motor 40 as well as the state of torques applied to the crankshaft 56 and the drive shaft 22 when the remaining charge BRM of the battery 94 is determined to be less than the first threshold value BL at step S514. FIG. 45 shows the state of torque conversion under such conditions. Referring to FIG. 44, the engine 50 outputs the torque Te in the direction of rotation of the crankshaft 56. The torque Tc output from the clutch motor 30 functions as the loading torque of the engine 50 and is thus applied to the crankshaft 56 in reverse of the rotation of the crankshaft 56 while being applied to the drive shaft 22 in the direction of rotation of the crankshaft 56. The drive shaft 22 rotates in reverse of the rotation of the crankshaft 56, so that the torque Tc output from the clutch motor 30 is applied to the drive shaft 22 in reverse of the rotation of the drive shaft 22. In this state, the revolving speed difference Nc between the revolving speed Ne of the engine 50 and the revolving speed Nd of the drive shaft 22 has a positive value. The clutch motor 30 accordingly carries out the regenerative operation to regenerate the electric power corresponding to the revolving speed difference Nc. Since the torque command value Ta* is negative, the torque Ta output from the assist motor 40 is applied to the drive shaft 22 in the direction of rotation of the drive shaft 22. The value obtained by subtracting the torque command value Tc* from the torque command value Td* is set to the torque command value Ta* of the assist motor 40. This not only cancels the torque Tc output from the clutch motor 30 to the drive shaft 22, but applies the torque Td corresponding to the torque command value Td* to the drive shaft 22. The electric power consumed by the assist motor 40 is supplied by the electric power regenerated by the clutch motor 30. Referring to FIG. 45, the clutch motor 30 transmits the torque Te to the drive shaft 22 and regenerates the power output from the engine 50 that is driven at a driving point defined by the torque Te and the revolving speed Ne, as energy expressed by an area Ge. The energy Ge is supplied to the assist motor 40 as energy expressed by an area Gd and thereby output to the drive shaft 22 as the power which is defined by the revolving speed Nd and the torque Td acting in reverse of the rotation of the engine 50. This torque conversion does not accompany the process of charging or discharging the battery 94.

The control process in the reverse driving state discussed above can move the vehicle back. In case that the remaining charge BRM of the battery 94 is sufficient, the assist motor 40 utilizes the electric power discharged from the battery 94 to output the power and move the vehicle back. Another procedure converts the power output from the engine 50 to the power acting in reverse of the rotation of the engine 50 by means of the clutch motor 30 and the assist motor 40, thereby moving the vehicle back. This procedure by torque conversion is implemented, irrespective of the remaining charge BRM of the battery 94. This allows the vehicle to move backward eve when the remaining charge BRM of the battery 94 is insufficient to discharge the electric power.

In the control process in the reverse driving state of the embodiment, when the remaining charge BRM of the battery 94 is less than the first threshold value BL, all the energy Pe output from the engine 50 is subjected to the torque conversion by means of the clutch motor 30 and the assist motor 40 and output to the drive shaft 22. In accordance with another possible structure, the battery 94 may be charged with part of the energy Pe output from the engine 50, or part of the energy Pd to be output to the drive shaft 22 may be discharged from the battery 94. In this modified structure, the target torque Te* and the target revolving speed Ne* of the engine 50 are set according to the energy Pe greater than the energy Pd to be output to the drive shaft 22 or the energy Pe smaller than the energy Pd.

Figure 46:
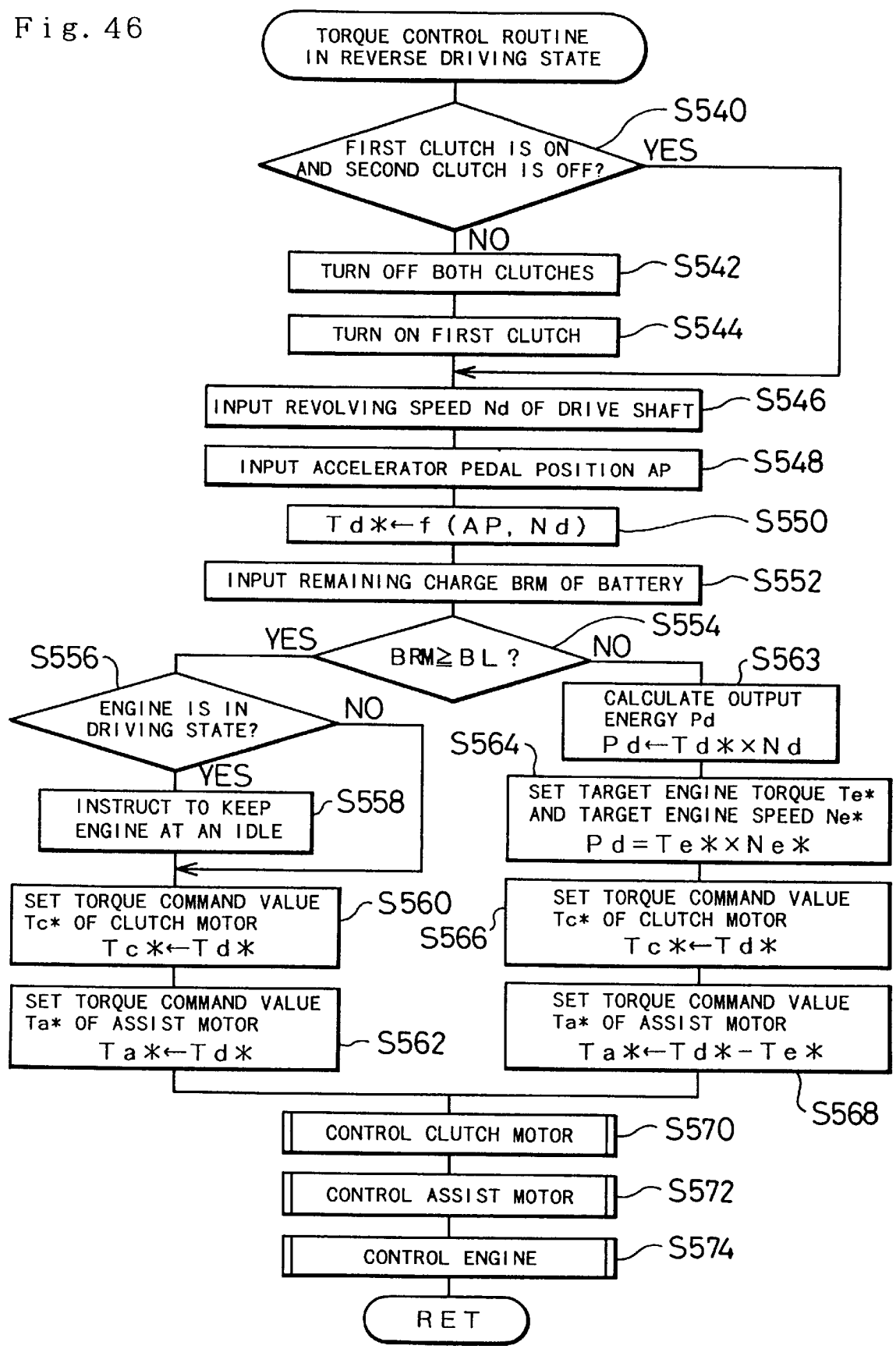
FIG. 46 is a flowchart showing a modified torque control routine in the reverse driving state.

The control process in the reverse driving state of the embodiment moves the vehicle back when the power output apparatus 20 has the structure of FIG. 3, wherein the first clutch 45 is in OFF position and the second clutch 46 is in ON position. Another control process in the reverse driving state moves the vehicle back when the power output apparatus 20 has the structure of FIG. 4, wherein the first clutch 45 is in ON position and the second clutch 46 is in OFF position. In this case, a torque control routine in the reverse driving state shown in the flowchart of FIG. 46 is executed. The torque control routine in the reverse driving state shown in FIG. 46 is identical with that shown in FIG. 43, except that the first clutch 45 and the second clutch 46 are operated in order to set the first clutch 45 inON position and the second clutch 46 in OFF position and enable the power output apparatus 20 to have the structure of FIG. 4 (that is, the processing of steps S540 through S544) and that the torque command values Tc* and Ta* of the clutch motor 30 and the assist motor 40 are set based on these different on-off states of the clutches 45 and 46 (that is, the processing of steps S560, S562, S566, and S568). No further description is required for the on-off states of the first clutch 45 and the second clutch 46. The following describes the procedure of setting the torque command values Tc* and Ta* of the clutch motor 30 and the assist motor 40 and the operation of the power output apparatus 20 based on these values.

In the torque control routine in the reverse driving state shown in FIG. 46, when the remaining charge BRM of the battery 94 is not less than the first threshold value BL at step S554, the control CPU 90 of the controller 80 sets the output torque command value Td* to be output to the drive shaft 22 to both the torque command value Tc* of the clutch motor 30 and the torque command value Ta* of the assist motor 40 at steps S560 and S562. In this routine, the power output apparatus 20 has the structure shown in the schematic view of FIG. 4. Setting the output torque command value Td* to the torque command value Tc* of the clutch motor 30 enables the clutch motor 30 to output the torque corresponding to the output torque command value Td* to the drive shaft 22. The output torque command value Td* is also set to the torque command value Ta* of the assist motor 40, because of the following reason. When the clutch motor 30 outputs the torque corresponding to the output torque command value Td* to the drive shaft 22, a torque having the same magnitude but the reverse direction is output as a reaction force to the crankshaft 56. The assist motor 40 is accordingly required to output a torque that cancels the torque as the reaction force. Although the output torque command value Td* is set to the torque command value Ta* of the assist motor 40 at step S562 in the flowchart of FIG. 46, the assist motor 40 may be locked up when the engine 50 is at a stop. When the engine 50 is kept at an idle, the torque command value Ta* of the assist motor 40 may be feedback controlled to make the revolving speed Ne of the crankshaft 56 equal to an idle revolving speed.

In case that the remaining charge BRM of the battery 94 is less than the first threshold value BL at step S554, on the contrary, the control CPU 90 sets the torque command value Td* to be output to the drive shaft 22 to the torque command value Tc* of the clutch motor 30 at step S566, and sets the value obtained by subtracting the target torque Te* of the engine 50 from the torque command value Td* to the torque command value Ta* of the assist motor 40 at step S568. As discussed previously, the power output apparatus 20 has the structure of FIG. 4 in this routine. Under this condition, setting the output torque command value Td* to the torque command value Tc* of the clutch motor 30 also enables the clutch motor 30 to output the torque corresponding to the output torque command value Td* to the drive shaft 22. The value obtained by subtracting the target torque Te* of the engine 50 from the torque command value Td* is set to the torque command value Ta* of the assist motor 40. This cancels the reaction force output to the crankshaft 56 when the clutch motor 30 outputs the torque corresponding to the torque command value Td* to the drive shaft 22, and gives the loading torque in order to enable the engine 50 to stably output the torque corresponding to the target torque Te*.

Figure 47:
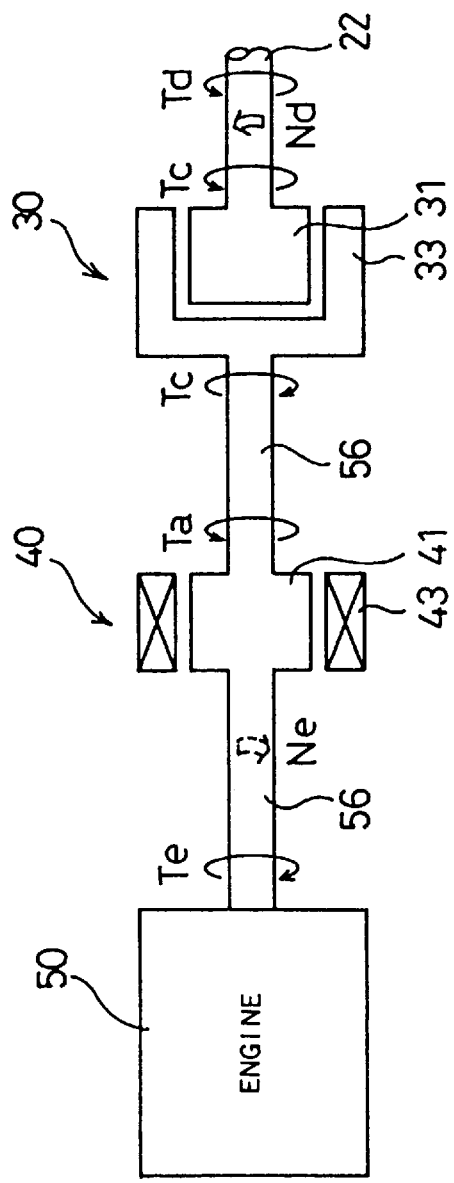
FIG. 47 shows the state of torques applied to the crankshaft 56 and the drive shaft 22 when the power output from the engine 50 is subjected to a torque conversion and applied to rotate the drive shaft 22 in a reverse direction, in the modified torque control routine in the reverse driving state.
Figure 48:
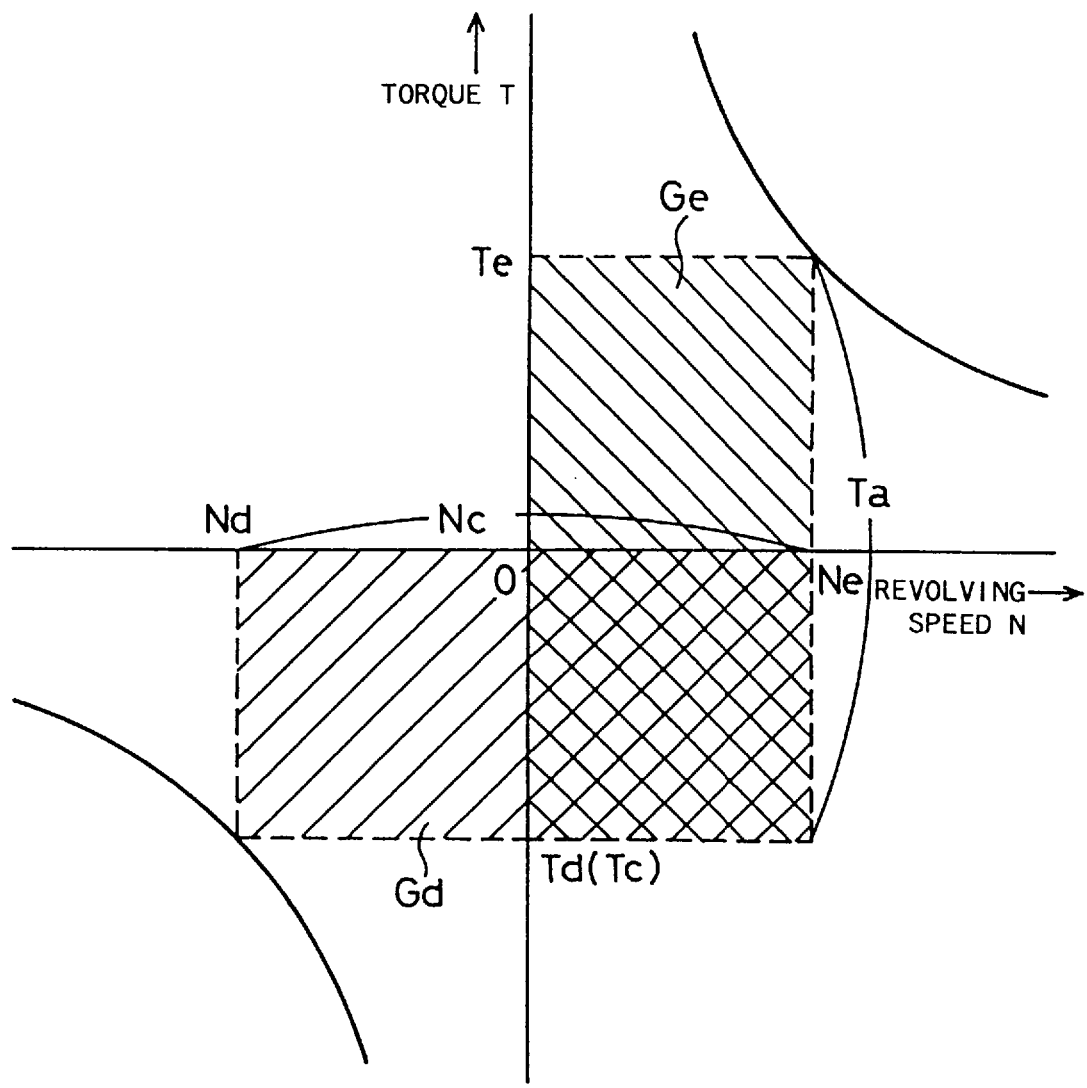
FIG. 48 shows the state of torque conversion when the power output from the engine 50 is subjected to a torque conversion and applied to rotate the drive shaft 22 in a reverse direction, in the modified torque control routine in the reverse driving state.

FIG. 47 shows the operating state of the engine 50, the clutch motor 30, and the assist motor 40 as well as the state of torques applied to the crankshaft 56 and the drive shaft 22 when the remaining charge BRM of the battery 94 is determined to be less than the first threshold value BL at step S554. FIG. 48 shows the state of torque conversion under such conditions. Referring to FIG. 47, the clutch motor 30 outputs the torque Tc (=Td*) to the drive shaft 22 in the direction of rotation of the drive shaft 22 as well as the torque Tc to the crankshaft 56 in the direction of rotation of the crankshaft 56 (that is, in reverse of the rotation of the drive shaft 22). The engine 50 outputs the torque Te corresponding to the target torque Te* in the direction of rotation of the crankshaft 56. The assist motor 40 is accordingly required to output the torque Ta that cancels the sum of the torques Te and Tc, so as to balance the torques on the crankshaft 56. At this moment, the torque Ta output from the assist motor 40 acs in reverse of the rotation of the crankshaft 56, so that the assist motor 40 carries out the regenerative operation. The torque Tc of the clutch motor 30 acts in the directions of rotations of the drive shaft 22 and the crankshaft 56, so that the clutch motor 30 carries out the power operation. The electric power consumed by the clutch motor 30 is supplied by the electric power regenerated by the assist motor 40. Referring to FIG. 48, the assist motor 40 regenerates the power output from the engine 50 that is driven at a driving point defined by the torque Te and the revolving speed Ne, as energy expressed by an area Ge. The energy Ge is supplied to the clutch motor 30 as energy expressed by an area Gd and thereby output to the drive shaft 22 as the power which is defined by the revolving speed Nd and the torque Td acting in reverse of the rotation of the engine 50. This torque conversion does not accompany the process of charging or discharging the battery 94.

The modified control process in the reverse driving state discussed above can also move the vehicle back. In case that the remaining charge BRM of the battery 94 is sufficient, the clutch motor 30 utilizes the electric power discharged from the battery 94 to output the power while the assist motor 40 receives the reaction force, thereby enabling the vehicle move backward. Another procedure converts the power output from the engine 50 to the power acting in reverse of the rotation of the engine 50 by means of the clutch motor 30 and the assist motor 40, thereby moving the vehicle back. This procedure by torque conversion is implemented, irrespective of the remaining charge BRM of the battery 94. This allows the vehicle to move backward eve when the remaining charge BRM of the battery 94 is insufficient to discharge the electric power.

In the modified control process in the reverse driving state, when the remaining charge BRM of the battery 94 is less than the first threshold value BL, all the energy Pe output from the engine 50 is subjected to the torque conversion by means of the clutch motor 30 and the assist motor 40 and output to the drive shaft 22. In accordance with another possible structure, the battery 94 may be charged with part of the energy Pe output from the engine 50, or part of the energy Pd to be output to the drive shaft 22 may be discharged from the battery 94. In this modified structure, the target torque Te* and the target revolving speed Ne* of the engine 50 are set according to the energy Pe greater than the energy Pd to be output to the drive shaft 22 or the energy Pe smaller than the energy Pd.

F. Other Operation Controls

Figure 49:
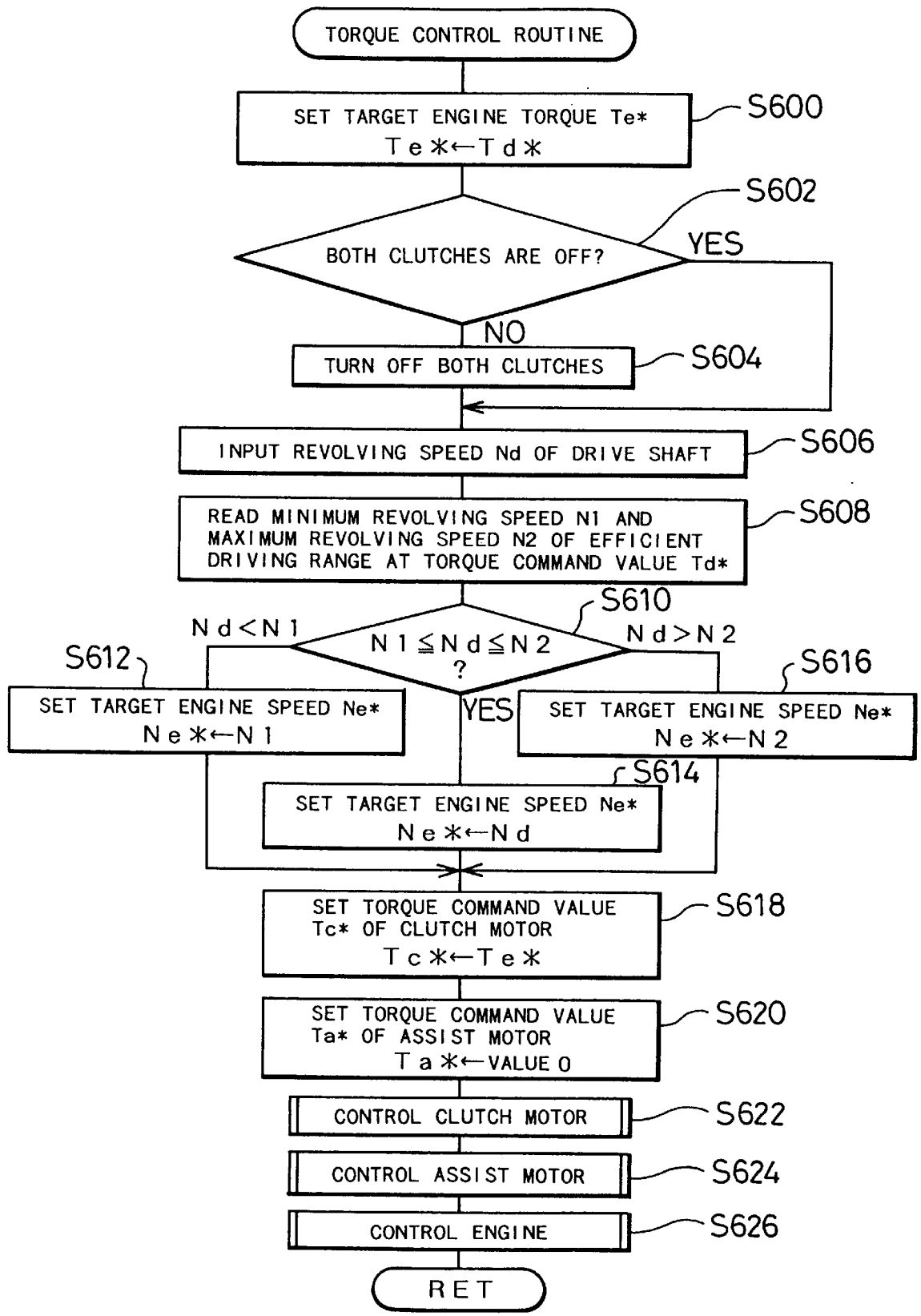
FIG. 49 is a flowchart showing a torque control routine executed by the control CPU 90 of the controller 80 in the structure of FIG. 10.

The above discussion relates to the operations when the power output apparatus 20 of the embodiment has the structure of FIG. 3, the structure of FIG. 4, or the structure of FIG. 9. The following describes the operation when the power output apparatus 20 has the structure shown in the schematic view of FIG. 10. This structure has only the clutch motor 30 linked with both the drive shaft 22 and the crankshaft 56. In this structure, the clutch motor 30 transmits the output torque of the engine 50 to the drive shaft 22 while regenerating or consuming the electric power corresponding to the revolving speed difference Nc between the revolving speed Ne of the engine 50 and the revolving speed Nd of the drive shaft 22. In the structure of FIG. 9 wherein both the first clutch 45 and the second clutch 46 are in ON position, the crankshaft 56 and the drive shaft 22 are connected to each other via the rotor-rotating shaft 38, so that the torque can be increased or decreased by the assist motor 40 under the condition that the revolving speed Ne of the engine 50 is identical with the revolving speed Nd of the drive shaft 22. On the other hand, in the structure of FIG. 10 wherein both the first clutch 45 and the second clutch 46 are in OFF position, the torque output from the engine 50 is directly transmitted to the drive shaft 22 because of the characteristic of the clutch motor 30, so that the revolving speed can be increased or decreased by the clutch motor 30 under the condition that the torque Te output from the engine 50 is identical with the torque Td output to the drive shaft 22. The torque control routine in the direct output mode of FIG. 33 carried out in the structure of FIG. 9 is accordingly applicable to the structure of FIG. 10 simply by exchanging the restriction of the revolving speed with the restriction of the torque. FIG. 49 is a flowchart showing a torque control routine applied to the structure of FIG. 10. The torque control routine of FIG. 49 is executed, for example, when the torque (torque command value Td*) to be output to the drive shaft 22 is within the efficient driving range of the engine 50 (that is, the area PA shown in FIG. 14). The following describes the torque control process executed when the power output apparatus 20 has the structure shown in the schematic view of FIG. 10.

When the program enters the torque control routine of FIG. 49, the control CPU 90 of the controller 80 first sets the torque command value Td* to be output to the drive shaft 22 to the target torque Te* of the engine 50 at step S600, and determines whether or not both the first clutch 45 and the second clutch 46 are in OFF position at step S602. In case that both the clutches 45 and 46 are not in OFF position, the control CPU 90 sets the clutches 45 and 46 in OFF position at step S604, so as to enable the power output apparatus 20 to have the structure shown in FIG. 10. The control CPU 90 then reads the revolving speed Nd of the drive shaft 22 at step S606, and reads a minimum revolving speed N1 and a maximum revolving speed N2 in the efficient driving range of the engine 50 (the area PA shown in FIG. 14) with respect to the torque command value Td* to be output to the drive shaft 22 at step S608. The input revolving speed Nd is then compared with the input minimum revolving speed N1 and maximum revolving speed N2 at step S610. In this embodiment, values of minimum revolving speed N1 and maximum revolving speed N2 in the efficient driving range of the engine 50 are determined experimentally or otherwise for the respective torque command values Td* and stored in advance as a map (not shown) in the ROM 90b. In accordance with a concrete procedure, at step S608, the minimum revolving speed N1 and the maximum revolving speed N2 corresponding to the torque command value Td* are read from the map stored in the ROM 90b.

When the revolving speed Nd of the drive shaft 22 is not lower than the minimum revolving speed N1 and not higher than the maximum revolving speed N2 at step S610, the revolving speed Nd of the drive shaft 22 is set to the target revolving speed Ne* of the engine 50 at step S614. When the revolving speed Nd of the drive shaft 22 is lower than the minimum revolving speed N1, the minimum revolving speed N1 is set to the target revolving speed Ne* of the engine 50 at step S612. When the revolving speed Nd of the drive shaft 22 is higher than the maximum revolving speed N2, on the contrary, the maximum revolving speed N2 is set to the target revolving speed Ne* of the engine 50 at step S616. This procedure enables the driving point of the engine 50 defined by the target torque Te* and the target revolving speed Ne* to be within the efficient driving range of the engine 50 (that is, the area PA shown in FIG. 14).

The control CPU 90 then sets the target torque Te* of the engine 50 to the torque command value Tc* of the clutch motor 30 at step S618, sets the torque command value Ta* of the assist motor 40 equal to zero at step S620, and controls the clutch motor 30, the assist motor 40, and the engine 50 at steps S622 through S626.

Figure 50:
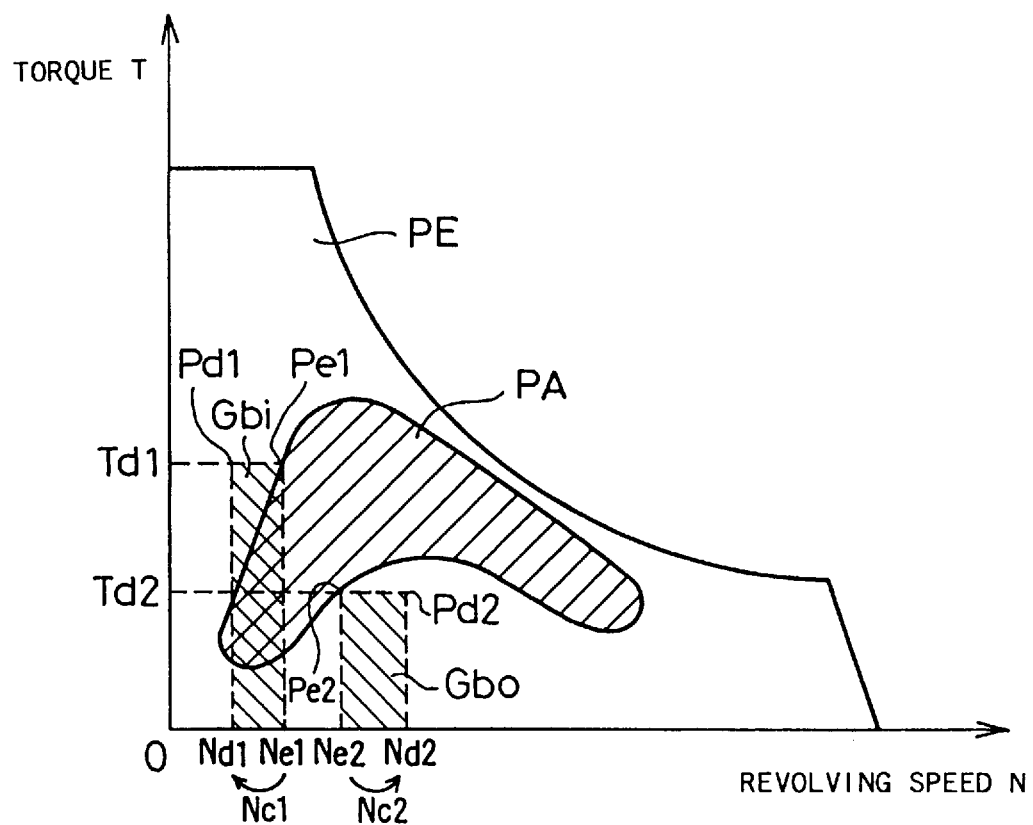
FIG. 50 shows the state of outputting the power to the drive shaft 22 by the torque control routine of FIG. 49.

FIG. 50 shows the state of outputting the power to the drive shaft 22 when the torque control routine shown in the flowchart of FIG. 49 is executed. By way of example, it is assumed that the drive shaft 22 rotates at a revolving speed Nd1 and the output torque command value Td* depending upon the step-on amount of the accelerator pedal 64 is equal to a value Td1; that is, the drive shaft 22 is desired to rotate at a driving point Pd1 in the drawing of FIG. 50. While the torque Td1 (=torque command value Td*) to be output to the drive shaft 22 is within an efficient driving range PA of the engine 50, the revolving speed Nd1 of the drive shaft 22 is significantly lower than the lower limit of this efficient driving range PA. Under such conditions, the torque command value Td* (=the value Td1) is set to the target torque Te* of the engine 50 (at step S600 in FIG. 49), whereas a lower limit revolving speed Ne1 of the range PA at the torque Td1 is set as the minimum revolving speed N1 to the target revolving speed Ne* of the engine 50 (at step S612).

The engine 50 is thus driven at a driving point Pe1 defined by the torque Td1 and the revolving speed Ne1. At this moment, the clutch motor 30 is driven at a revolving speed difference Nc1 (positive value) between the revolving speed Ne1 of the engine 50 and the revolving speed Nd1 of the drive shaft 22, and thereby regenerates electric power (Td1× Nc1) corresponding to the revolving speed difference Nc1. The battery 94 is charged with this regenerative electric power.

As another example, it is assumed that the drive shaft 22 rotates at a revolving speed Nd2 and the output torque command value Td* is equal to a value Td2; that is, the drive shaft 22 is desired to rotate at a driving point Pd2 in the drawing of FIG. 50. While the torque Td2 (=torque command value Td*) to be output to the drive shaft 22 is within the efficient driving range PA of the engine 50, the revolving speed Nd2 of the drive shaft 22 is significantly higher than the upper limit of this efficient driving range PA. Under such conditions, the torque command value Td* (=the value Td2) is set to the target torque Te* of the engine 50 (at step S600), whereas an upper limit revolving speed Ne2 of the range PA at the torque Td2 is set as the maximum revolving speed N2 to the target revolving speed Ne* of the engine 50 (at step S616). The engine 50 is thus driven at a driving point Pe2 defined by the torque Td2 and the revolving speed Ne2. At this moment, the clutch motor 30 is driven at a revolving speed difference Nc2 (negative value) between the revolving speed Ne2 of the engine 50 and the revolving speed Nd2 of the drive shaft 22, and thereby consumes electric power (Td2×Nc2) corresponding to the revolving speed difference Nc2. The electric power consumed by the clutch motor 30 is discharged from the battery 94.

When both the torque (torque command value Td*) to be output to the drive shaft 22 and the revolving speed Nd of the drive shaft 22 are within the efficient driving range PA of the engine 50 shown in FIG. 50, the torque command value Td* is set to the target torque Te* of the engine 50 (at step S600), whereas the revolving speed Nd of the drive shaft 22 is set to the target revolving speed Ne* of the engine 50 (at step S614). The revolving speed Ne of the engine 50 thus becomes equal to the revolving speed Nd of the drive shaft 22. In the embodiment shown in FIG. 49, the clutch motor 30 is controlled by setting the target torque Te* to the torque command value Tc* of the clutch motor 30. In accordance with another application, however, the clutch motor 30 may be locked up. In the latter case, the control of the clutch motor 30 enables a constant electric current, which can generate the torque of not less than the target torque Te* when the electrical angle of the rotors in the clutch motor 30 is equal to $\pi/2$, to flow through the respective phases of the three-phase coils 34.

Figure 10:
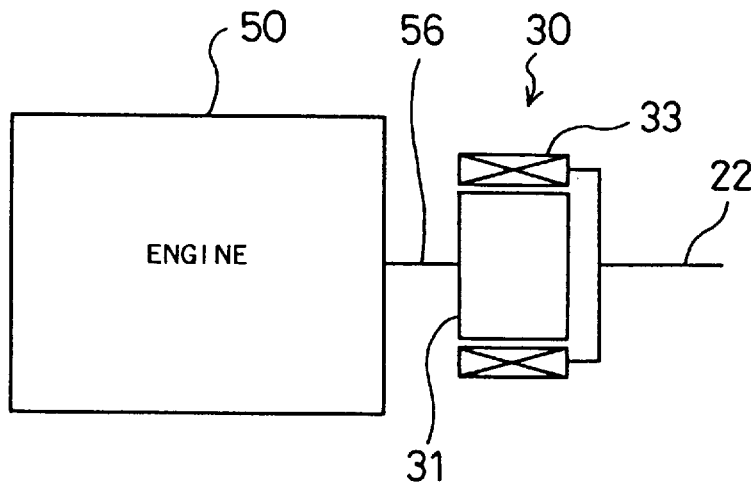
FIG. 10 schematically shows structure of the power output apparatus 20 of the present invention, wherein both the first clutch 45 and the second clutch 46 are in OFF position.

The torque control routine discussed above enables the torque corresponding to the torque command value Td* to be output to the drive shaft 22 while allowing the engine 50 to be driven in the efficient driving range (that is, the area PA shown in FIG. 14) when the power output apparatus 20 has the structure of FIG. 10, as long as the torque (torque command value Td*) to be output to the drive shaft 22 is within the efficient driving range of the engine 50 even if the revolving speed Nd of the drive shaft 22 is not within this efficient driving range.

The torque control routine is carried out when both the torque (torque command value Td*) to be output to the drive shaft 22 and the revolving speed Nd of the drive shaft 22 are within the efficient driving range of the engine 50 (the area PA shown in FIG. 14) or when the torque command value Td* is within the efficient driving range of the engine 50 even if the revolving speed Nd of the drive shaft 22 is not within this efficient driving range. As discussed previously, in the structure of FIG. 10 wherein both the first clutch 45 and the second clutch 46 are in OFF position, the torque output from the engine 50 is directly transmitted to the drive shaft 22 because of the characteristic of the clutch motor 30, so that the revolving speed can be increased or decreased by the clutch motor 30 under the condition that the torque Te output from the engine 50 is identical with the torque Td output to the drive shaft 22. The torque control is accordingly not restricted to the case in which the torque command value Td* is within the efficient driving range of the engine 50. For example, when some abnormality arises in the assist motor 40, both the first clutch 45 and the second clutch 46 are set in OFF position, so as to enable the power output apparatus 20 to have the structure of FIG. 10 without the assist motor 40. In this state, the clutch motor 30 varies the revolving speed in the power output from the engine 50 and outputs the corrected power to the drive shaft 22.

G. Modifications

Figure 51:
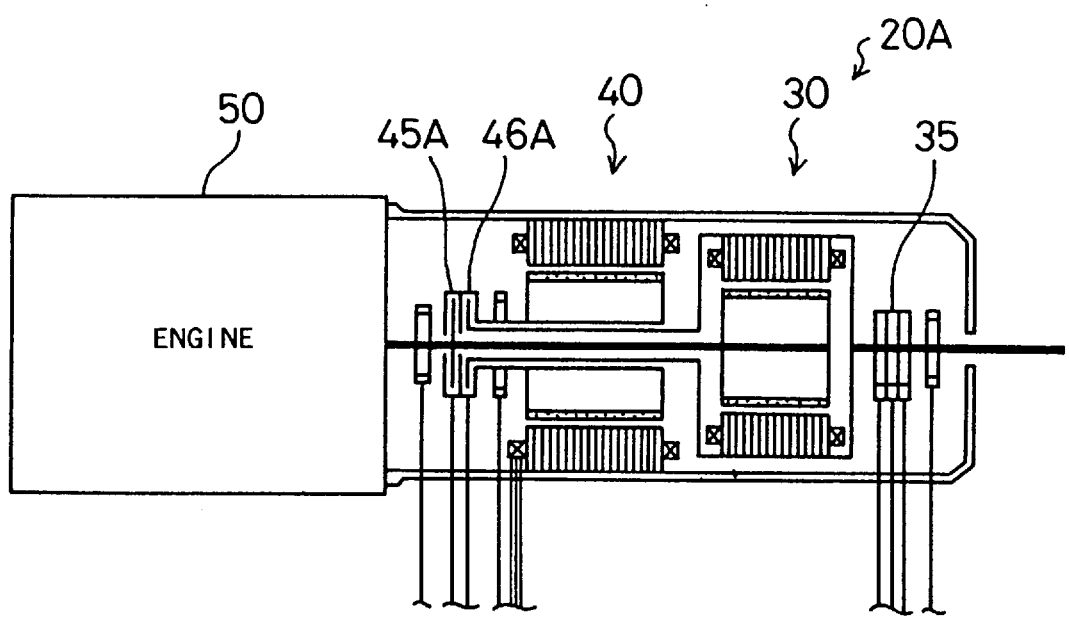
FIG. 51 schematically illustrates structure of another power output apparatus 20A as an modified example.
Figure 52:
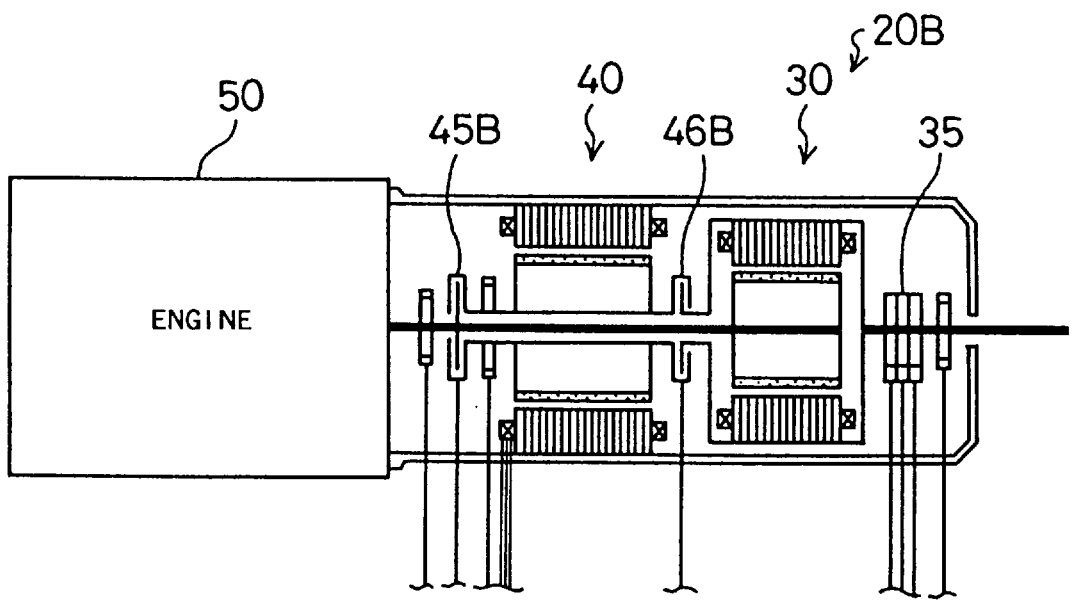
FIG. 52 schematically illustrates structure of still another power output apparatus 20B as an modified example.
Figure 53:
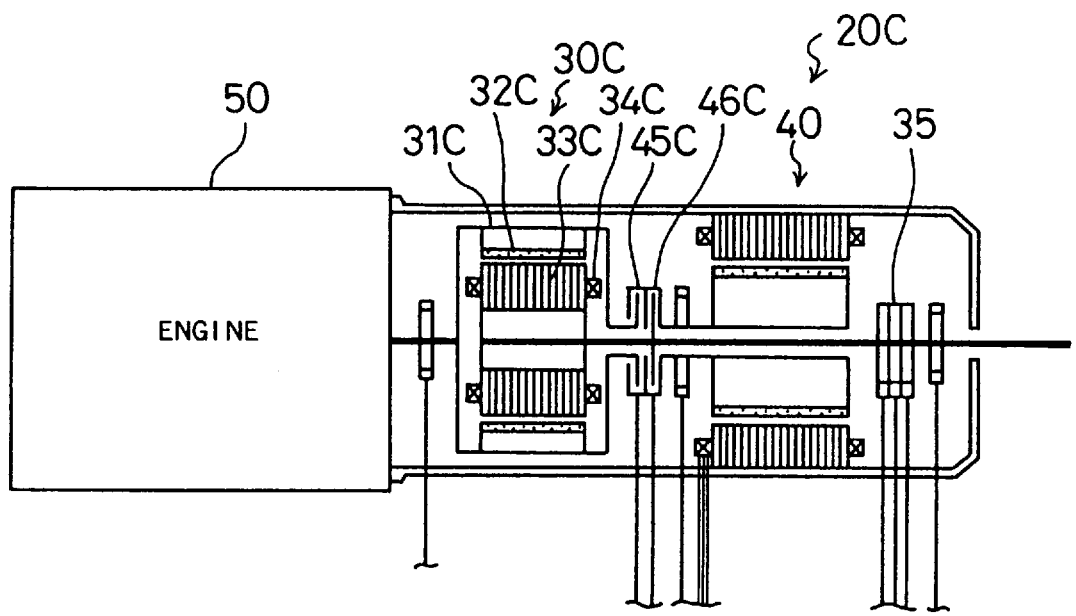
FIG. 53 schematically illustrates structure of another power output apparatus 20C as an modified example.

In the power output apparatus 20 of the embodiment discussed above, the first clutch 45 and the second clutch 46 are disposed between the assist motor 40 and the clutch motor 30. In another power output apparatus 20A of modified structure shown in FIG. 51, both a first clutch 45A and a second clutch 46A are disposed between the engine 50 and the assist motor 40. In still another power output apparatus 20B of modified structure shown in FIG. 52, a first clutch 45B is disposed between the engine 50 and the assist motor 40 whereas a second clutch 46B is disposed between the assist motor 40 and the clutch motor 30. Although the assist motor 40 is arranged between the engine 50 and the clutch motor 30 in the power output apparatus 20 of the embodiment, a clutch motor 30C may be arranged between the engine 50 and the assist motor 40 like another power output apparatus 20C of modified structure shown in FIG. 53. In this power output apparatus 20C, an outer rotor 31C of the clutch motor 30C having permanent magnets 32C mounted on its inner surface is connected with the crankshaft 56, while an inner rotor 33C having three-phase coils 34C is linked with the drive shaft 22. Such difference is attributable to a first clutch 45C and a second clutch 46C arranged between the clutch motor 30C and the assist motor 40. The power output apparatuses of modified structures, for example, one having the different arrangement of the clutch motor 30 and the assist motor 40, can be operated in a similar manner to that of the power output apparatus 20 of the embodiment. There are a total of 18 (2×3×3) different arrangements with respect to the clutch motor 30, the assist motor 40, the first clutch 45, the second clutch 46, and the slip ring 35 included in the power output apparatus 20 (that is, 2 different arrangements with respect to the clutch motor 30 and the assist motor 40, 3 different arrangements with respect to the first clutch 45 and the second clutch 46, and 3 different arrangements with respect to the slip ring 35).

Figure 54:
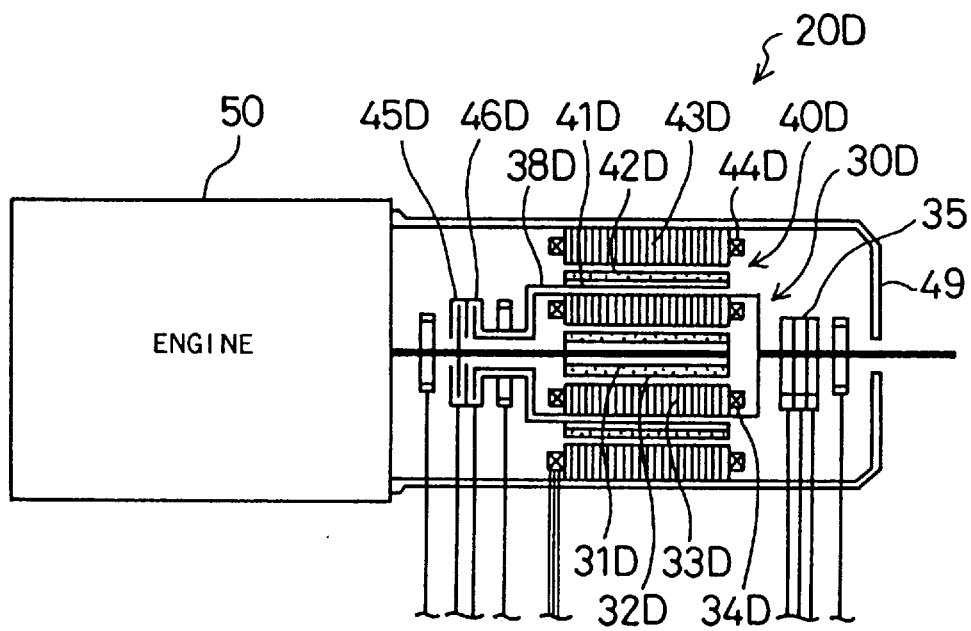
FIG. 54 schematically illustrates structure of still another power output apparatus 20D as an modified example.

Although the clutch motor 30 and the assist motor 40 are arranged in the axial direction in the power output apparatus 20 of the embodiment, an assist motor 40D may be arranged outside a clutch motor 30D in the diametral direction like still another power output apparatus 20D of modified structure shown in FIG. 54. In this structure, an inner rotor 31D of the clutch motor 30D that is linked with the crankshaft 56 and has permanent magnets 32D mounted on its outer surface, an outer rotor 33D of the clutch motor 30D having three-phase coils 34D, a rotor 41D of the assist motor 40D that is linked with a rotor-rotating shaft 38D and has permanent magnets 42D mounted on its outer surface, and a stator 43D of the assist motor 40D that is fixed to the casing 49 and has three-phase coils 44D are arranged in this sequence toward the outside in the diametral direction. The structure of arranging the assist motor 40D outside the clutch motor 30D in the diametral direction significantly shortens the axial length of the power output apparatus 20D, thereby making the whole power output apparatus 20D preferably compact. There are degrees of freedom with respect to the arrangements of a first clutch 45D, a second clutch 46D, and the slip ring 35 in the structure of arranging the assist motor 40D outside the clutch motor 30D in the diametral direction.

Figure 55:
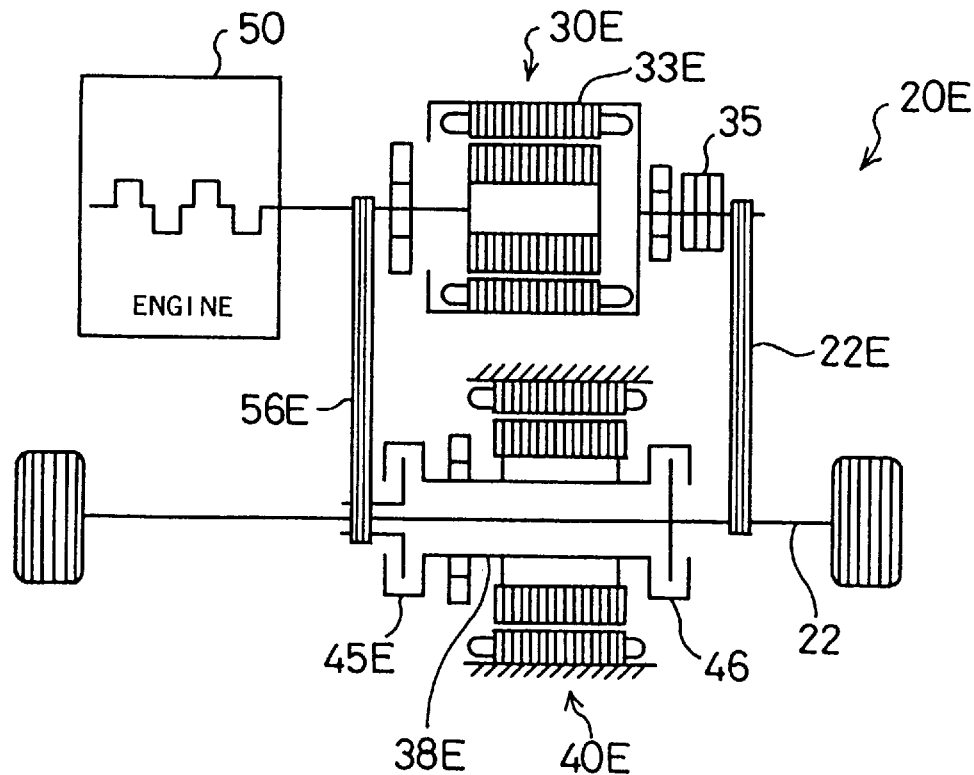
FIG. 55 schematically illustrates structure of another power output apparatus 20E as an modified example.
Figure 56:
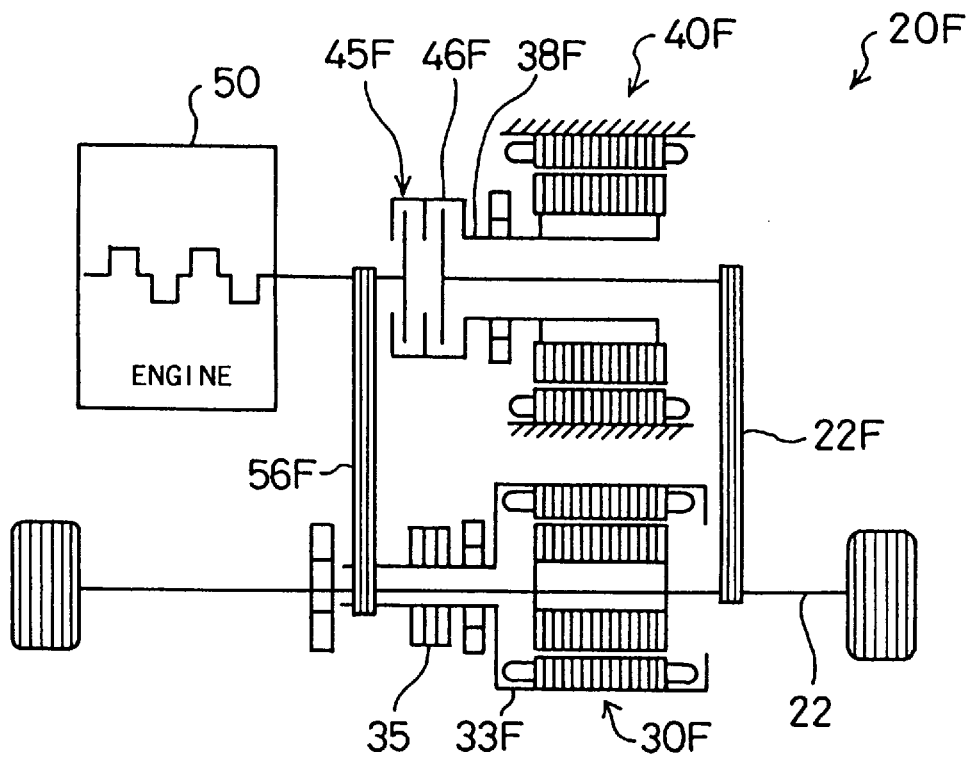
FIG. 56 schematically illustrates structure of still another power output apparatus 20F as an modified example.

Although the clutch motor 30 and the assist motor 40 are arranged coaxially in the power output apparatus 20 of the embodiment, the clutch motor and the assist motor may be arranged on different axes like a power output apparatus 20E of modified structure shown in FIG. 55 or another power output apparatus 20F of modified structure shown in FIG. 56. In the power output apparatus 20E of modified structure, the engine 50 and a clutch motor 30E are arranged on an identical axis, whereas an assist motor 40E is disposed on a different axis. An outer rotor 33E of the clutch motor 30E is connected to the drive shaft 22 by means of a belt 22E, whereas the crankshaft 56 is linked with a rotor-rotating shaft 38E via a first clutch 45E by means of a belt 56E. In the power output apparatus 20F of another modified structure, the engine 50 and an assist motor 40F are arranged on an identical axis, whereas a clutch motor 30F is disposed on a different axis. An outer rotor 33F of the clutch motor 30F is connected to the crankshaft 56 by means of a belt 56F, whereas the drive shaft 22 is linked with a rotor-rotating shaft 38F via a second clutch 46F by means of a belt 22F. The structure of arranging the clutch motor 30 and the assist motor 40 on different axes like these modified examples significantly shortens the axial length of the power output apparatus 20. This enables the power output apparatus 20 to be favorably mounted on the vehicle of front-wheel-drive. There are also degrees of freedom with respect to the arrangements of the first clutch 45, the second clutch 46, and the slip ring 35 in the structure of arranging the clutch motor 30 and the assist motor 40 on different axes.

Figure 57:
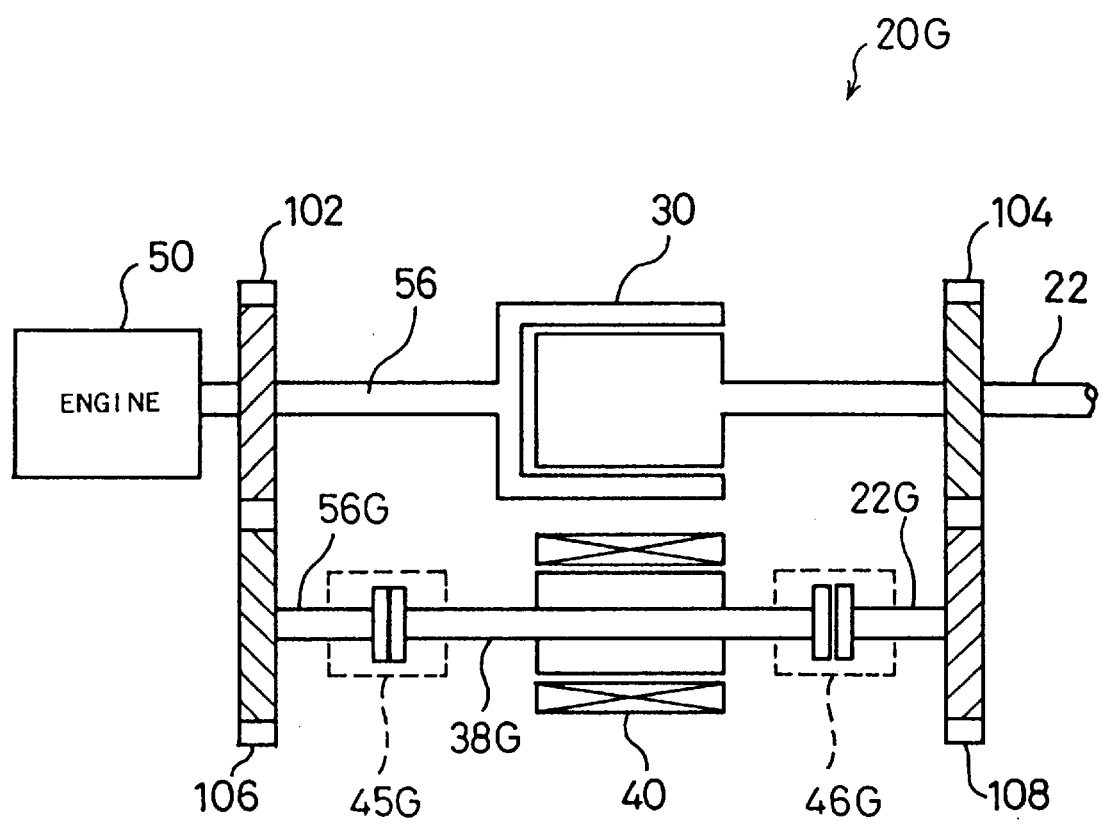
FIG. 57 schematically illustrates structure of another power output apparatus 20G as an modified example.

In the power output apparatuses 20E and 20F having the clutch motor 30 and the assist motor 40 arranged on different axes, the crankshaft 56 of the engine 50 and the drive shaft 22 may be placed on an identical axis, instead of the different axes. In the power output apparatus 20E or 20F of modified structure, the different axes are linked with each other by means of the belts 22E and 56E or 22F and 56F. Like still another power output apparatus 20G of modified structure shown in FIG. 57, the crankshaft 56 and the drive shaft 22 may be connected with a rotor-rotating shaft 38G by means of gears 102 and 104 attached to the crankshaft 56 and the drive shaft 22 and gears 106 and 108 attached to the rotor-rotating shaft 38G via a first clutch 45G and a second clutch 46G.

Figure 58A:
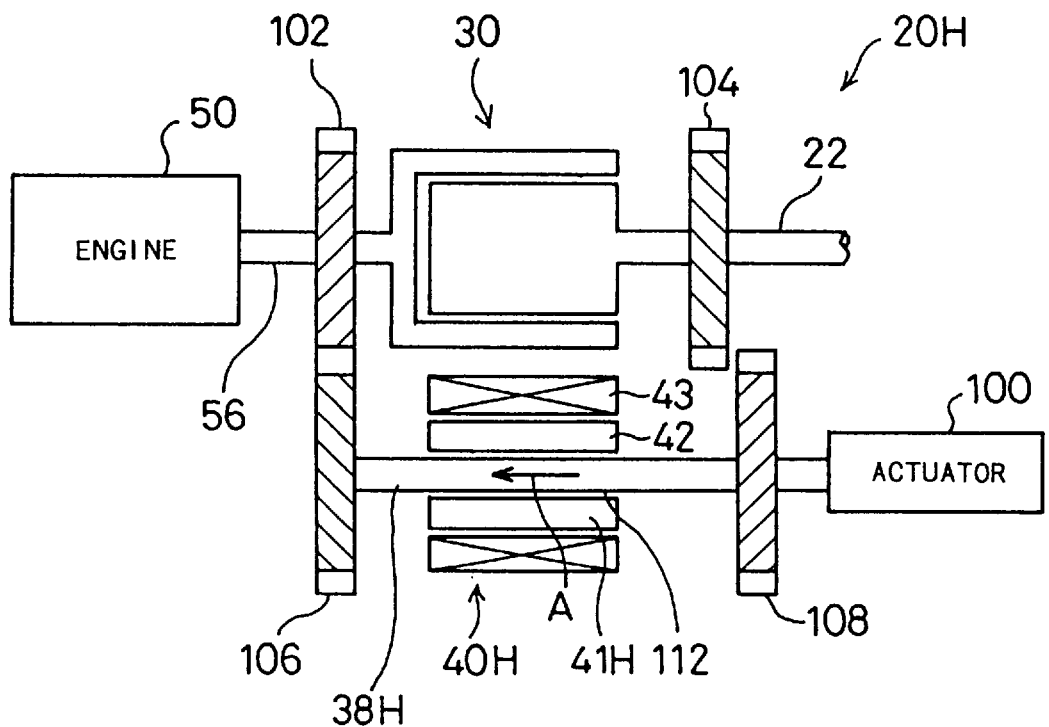
FIGS. 58(*a*) and 58(*b*) schematically illustrate structure of still another power output apparatus 20H as an modified example.
Figure 58B:
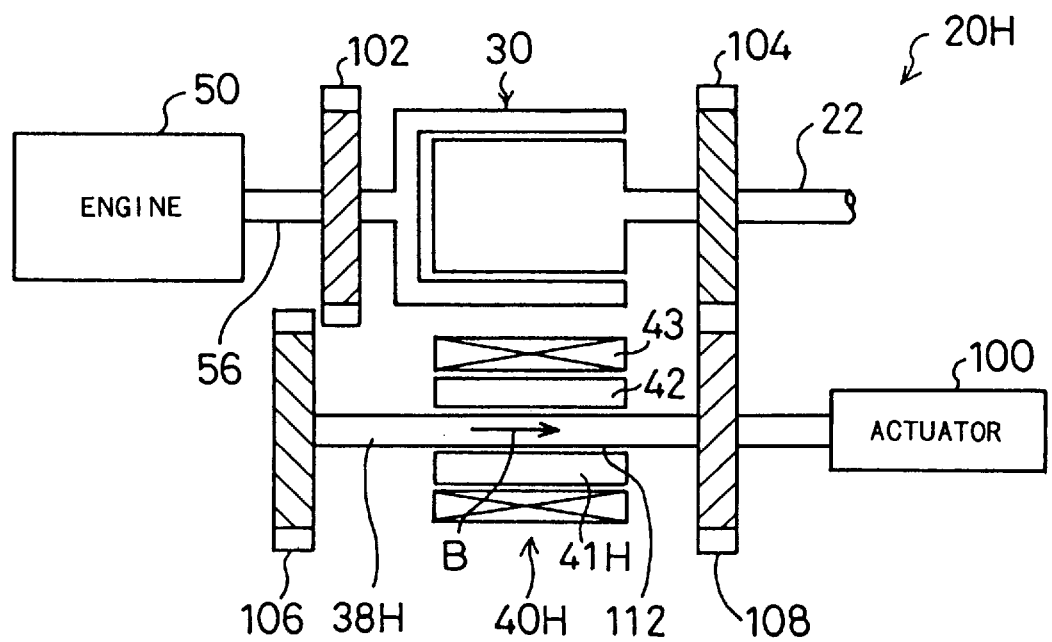

In the power output apparatus 20 of the embodiment, connection and disconnection of the rotor-rotating shaft 38 to and from the crankshaft 56 or the drive shaft 22 is implemented by means of the clutches 45 and 46. Like another power output apparatus 20H of modified structure shown in FIG. 58, the connection and disconnection may be implemented by switching of the gear coupling. The following briefly describes the structure of the power output apparatus 20H. In the power output apparatus 20H, a rotor-rotating shaft 38H has a gear 106 that can be coupled with a gear 102 attached to the crankshaft 56 and a gear 108 that can be coupled with a gear 104 attached to the drive shaft 22. These gears 106 and 108 are arranged to realize the selective gear coupling. An actuator 100 for moving the rotor-rotating shaft 38H in the axial direction is disposed on an end of the rotor-rotating shaft 38H with the gear 108. Operation of the actuator 100 slides the rotor-rotating shaft 38H in the axial direction, thereby selectively realizing the gear coupling of the gear 102 with the gear 106 or the gear coupling of the gear 104 with the gear 108. A rotor 41H of an assist motor 40H is connected to the rotor-rotating shaft 38H by splines 112 that are movable in the axial direction relative to the rotor-rotating shaft 38H but are not rotatable around the axis. Even when the rotor-rotating shaft 38H is slid in the axial direction by the actuator 100, the assist motor 40H does not move in the axial direction. The power output apparatus 20H selects the gear coupling to attain the structure of FIG. 3 or the structure of FIG. 4 and exert the same effects as those of the power output apparatus 20 of the embodiment.

Figure 59:
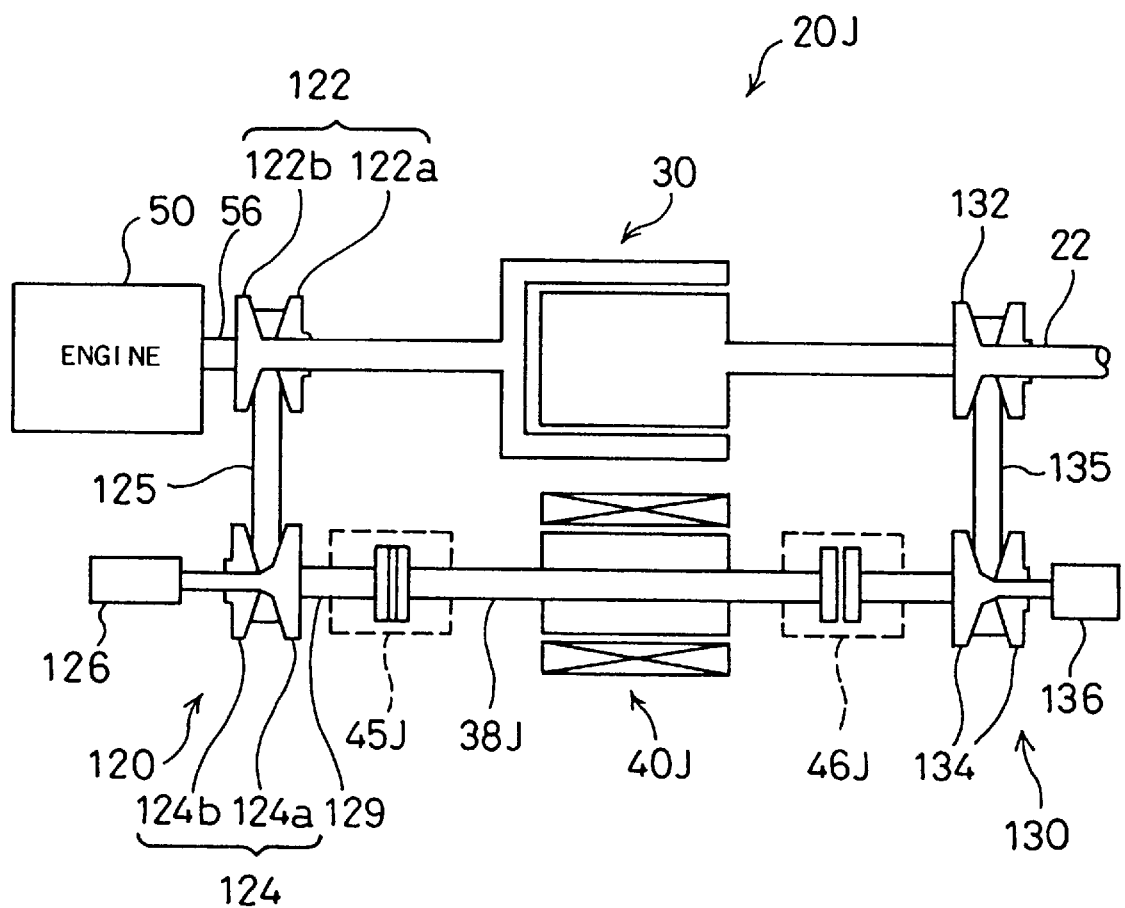
FIG. 59 schematically illustrates structure of still another power output apparatus 20J as an modified example.

In the power output apparatus 20 of the embodiment, the rotor-rotating shaft 38 is connected to either the crankshaft 56 or the drive shaft 22 by means of the first clutch 45 and the second clutch 46. Such connection may be implemented by a combination of a speed change gear and clutches. For example, like another power output apparatus 20J shown in FIG. 59, the crankshaft 56 is connected to a rotor-rotating shaft 38J by means of a speed change gear 120 and a first clutch 45J, whereas the drive shaft 22 is connected to the rotor-rotating shaft 38J by means of a speed gear 130 and a second clutch 46J. The speed change gear 120 includes a pair of belt-supporting members 122 (122a, 122b) attached to the crankshaft 56, a pair of belt-supporting members 124 (124a, 124b) attached to a connecting shaft 129 linked with the rotor-rotating shaft 38J via the first clutch 45J, a belt 125 supported by the two pairs of belt-supporting members 122 and 124, and an actuator 126 attached to one end of the belt-supporting member 124a for sliding the belt-supporting member 124a in the axial direction. The respective belt-supporting members 122a, 122b, 124a, and 124b have tapers on their contact surfaces which are in contact with the belt 125. The circumferential radius of the belt 125 can be changed by varying the space between each pair of belt-supporting members. In the speed change gear 120, the actuator 126 slides the belt-supporting member 124a in the axial direction, so as to vary the space between the pair of belt-supporting members 124 and thereby change the circumferential radius of the belt 125. This changes the revolving speed of the crankshaft 56 and transmits the speed change to the rotor-rotating shaft 38J via the connecting shaft 129. The speed change gear 130 linked with the second clutch 46J has the same structure as that of the speed change gear 120. An actuator 136 varies the space between a pair of belt-supporting members 134 and changes the circumferential radius of a belt 135, thereby changing the revolving speed of the rotor-rotating shaft 38J and transmitting the speed change to the drive shaft 22.

In the power output apparatus 20J of modified structure, the speed change gears 120 and 130 function to regulate the revolving speed of the rotor-rotating shaft 38J. This enables an assist motor 40J to be driven at a driving point of higher efficiency. Even when the revolving speed Ne of the crankshaft 56 is significantly different from the revolving speed of the rotor-rotating shaft 38J, the speed change gear 120 regulates the change gear ratio, so as to enable the crankshaft 56 to be smoothly connected with the rotor-rotating shaft 38J via the first clutch 45J. This effectively reduces the torque shock that may occur in the process of connection via the first clutch 45J.

In the power output apparatus 20J of modified structure, the speed change gears 120 and 130 are arranged on both the connection of the crankshaft 56 with the rotor-rotating shaft 38J and the connection of the drive shaft 22 with the rotor-rotating shaft 38J. The speed change gear may, however, be arranged on either of the connections. In the power output apparatus 20J, the revolving speed is changed by varying the circumferential radius of the belt 125 (or 135). Any technique may, however, be applied to change the revolving speed of the rotor-rotating shaft 38J and transmit the speed change to the crankshaft 56 or to the drive shaft 22. For example, the revolving speed may be changed by the gear coupling in a planetary gear.

The present invention is not restricted to the above embodiment or applications, but there may be many modifications, changes, and alterations without departing from the scope or spirit of the main characteristics of the present invention.

The gasoline engine driven by means of gasoline is used as the engine 50 in the power output apparatus 20 of the embodiment discussed above. The principle of the invention is, however, applicable to other internal combustion engines and external combustion engines, such as Diesel engines, turbine engines, and jet engines.

In the power output apparatus 20 of the embodiment, permanent magnet (PM)-type synchronous motors are used for the clutch motor 30 and the assist motor 40. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

In the power output apparatus 20 of the embodiment, the slip ring 35 including the rotary rings 35a and the brushes 35b is used as the transmission means of the electric power to the clutch motor 30. The slip ring 35 may, however, be replaced by a rotary ring-mercury contact, a semiconductor coupling of magnetic energy, a rotary transformer, or the like.

In the power output apparatus 20 of the embodiment, transistor inverters are used for the first and the second driving circuits 91 and 92. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power output apparatus 20 of the embodiment is mounted on the vehicle, it may be mounted on other transportation means like ships and airplanes as well as a variety of industrial machines.

It should be clearly understood that the above embodiment is only illustrative and not restrictive in any sense. The scope and spirit of the present invention are limited only by the terms of the appended claims.

What is claimed is:

1. A power output apparatus for outputting power to a drive shaft, said power output apparatus comprising:

an engine having an output shaft;

a first motor comprising a first rotor connected with said output shaft of said engine and a second rotor connected with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor;

a second motor having a rotating shaft different from said output shaft and said drive shaft, said second motor receiving and transmitting power via said rotating shaft;

first connection means for mechanically connecting said rotating shaft to said output shaft and releasing the connection; and second connection means for mechanically connecting said rotating shaft to said drive shaft and releasing the connection.

2. A power output apparatus in accordance with claim 1, wherein said first connection means and said second connection means both comprise clutches.

3. A power output apparatus in accordance with claim 1, wherein said drive shaft and said output shaft are arranged coaxially.

4. A power output apparatus in accordance with claim 3, wherein said rotating shaft is arranged coaxially with said drive shaft and said output shaft.

5. A power output apparatus in accordance with claim 4, wherein said second motor comprises a cylindrical rotor arranged outside said first motor in a diametral direction.

6. A power output apparatus in accordance with claim 4, wherein said engine, said second motor, and said first motor are arranged in this sequence.

7. A power output apparatus in accordance with claim 6, wherein said first connection means and said second connection means are arranged between said second motor and said first motor.

8. A power output apparatus in accordance with claim 3, wherein said rotating shaft is arranged on a different axis from said drive shaft and said output shaft.

9. A power output apparatus in accordance with claim 1, wherein said output shaft and said drive shaft are arranged on different axes.

10. A power output apparatus in accordance with claim 9, wherein said rotating shaft is arranged coaxially with said output shaft.

11. A power output apparatus in accordance with claim 9, wherein said rotating shaft is arranged coaxially with said drive shaft.

12. A power output apparatus in accordance with claim 1, wherein said first connection means comprises:

a connecting shaft for mechanically connecting with said output shaft; and change gear means for changing a revolving speed between said connecting shaft and said rotating shaft.

13. A power output apparatus in accordance with claim 1, wherein said second connection means comprises:

a connecting shaft for mechanically connecting with said drive shaft; and change gear means for changing a revolving speed between said connecting shaft and said rotating shaft.

14. A power output apparatus in accordance with claim 1, said power output apparatus further comprising:

connection control means for controlling said first connection means and said second connection means under a predetermined condition.

15. A power output apparatus in accordance with claim 14, wherein said connection control means comprises:

means for controlling said first connection means to release the connection of said rotating shaft with said output shaft and controlling said second connection means to connect said rotating shaft to said drive shaft when said predetermined condition is that a revolving speed of said output shaft is higher than a revolving speed of said drive shaft, and means for controlling said first connection means to connect said rotating shaft to said output shaft and controlling said second connection means to release the connection of said rotating shaft with said drive shaft when said predetermined condition is that the revolving speed of said output shaft is lower than the revolving speed of said drive shaft.

16. A power output apparatus in accordance with claim 15, said power output apparatus further comprising:

storage battery means being charged with electric power regenerated through the power transmission by said first motor, being discharged to supply electric power consumed through the power transmission by said first motor, being charged with electric power regenerated through the power transmission by said second motor, and being discharged to supply electric power consumed through the power transmission by said second motor;

target power setting means for setting a target power to be output to said drive shaft; and drive/control means for driving and controlling said engine, said first motor, and said second motor, in order to enable a total energy of a power output from said engine and an electric power, which is stored in said storage battery means and discharged from said storage battery means, to be output to said drive shaft as the target power set by said target power setting means.

17. A power output apparatus in accordance with claim 16, said power output apparatus further comprising:

charging state detection means for detecting a charging state of said storage battery means, wherein said drive/control means comprises means for driving and controlling said engine, said first motor, and said second motor, in order to make the charging state of said storage battery means detected by said charging state detection means within a predetermined range.

18. A power output apparatus in accordance with claim 14, wherein said connection control means comprises means for controlling said first connection means and said second connection means, in order to enable said rotating shaft to connect with said drive shaft and with said output shaft, when said predetermined condition is that said engine, said first motor, said second motor, and said drive shaft are in a predetermined operating state.

19. A power output apparatus in accordance with claim 18, wherein said predetermined operating state comprises a state within a predetermined efficient driving range of said engine when a revolving speed of said drive shaft is identical with a revolving speed of said output shaft of said engine.

20. A power output apparatus in accordance with claim 19, said power output apparatus further comprising:

storage battery means being charged with electric power regenerated through the power transmission by said first motor, being discharged to supply electric power consumed through the power transmission by said first motor, being charged with electric power regenerated through the power transmission by said second motor, and being discharged to supply electric power consumed through the power transmission by said second motor;

target power setting means for setting a target power to be output to said drive shaft; and drive/control means for driving and controlling said engine, said first motor, and said second motor, in order to enable a total energy of a power output from said engine and an electric power, which is stored in said storage battery means and discharged from said storage battery means, to be output to said drive shaft as the target power set by said target power setting means.

21. A power output apparatus in accordance with claim 20, said power output apparatus further comprising:

charging state detection means for detecting a charging state of said storage battery means, wherein said drive/control means comprises means for driving and controlling said engine, said first motor, and said second motor, in order to make the charging state of said storage battery means detected by said charging state detection means within a predetermined range.

22. A power output apparatus in accordance with claim 18, wherein said predetermined operating state comprises a state in which a difference between a revolving speed of said output shaft and a revolving speed of said drive shaft is within a predetermined range.

23. A power output apparatus in accordance with claim 18, wherein said predetermined operating state comprises a state in which abnormality of said first motor is detected.

24. A power output apparatus in accordance with claim 14, wherein said connection control means comprises means for controlling said first connection means and said second connection means, in order to release the connection of said rotating shaft with said drive shaft and the connection of said rotating shaft with said output shaft, when said predetermined condition is that said engine, said first motor, said second motor, and said drive shaft are in a predetermined operating state.

25. A power output apparatus in accordance with claim 24, wherein said predetermined operating state comprises a state within a predetermined efficient driving range of said engine when a torque to be output to said drive shaft is identical with a torque output from said engine.

26. A power output apparatus in accordance with claim 24, wherein said predetermined operating state comprises a state in which abnormality of said second motor is detected.

27. A power output apparatus in accordance with claim 14, said power output apparatus further comprising:

drive/control means for driving and controlling said first motor and said second motor, in order to enable a power output from said engine to be subjected to a torque conversion and output to said drive shaft when said rotating shaft is connected with either one of said output shaft and said drive shaft by said connection control means.

28. A power output apparatus in accordance with claim 14, said power output apparatus further comprising:

storage battery means being charged with electric power regenerated through the power transmission by said first motor, being discharged to supply electric power consumed through the power transmission by said first motor, being charged with electric power regenerated through the power transmission by said second motor, and being discharged to supply electric power consumed through the power transmission by said second motor;

target power setting means for setting a target power to be output to said drive shaft; and drive/control means for driving and controlling said engine, said first motor, and said second motor, in order to enable a total energy of a power output from said engine and an electric power, which is stored in said storage battery means and discharged from said storage battery means, to be output to said drive shaft as the target power set by said target power setting means.

29. A power output apparatus in accordance with claim 28, said power output apparatus further comprising:

charging state detection means for detecting a charging state of said storage battery means, wherein said drive/control means comprises means for driving and controlling said engine, said first motor, and said second motor, in order to enable the target power to be output to said drive shaft and in order to make the charging state of said storage battery means detected by said charging state detection means within a predetermined range.

30. A power output apparatus in accordance with claim 28, wherein said connection control means comprises means for controlling said first connection means to release the connection of said rotating shaft with said output shaft and controlling said second connection means to connect said rotating shaft to said drive shaft, when at least either one of a first condition that a predetermined instruction is given and a second condition that the target power set by said target power setting means is within a predetermined range is fulfilled as said predetermined condition, said drive/control means comprising means for driving and controlling said second motor with electric power discharged from said storage battery means, in order to enable the target power to be output to said drive shaft.

31. A power output apparatus in accordance with claim 28, wherein said connection control means comprises means for controlling said first connection means to connect said rotating shaft to said output shaft and controlling said second connection means to release the connection of said rotating shaft with said drive shaft, when at least either one of a first condition that a predetermined instruction is given and a second condition that the target power set by said target power setting means is within a predetermined range is fulfilled as said predetermined condition, said drive/control means comprising means for controlling said first motor in order to enable said first motor to utilize electric power discharged from said storage battery means and output power to said drive shaft, and controlling said second motor in order to cancel a torque that is generated with the output of said power and applied to said output shaft of said engine, thereby enabling the target power to be output to said drive shaft.

32. A power output apparatus in accordance with claim 28, wherein said connection control means comprises means for controlling said first connection means to connect said rotating shaft to said output shaft and controlling said second connection means to connect said rotating shaft to said drive shaft, when at least either one of a first condition that a predetermined instruction is given and a second condition that the target power set by said target power setting means is within a predetermined range is fulfilled as said predetermined condition, said drive/control means comprising means for stopping supply of a fuel into said engine and an ignition control and controlling said second motor, in order to enable said second motor to utilize electric power discharged from said storage battery means and output power to said drive shaft while motoring said engine.

33. A power output apparatus in accordance with claim 32, said power output apparatus further comprising:

engine start control means for controlling supply of the fuel into said engine and ignition while said engine being motored, when an instruction is given to start said engine.

34. A power output apparatus in accordance with claim 33, wherein said drive/control means further comprises means for controlling said second motor, in order to cancel the power output from said engine when said engine start control means starts said engine.

35. A power output apparatus in accordance with claim 28, wherein said target power setting means sets a power for rotating said drive shaft in reverse of the rotation of said output shaft of said engine as the target power.

36. A power output apparatus in accordance with claim 14, said power output apparatus further comprising:

reverse rotation control means for controlling said first connection means and said second connection means to release the connection of said rotating shaft with said output shaft and to connect said rotating shaft to said drive shaft via said connection control means, and for controlling said second motor in order to enable said second motor to output a power rotating in reverse of the rotation of said output shaft of said engine to said drive shaft, when an instruction is given to rotate said drive shaft in a reverse direction.

37. A power output apparatus in accordance with claim 14, said power output apparatus further comprising:

reverse rotation control means for controlling said first connection means and said second connection means to connect said rotating shaft to said output shaft and to release the connection of said rotating shaft with said drive shaft via said connection control means, for controlling said first motor in order to enable said first motor to output a power rotating in reverse of the rotation of said output shaft of said engine to said drive shaft, and for controlling said second motor to cancel a torque that is applied to said output shaft as a reaction force of the power output to said drive shaft, when an instruction is given to rotate said drive shaft in a reverse direction.

38. A power output apparatus in accordance with claim 14, said power output apparatus further comprising:

engine start control means for controlling said first connection means and said second connection means to connect said rotating shaft to said output shaft and to release the connection of said rotating shaft with said drive shaft via said connection control means, for controlling said second motor to motor said engine, and for controlling supply of a fuel into said engine and ignition while said engine is motored, when an instruction is given to start said engine.

39. A power output apparatus in accordance with claim 14, said power output apparatus further comprising:

engine start control means for controlling said first connection means and said second connection means to release the connection of said rotating shaft with said output shaft and to connect said rotating shaft to said drive shaft via said connection control means, for controlling said second motor to prevent rotation of said rotating shaft, for controlling said first motor to motor said engine, and for controlling supply of a fuel into said engine and ignition while said engine is motored, when an instruction is given to start said engine.

40. A power output apparatus in accordance with claim 14, said power output apparatus further comprising:

engine start control means for controlling said first motor to motor said engine and for controlling supply of a fuel into said engine and ignition while said engine is motored, when an instruction is given to start said engine while a power is output from said second motor to said drive shaft under a condition that said rotating shaft is disconnected from said output shaft but connected with said drive shaft.

41. A power output apparatus in accordance with claim 40, wherein said engine start control means comprises means for controlling said second motor to cancel a torque output from said first motor to said drive shaft as a reaction force of a torque required for motoring said engine.

42. A power output apparatus in accordance with claim 14, said power output apparatus further comprising:

engine start control means for controlling said second motor to motor said engine and for controlling supply of a fuel into said engine and ignition while said engine is motored, when an instruction is given to start said engine while said second motor fixes said output shaft and said first motor outputs a power to said drive shaft under a condition that said rotating shaft is connected with said output shaft but disconnected from said drive shaft.

43. A power output apparatus in accordance with claim 42, wherein said engine start control means comprises means for controlling said first motor to cancel a torque output to said drive shaft as a reaction force of a torque required for motoring said engine.

44. A method of controlling a power output apparatus for outputting power to a drive shaft, said method comprising the steps of:

(a) providing (1) an engine having an output shaft; (2) a first motor comprising a first rotor connected with said output shaft of said engine and a second rotor connected with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor; (3) a second motor having a rotating shaft different from said output shaft and said drive shaft, said second motor receiving and transmitting power via said rotating shaft; (4) first connection means for mechanically connecting said rotating shaft to said output shaft and releasing the connection; and (5) second connection means for mechanically connecting said rotating shaft to said drive shaft and releasing the connection;

(b) controlling said first connection means to release the connection of said rotating shaft with said output shaft and controlling said second connection means to connect said rotating shaft to said drive shaft when a revolving speed of said output shaft is higher than a revolving speed of said drive shaft; and (c) controlling said first connection means to connect said rotating shaft to said output shaft and controlling said second connection means to release the connection of said rotating shaft with said drive shaft when the revolving speed of said output shaft is lower than the revolving speed of said drive shaft.

45. A method in accordance with claim 44, wherein said step (a) comprises the step of:

providing storage battery means being charged with electric power regenerated through the power transmission by said first motor, being discharged to supply electric power consumed through the power transmission by said first motor, being charged with electric power regenerated through the power transmission by said second motor, and being discharged to supply electric power consumed through the power transmission by said second motor, said method further comprising the steps of:
- (d) setting a target power to be output to said drive shaft; and
- (e) driving and controlling said engine, said first motor, and said second motor, in order to enable a total energy of a power output from said engine and an electric power, which is stored in said storage battery means and discharged from said storage battery means, to be output to said drive shaft as the target power set in said step (d).

46. A method in accordance with claim 45, wherein said step (e) comprises the step of:
detecting a charging state of said storage battery means, and driving and controlling said engine, said first motor, and said second motor, in order to make the charging state of said storage battery means within a predetermined range.

47. A method of controlling a power output apparatus for outputting power to a drive shaft, said method comprising the steps of:
- (a) providing (1) an engine having an output shaft; (2) a first motor comprising a first rotor connected with said output shaft of said engine and a second rotor connected with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor; (3) a second motor having a rotating shaft different from said output shaft and said drive shaft, said second motor receiving and transmitting power via said rotating shaft; (4) first connection means for mechanically connecting said rotating shaft to said output shaft and releasing the connection; and (5) second connection means for mechanically connecting said rotating shaft to said drive shaft and releasing the connection; and
- (b) controlling said first connection means and said second connection means in order to enable said rotating shaft to be connected with said drive shaft and with said output shaft, provided that state of said engine is within a predetermined efficient driving range when a revolving speed of said drive shaft is identical with a revolving speed of said output shaft of said engine.

48. A method in accordance with claim 47, wherein said step (a) comprises the step of:

providing storage battery means being charged with electric power regenerated through the power transmission by said first motor, being discharged to supply electric power consumed through the power transmission by said first motor, being charged with electric power regenerated through the power transmission by said second motor, and being discharged to supply electric power consumed through the power transmission by said second motor, said method further comprising the steps of:
- (c) setting a target power to be output to said drive shaft; and
- (d) driving and controlling said engine, said first motor, and said second motor, in order to enable a total energy of a power output from said engine and an electric power, which is stored in said storage battery means and discharged from said storage battery means, to be output to said drive shaft as the target power set in said step (c).

49. A method in accordance with claim 48, wherein said step (d) comprises the step of:
detecting a charging state of said storage battery means, and driving and controlling said engine, said first motor, and said second motor, in order to make the charging state of said storage battery means within a predetermined range.

50. A method of controlling a power output apparatus for outputting power to a drive shaft, said method comprising the steps of:
- (a) providing (1) an engine having an output shaft; (2) a first motor comprising a first rotor connected with said output shaft of said engine and a second rotor connected with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor; (3) a second motor having a rotating shaft different from said output shaft and said drive shaft, said second motor receiving and transmitting power via said rotating shaft; (4) first connection means for mechanically connecting said rotating shaft to said output shaft and releasing the connection; and (5) second connection means for mechanically connecting said rotating shaft to said drive shaft and releasing the connection;
- (b) controlling said first connection means and said second connection means to carry out either one of the connection by said first connection means and the connection by said second connection; and
- (c) driving and controlling said first motor and said second motor, in order to enable power output from said engine to be subjected to a torque conversion and output to said drive shaft.

* * * * *